INVENTOR
DALE A. NONNEMACHER
BY E. F. Kane
ATTORNEY

RECOGNITION
RELAY CIRCUIT

RECOGNITION RELAY
CIRCUIT ALARM

RUN OUT MAGNET CIRCUIT

TAPE CLAMP CIRCUIT

STOP RUN SWITCH CIRCUIT

PERMUTATION RELAY CIRCUIT

Jan. 24, 1967 D. A. NONNEMACHER 3,300,579

LINE SWITCHING SYSTEM FOR SIMULTANEOUSLY TRANSMITTING TELEGRAPH MESSAGES TO MULTIPLE ADDRESSES

Filed July 15, 1963 21 Sheets-Sheet 7

TRANSMITTER OFF HOOK CIRCUIT

INTERCEPT INITIATION CIRCUIT

READER & DISTRIBUTOR CONTACT CIRCUIT

LOWER NOTCHER CONTROL AND LINE BLIND

ANSWER BACK CONFIRMATION & CIRCUIT ASSURANCE

SENDING LINE CIRCUIT

TIGHT TAPE CIRCUIT

UPPER NOTCHER CIRCUIT

PULL BACK & PULL FORWARD
RELAY CIRCUIT

TRANSMITTER SWITCH CIRCUIT "C"

UNSENT DDD NUMBER MEMORY CIRCUIT

TROUBLE CIRCUIT

TAPE CHECK CIRCUIT

MONITORING CIRCUIT

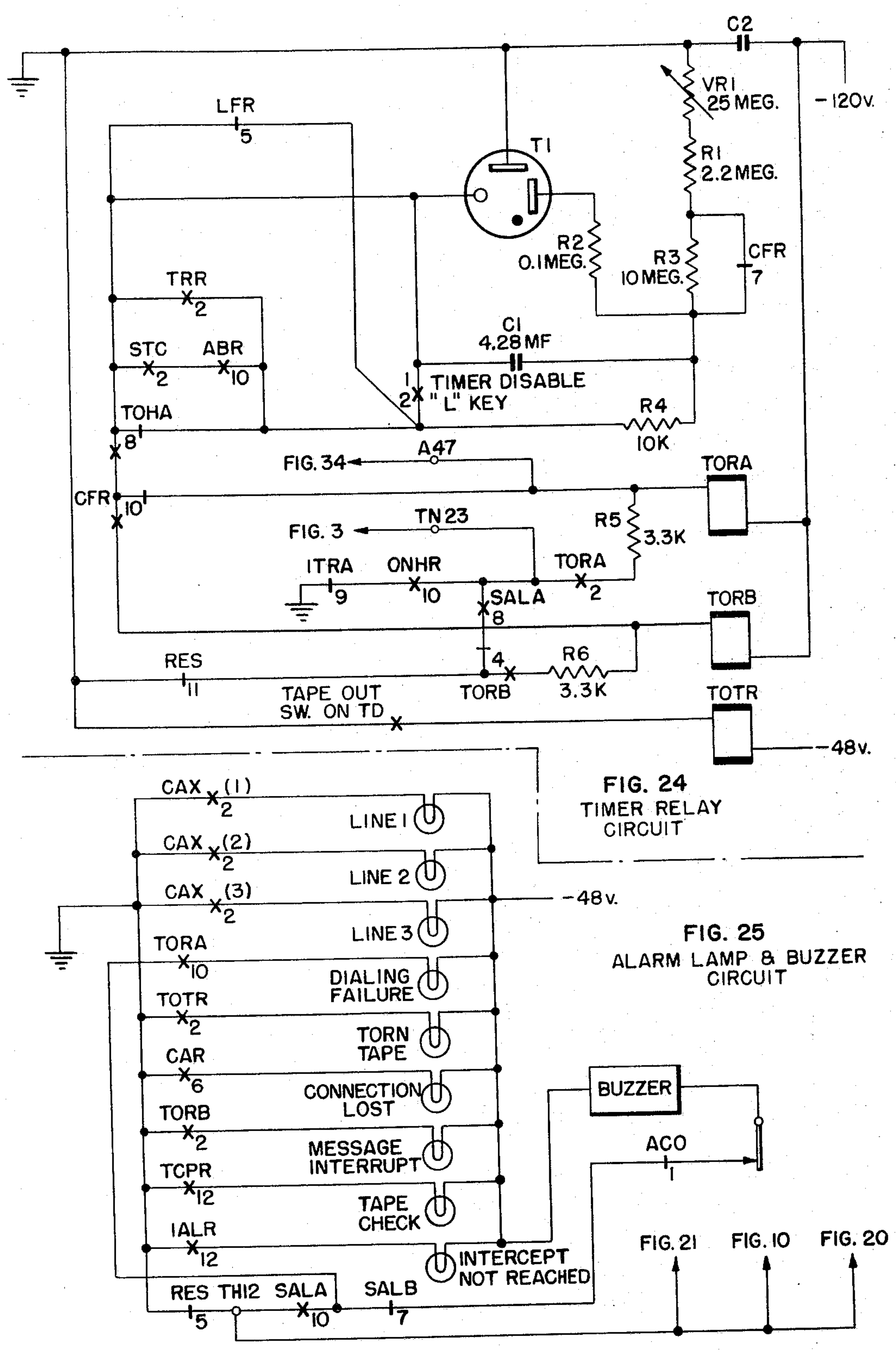
FIG. 24 TIMER RELAY CIRCUIT, FIG. 25 ALARM LAMP & BUZZER CIRCUIT

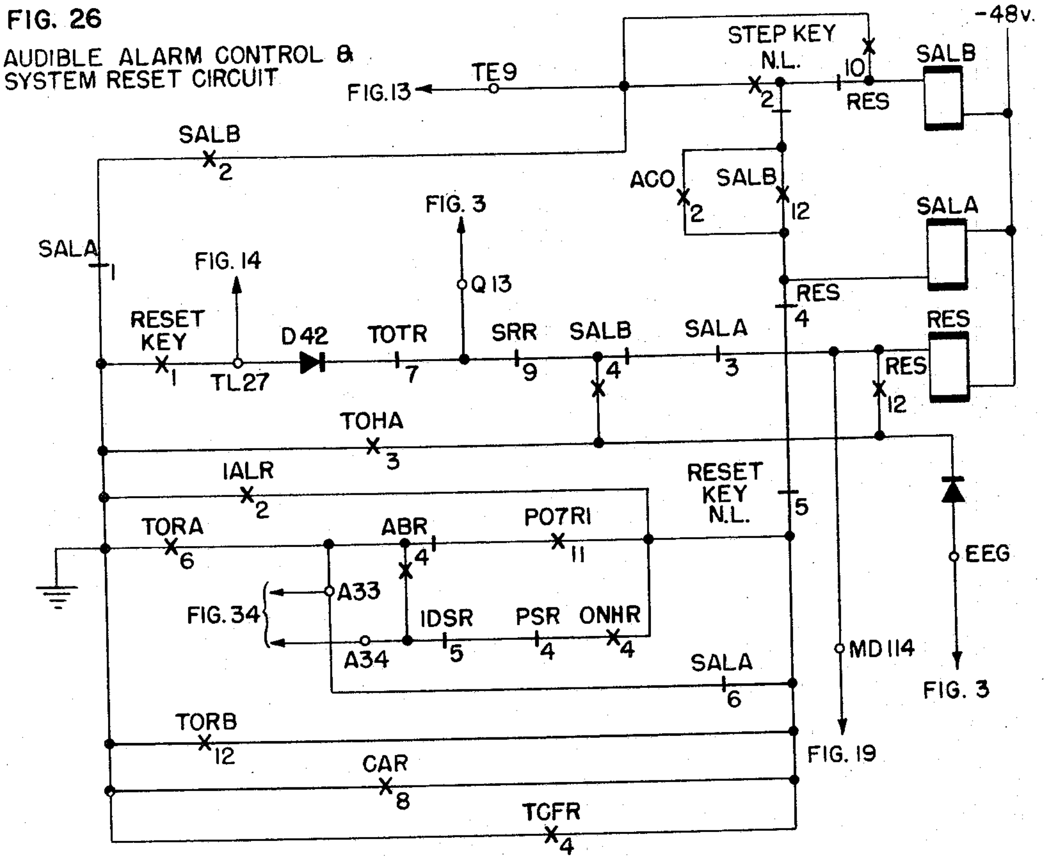
FIG. 26
FIG. 27 PRINTER CONTACTS
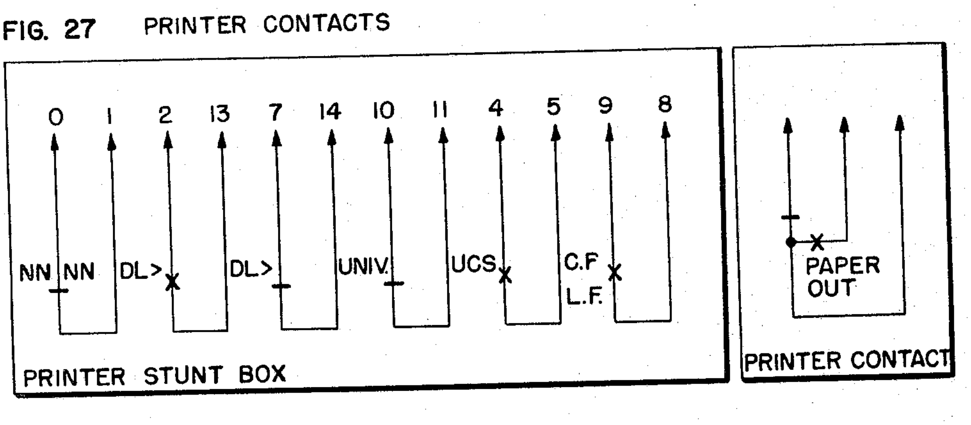
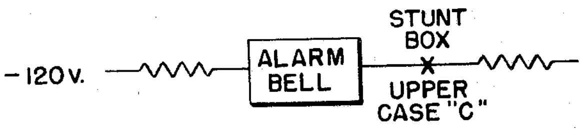
FIG. 28
AUDIBLE ALARM CIRCUIT

TRANSLATOR CIRCUIT 3,300,579
Patented Jan. 24, 1967

3,300,579

LINE SWITCHING SYSTEM FOR SIMULTANEOUSLY TRANSMITTING TELEGRAPH MESSAGES TO MULTIPLE ADDRESSES

Dale A. Nonnemacher, Morton Grove, Ill., assignor to Teletype Corporation, Skokie, Ill., a corporation of Delaware Filed July 15, 1963, Ser. No. 294,893
17 Claims. (Cl. 178—4)

This invention relates to line switching printing telegraph systems and more particularly to automatic systems for the simultaneous transmission of telegraph messages to a plurality of stations over a line switching network.

In the copending application of D.E. Huffman et al., Serial No. 135,857, filed September 5, 1961, now Patent No. 3,124,643, issued March 10, 1964, there is shown an automatic line switching system wherein a control tape perforated with code combinations representative of a plurality of addresses and a message text to be transmitted to the addresses serves to control the automatic transmission of the message to the addresses in the tape in sequential order. In the apparatus at the transmitting station, in such a system, there is provided means for feeding the tape past a reading station to read an address from the tape and attempting to make a line switching connection to the station, the address of which is read from the tape, whereupon when a connection is completed to the called station the message text is transmitted to that station, the tape is pulled back and a succeeding address in the tape is read and the message text transmitted to the succeeding station if a connection is completed. This process may be carried on to transmit the message text, in sequence, to any desired number of stations to which connections have been established and in the event that there is a failure, for any reason, to make a connection to a called station the message text and the address of the called station which was not reached are automatically transmitted to an intercept station.

It is an object of the present invention to provide a line switching telegraph system having transmitting equipment capable of simultaneously transmitting a message to a plurality of distant stations.

Another object of the present invention is the provision of means for reading a plurality of addresses in succession and completing communications paths through a line switching network to the called stations and then simultaneously transmitting a message text to all of the called stations to which communications paths have been established through the switching network.

In accordance with one embodiment of the invention a system of the type disclosed in the hereinbefore identified application of D. E. Huffman et al. is equipped with a plurality of subscribers sets which may be successively rendered operable to complete separate connections through a line switching network to lines extending to distant receiving stations. The subscriber sets may be rendered operable to receive the direct distance dialing number of a called station and thereafter held in readiness to receive a message text to be transmitted to that called station while another subscribers set is rendered effective to receive a direct distance dialing number whereupon after a plurality of subscriber sets have thus been placed in condition to receive a message text, all of the subscriber sets will be connected to a transmitter whereby the message text may be simultaneously transmitted to all called subscriber stations to which connections have been established.

In the operation of the apparatus thus briefly described, the tape for controlling the connection to a distant subscriber station and the transmitter will operate in the same manner as described in the copending application of D. E. Huffman et al. mentioned hereinbefore, up to the point where the tape reading mechanism reads the first direct distance dialing number (DDD). Upon finding the start of the first DDD number the transmitter will stop and make a connection to the first one of a plurality of subscribers sets and will cause the connected subscribers set to go "off hook" (i.e. assume the condition simulates that of a telephone subscribers set with the handset lifted from its cradle). Thereupon a connection is made between this first subscriber set and circuitry provided for feeding a DDD number into the subscriber set in an attempt to complete a connection to the terminating subscribers receiving station to which that DDD number has been assigned.

After the connection has been made between the circuitry which controls the dialing of the DDD number and the subscribers set, the DDD number will be fed into the subscribers set in the manner described in the said aforementioned copending application and the tape will be perforated to indicate that an attempt has been made to reach the called subscribers station whose number has been directed into the subscribers set at the call originating station. At this point a timer will be started, which is associated with the first subscribers set, but unlike the operation disclosed in the previously mentioned Huffman et al. application, the tape reader will not wait for an answer-back signal, but rather will release its connection to the first subscribers set while maintaining the off-hook condition thereof. The tape will then be stepped to read the next address (mnemonic code plus the DDD number), which will be fed into a second subscribers set. The DDD number will be sent under control of the tape to the second subscribers set and the attempt to reach the subscriber having that DDD number will be recorded in the tape and the second subscribers set will also be maintained in an off-hook condition.

When the tape reader detects an end-of-address code in the tape or, upon attempting to establish a connection to a subscribers set, detects that no more subscribers sets are available, the tape is pulled back and fed through the tape reader again. This will cause the transmitter to be operated and if a connection has been established to the subscribers set the DDD number of which was first transmitted to the switching equipment, the mnemonic code of that station is transmitted to the line over the first selected subscribers set and the monitoring printer described in detail in the aforementioned application will print this mnemonic. If an answer-back signal has not been received within the time allotted by the timer mentioned hereinbefore the subscribers set will be returned to the "on-hook" condition and since no connection has been completed to the called subscribers set as represented by the first DDD number that was transmitted, the mnemonic of course will not be transmitted over the line but it will be printed on the monitor.

As described in the aforementioned copending application, a time interval is allowed for the receipt of a confirmation signal indicating a good connection to the proper terminating station and if this confirmation is received a hole will be pierced in the tape in the "6" level thereof to so indicate. If confirmation of the connection is not received, the transmitting subscribers set will be returned to the on-hook condition and the tape will be stepped to read the next address thereon.

The operation as described in the preceding paragraph will be repeated for successive addresses as represented by the DDD numbers but the subscribers lines are all blinded except the one to which the mnemonic code for the called station is being sent.

Upon the sensing of the end-of-address code or upon detecting that all of the subscribers sets have been selected for transmission, the tape is pulled back and the connected lines are unblinded to receive the message text which is transmitted to the connected called subscribers stations and confirmation of this text transmission is detected. As the tape feeds through the reader transmitter it will be sensed for DDD numbers of terminating stations to which the message text has not been transmitted in the manner described in the aforementioned copending application and if additional addresses in the form of mnemonics and DDD numbers are perforated in the tape, the tape will be pulled back and the preceding process repeated. Upon detection of an end-of-message code in the tape, all of the subscribers sets which had been used are returned to the on-hook condition.

This system, which operates to effect simultaneous transmission to available destinations (abbreviated as STAD), has its originating station equipment divided into primary and secondary sections. In the primary section there is provided one set of equipment common to all of the subscriber sets (three in the embodiment disclosed herein), and the secondary section has three sets of equipment, one set for each subscribers set.

A more complete understanding of the invention may be had by reference to the following detailed description and the accompanying drawings showing the switching system in schematic form when these drawings are considered in conjunction with the physical structure disclosed in detail in the aforementioned copending application of D. E. Huffman et al. which is incorporated herein by reference.

In the drawings:

FIGS. 3 to 36 are detached contact circuit schematic views showing, insofar as possible, a complete separate function of the circuitry in each separate figure, which function is described adjacent to the figure number and as listed below:

Figure 3:
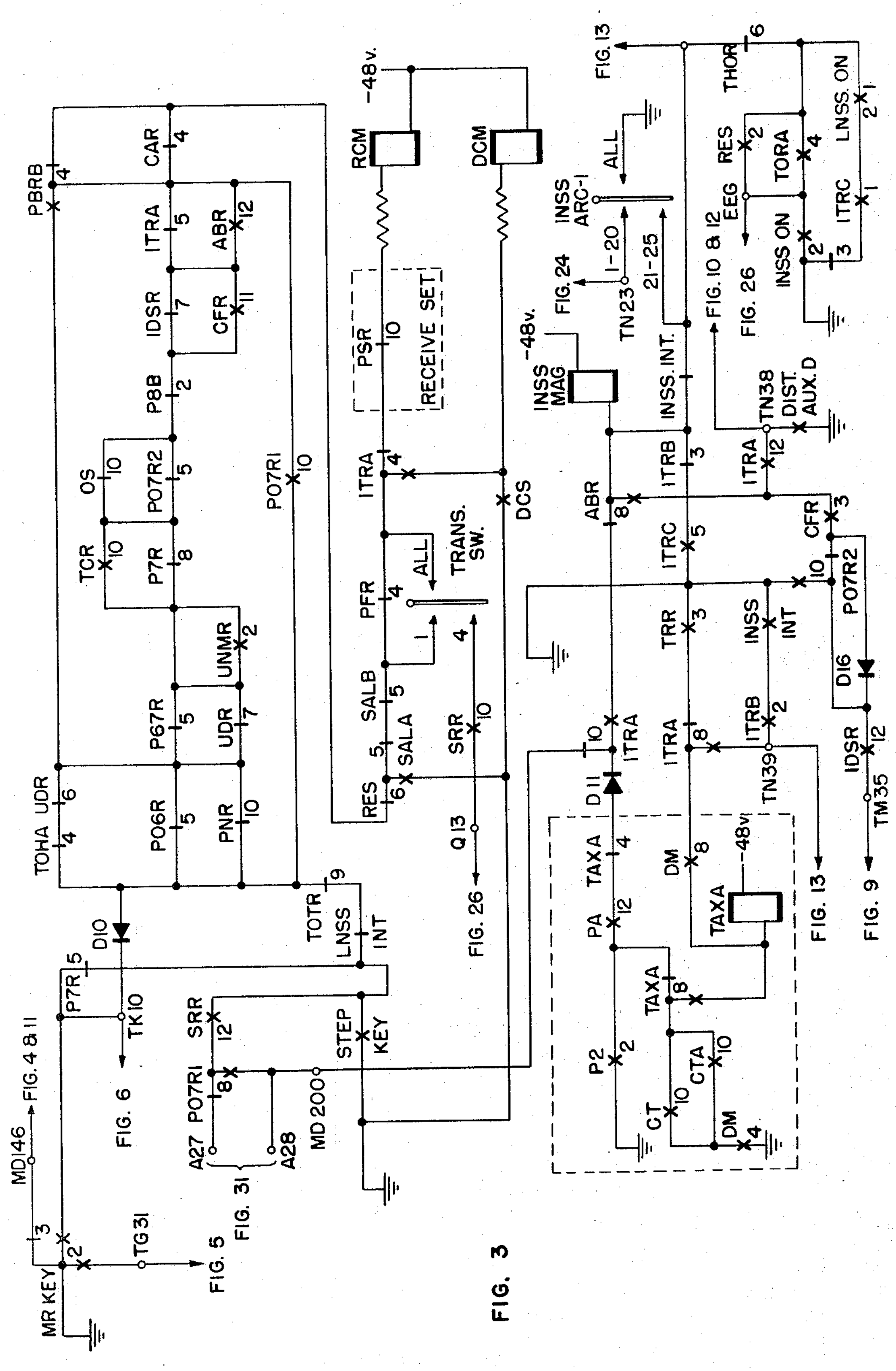
Figure 4:
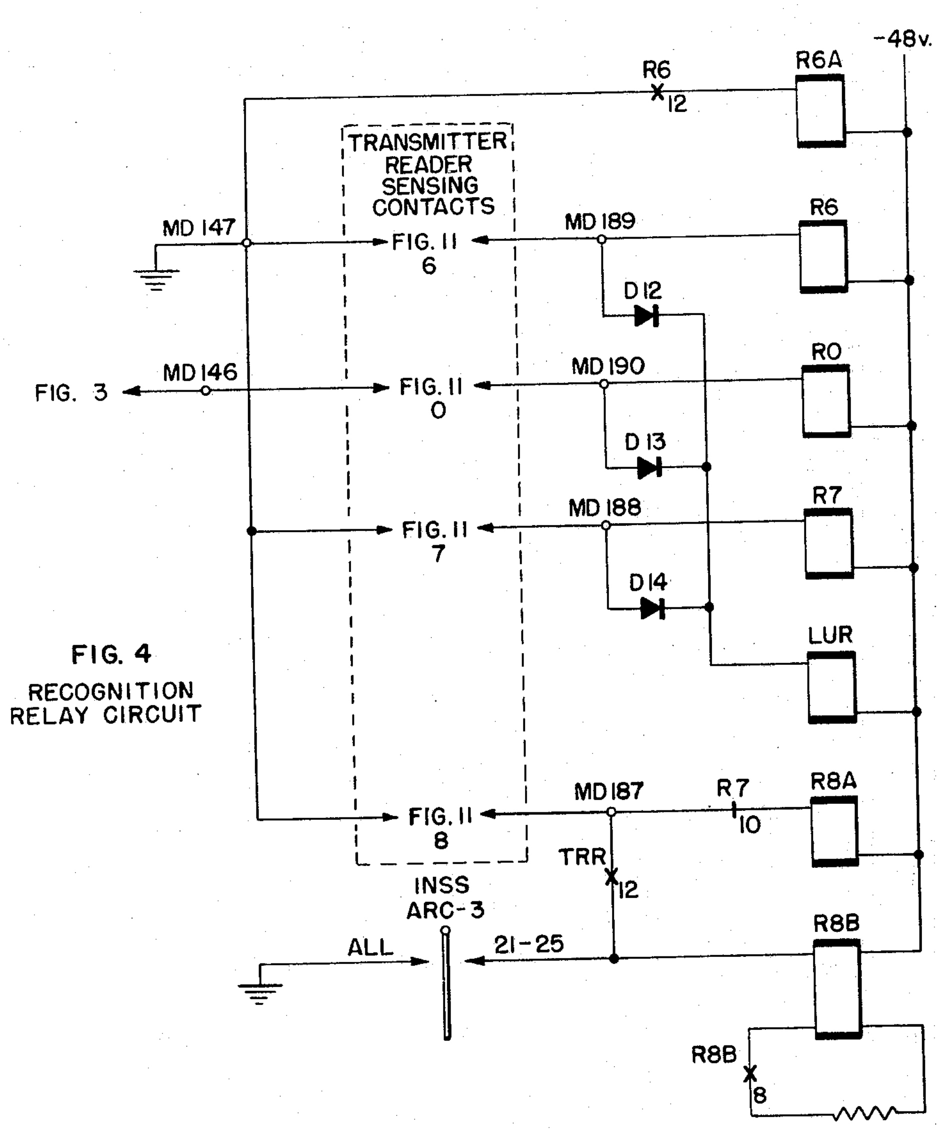
Figure 5:
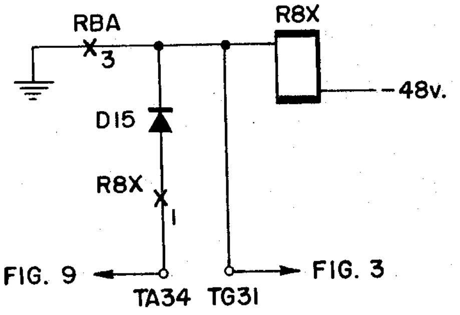
Figure 6:
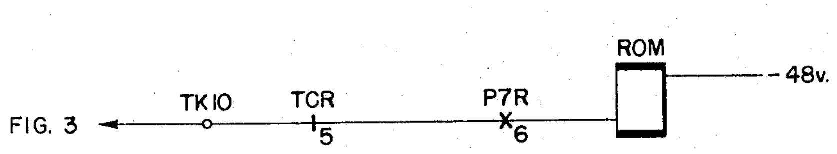
Figure 7:
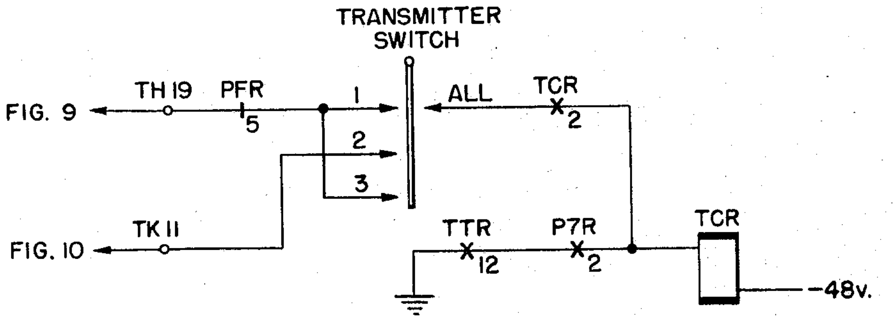
Figure 8:
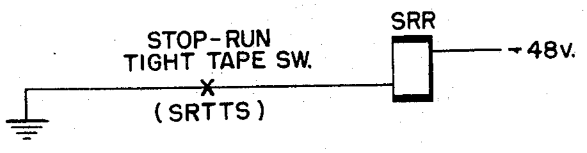
Figure 9:
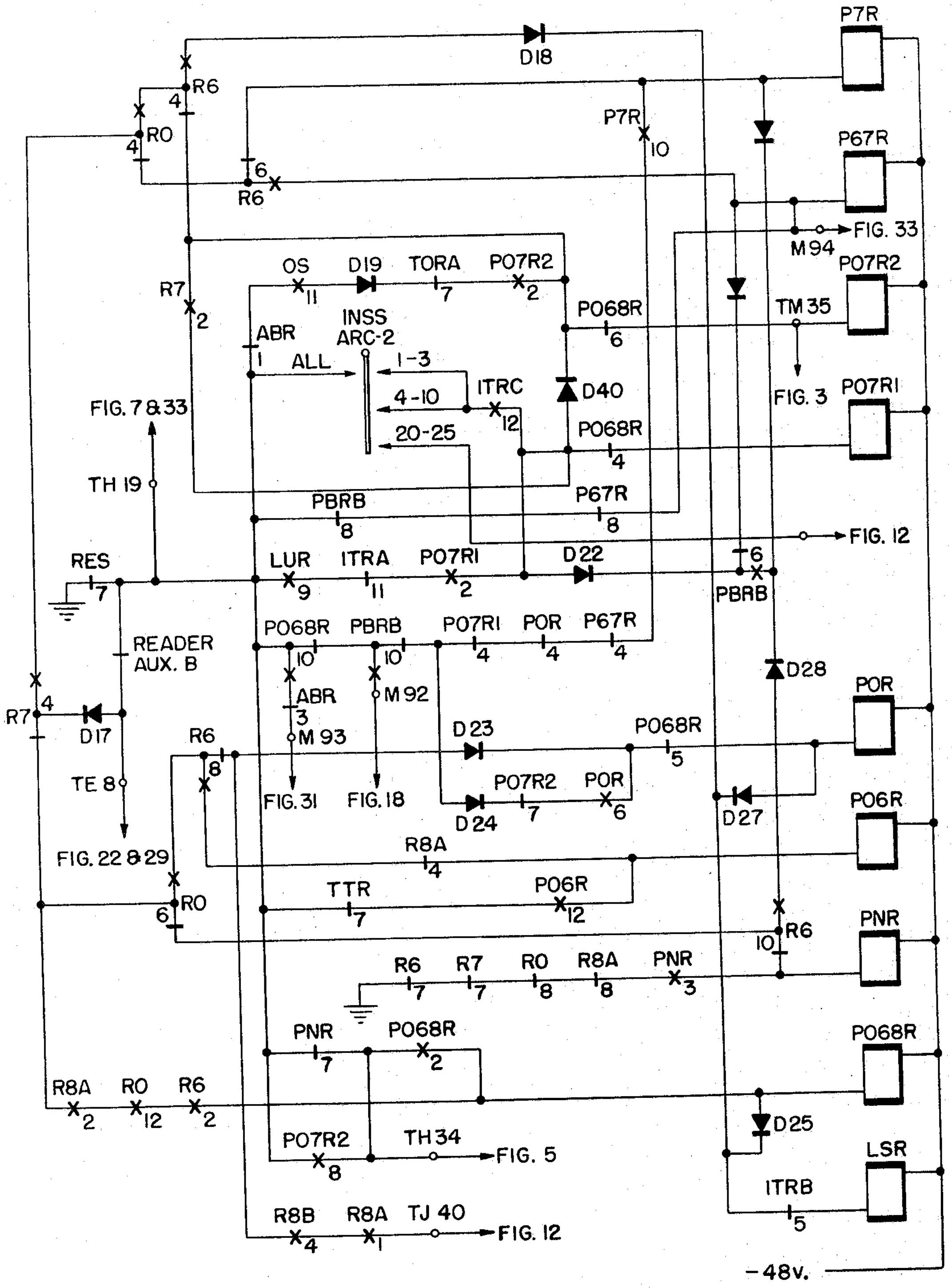
Figure 10:
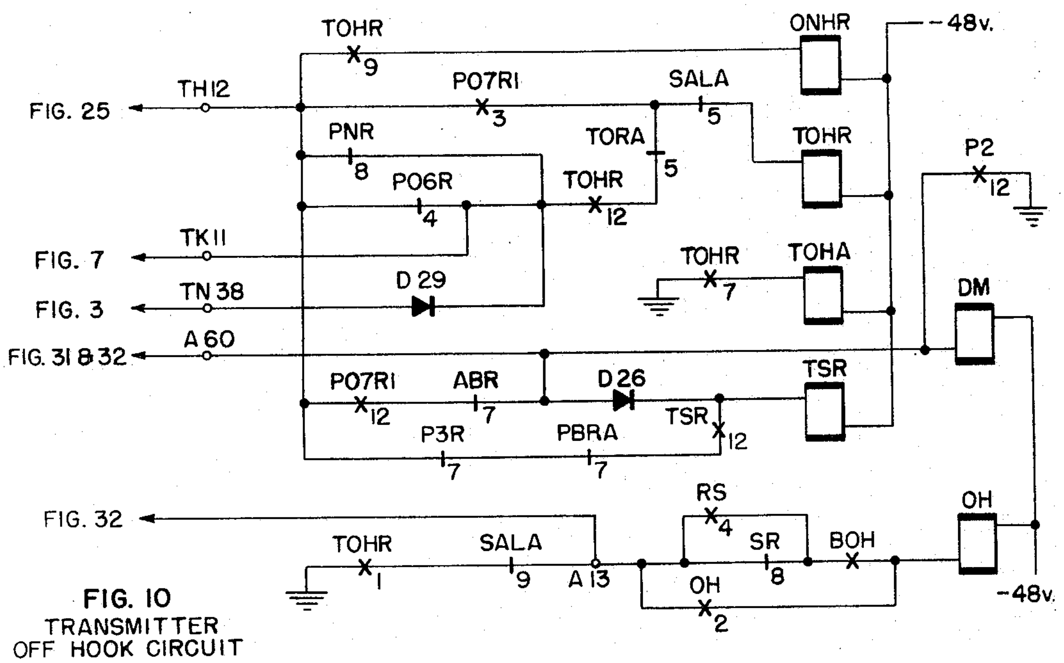
Figure 12:
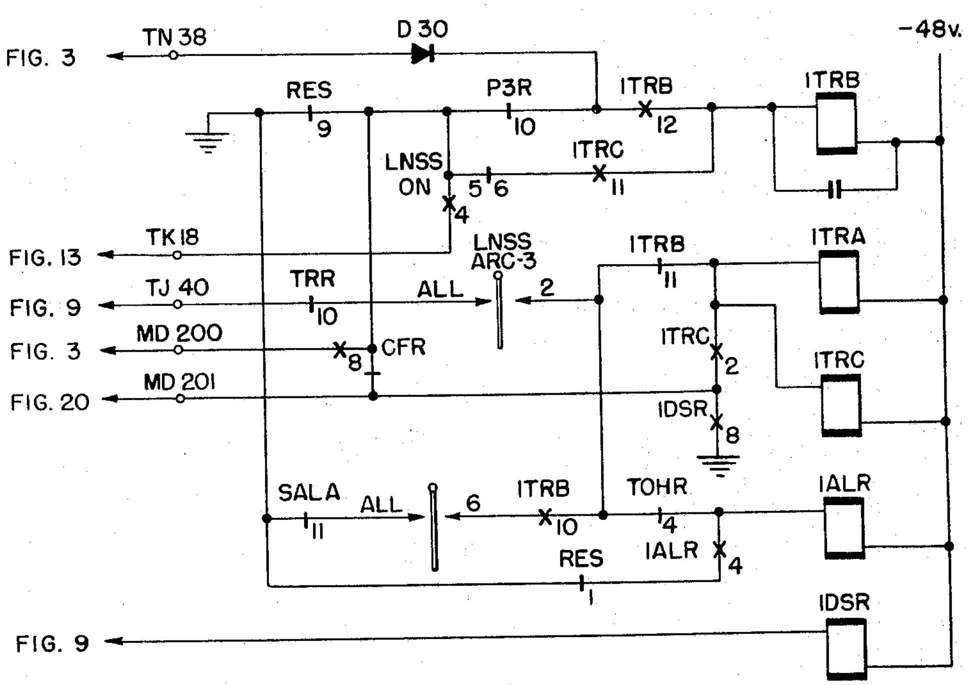
Figures 4, 11:
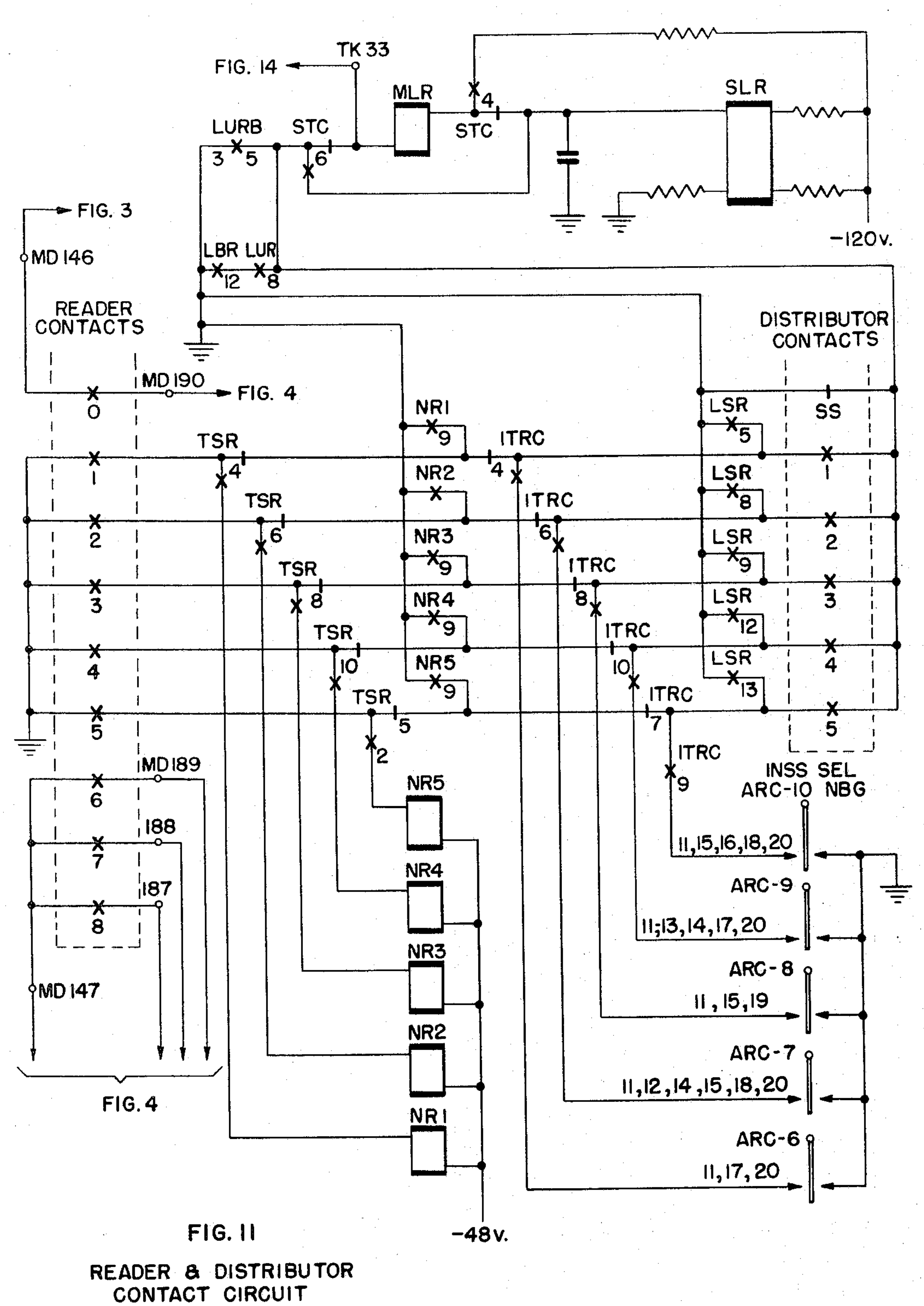
Figure 13:
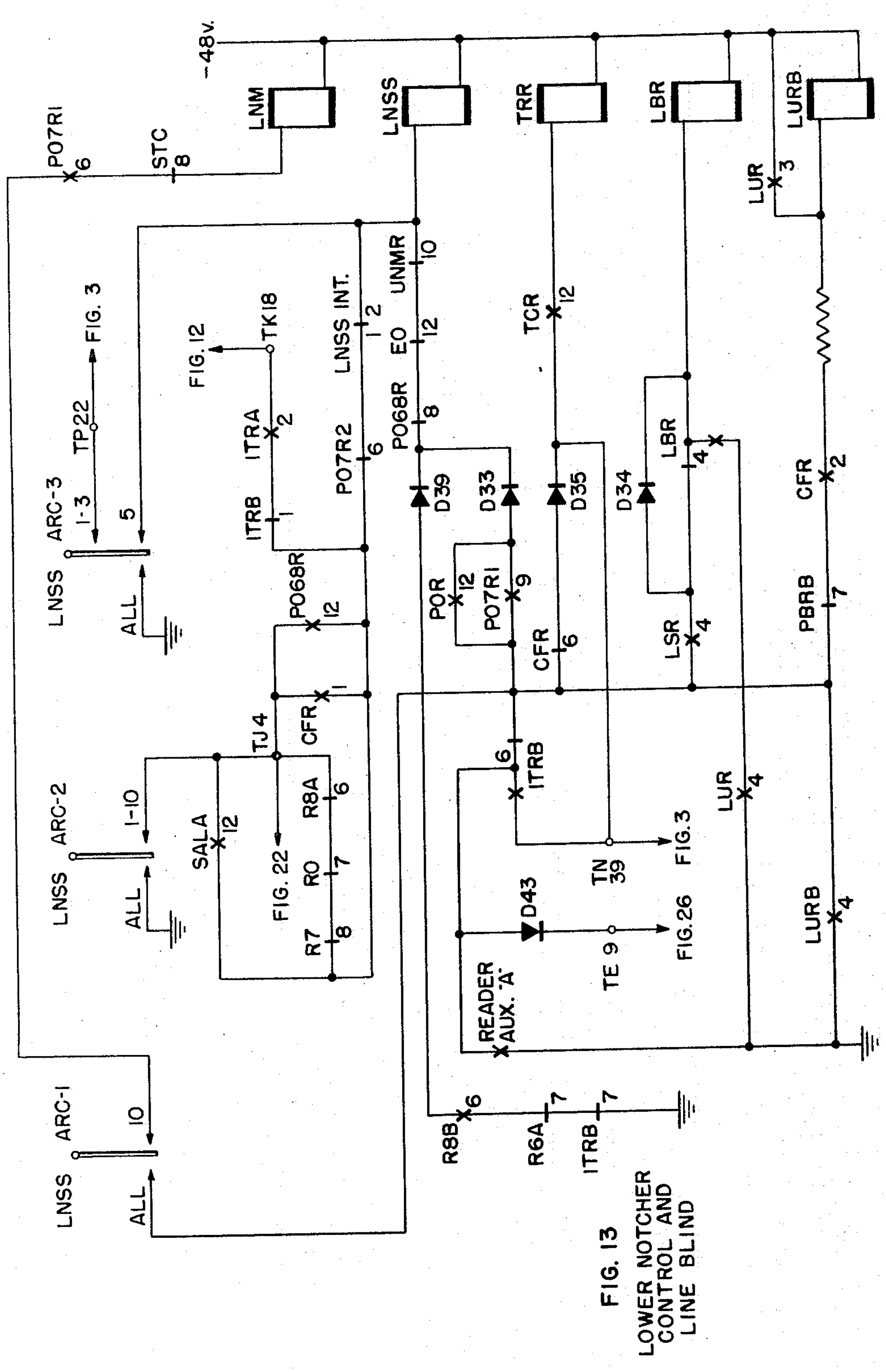
Figure 14:
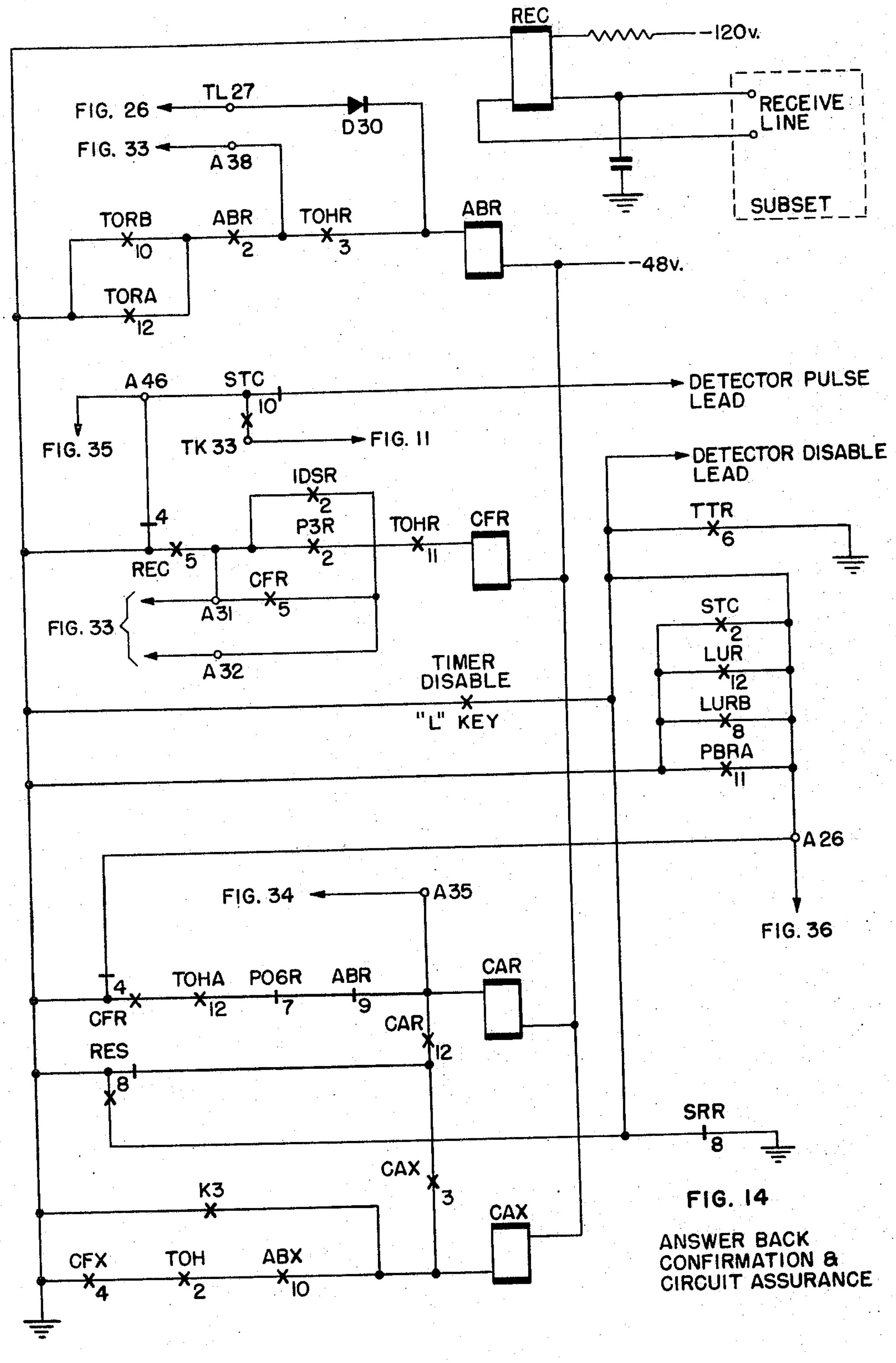
Figure 15:
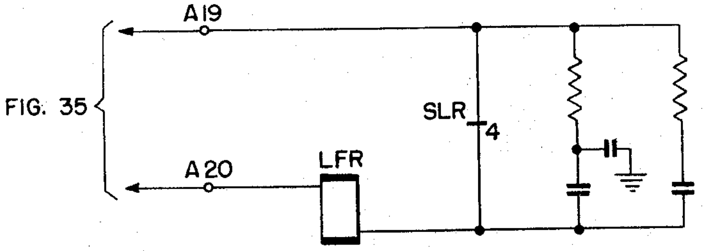
Figure 16:
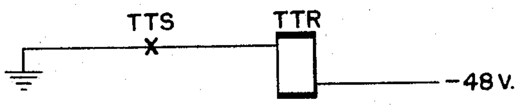
Figure 17:
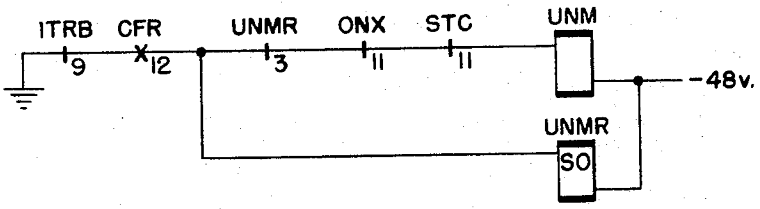
Figure 18:
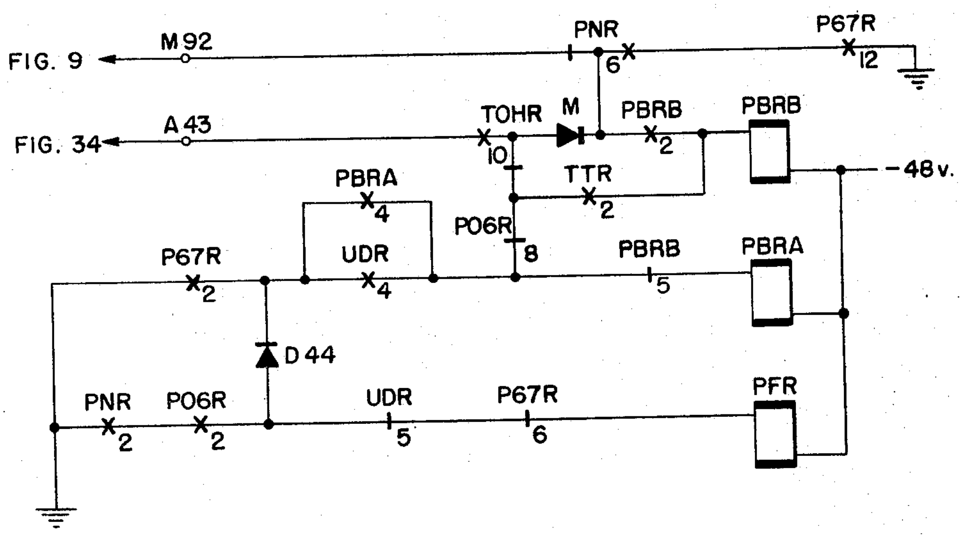
Figure 19:
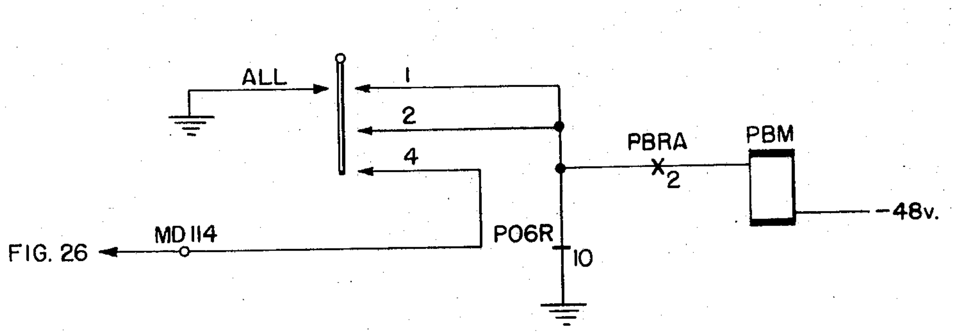
Figure 20:
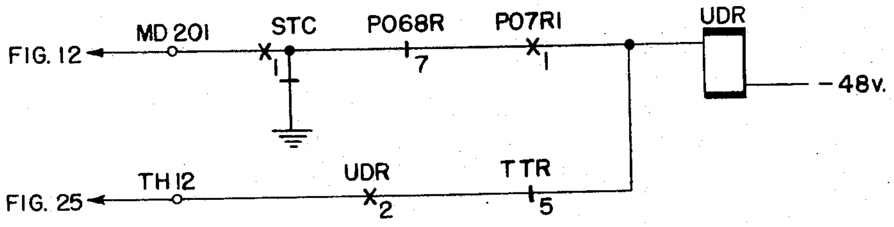
Figure 21:
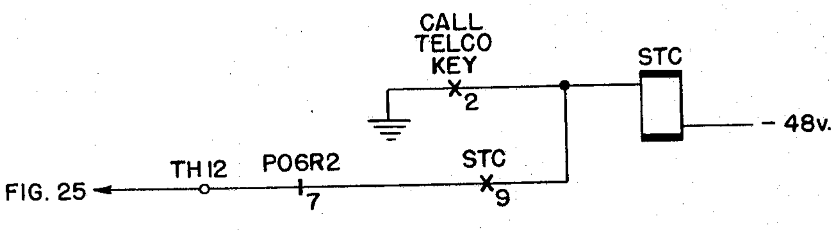
Figure 22:
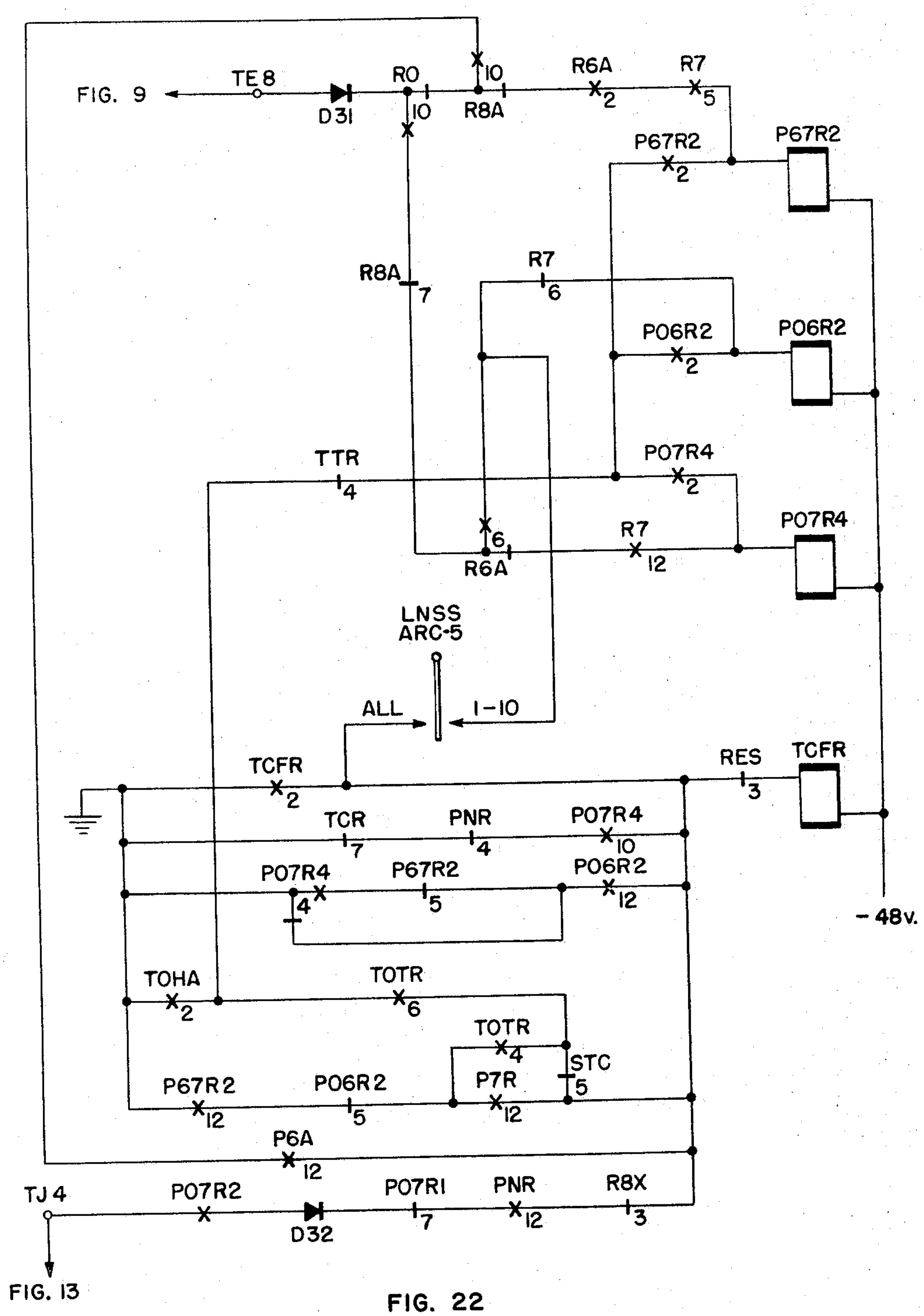
Figure 23:
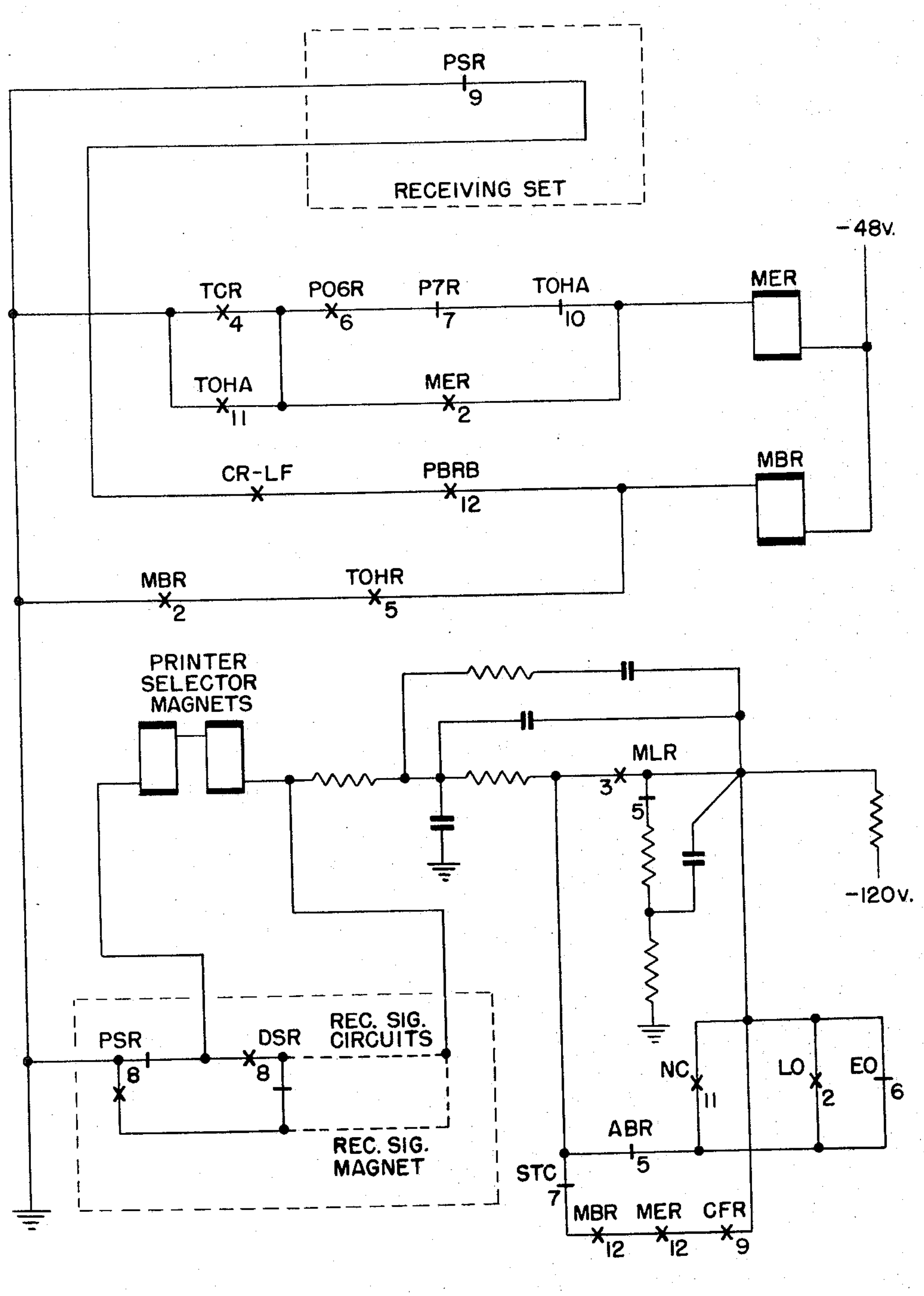
Figure 29:
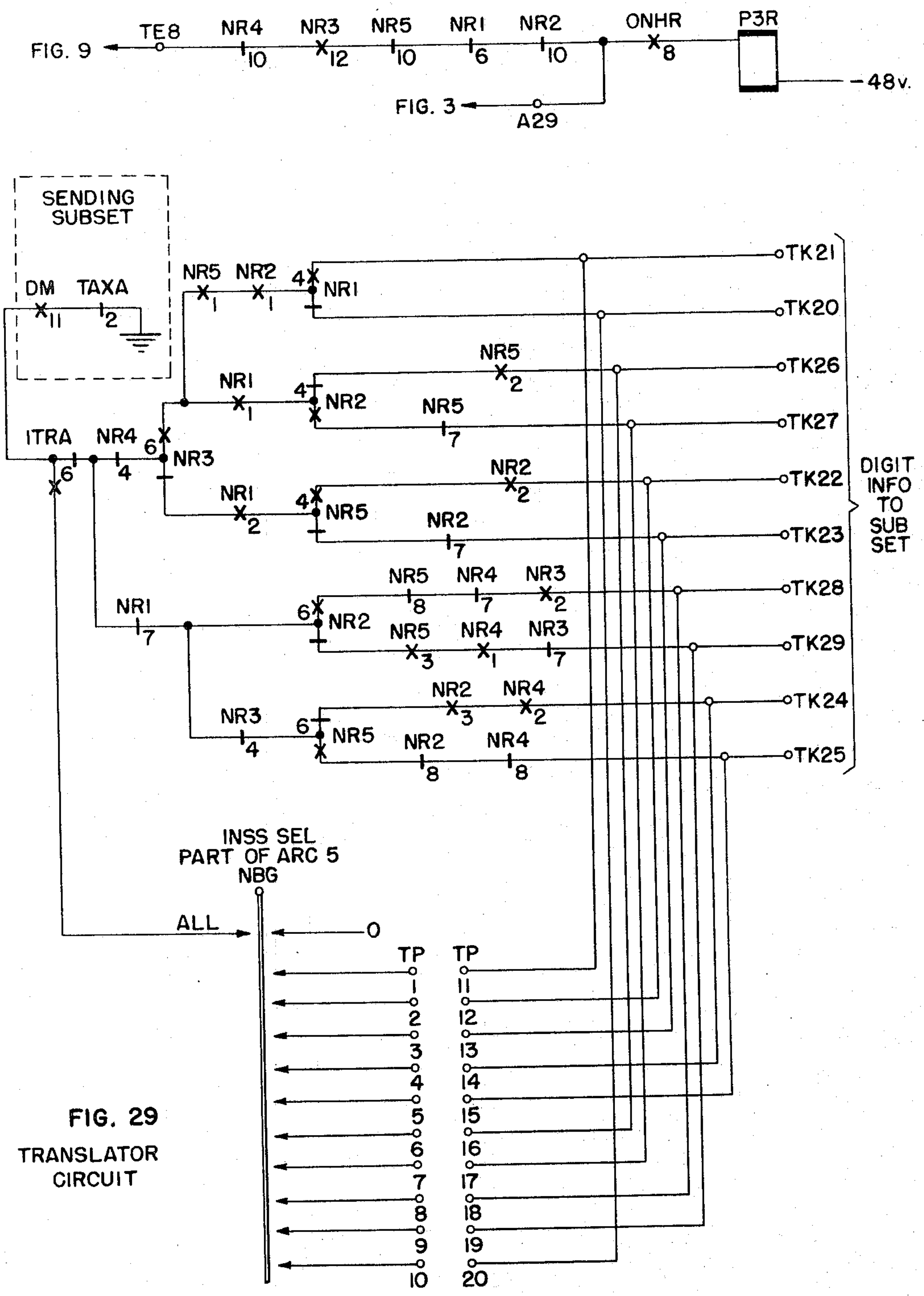
Figure 30:
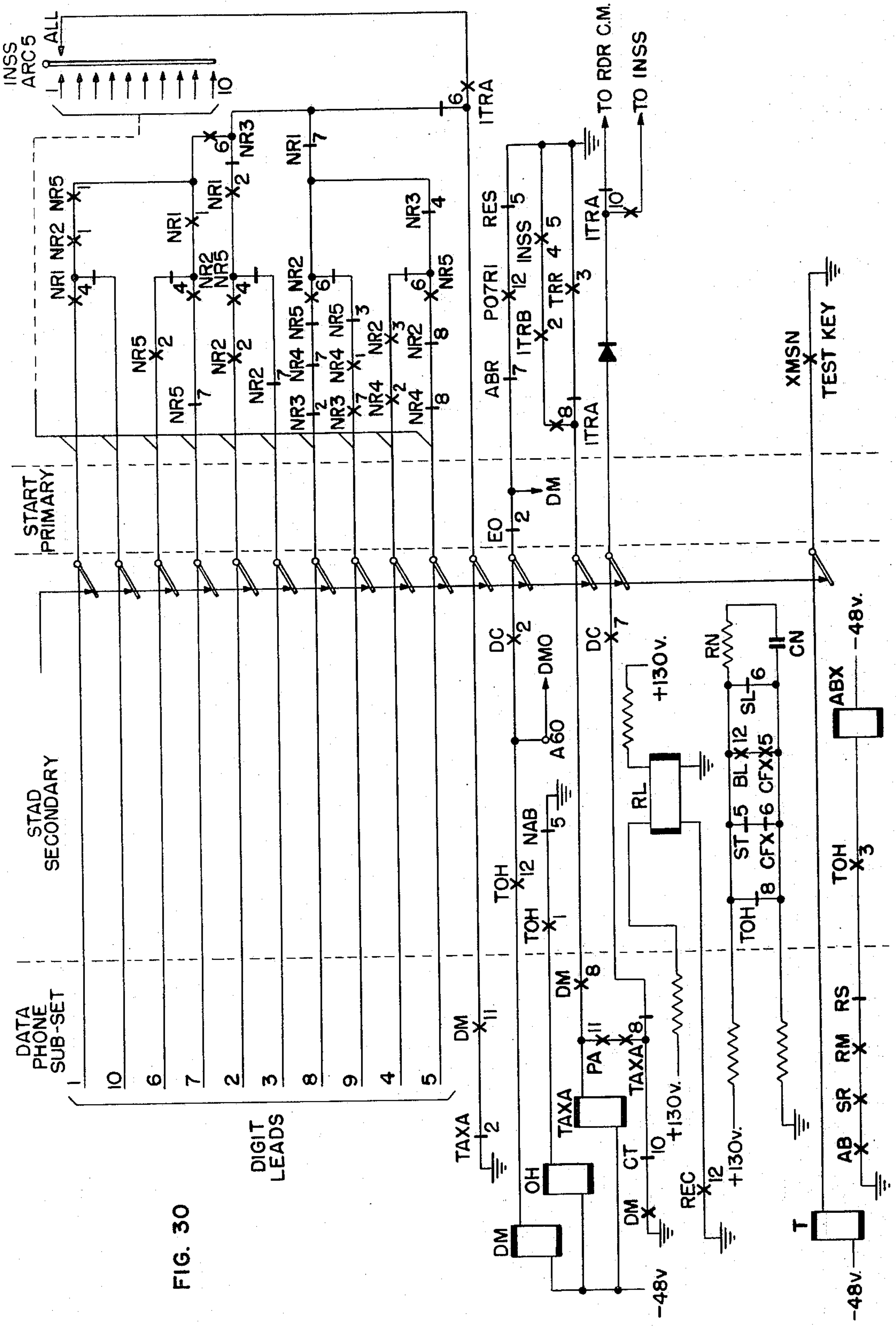
Figure 31:
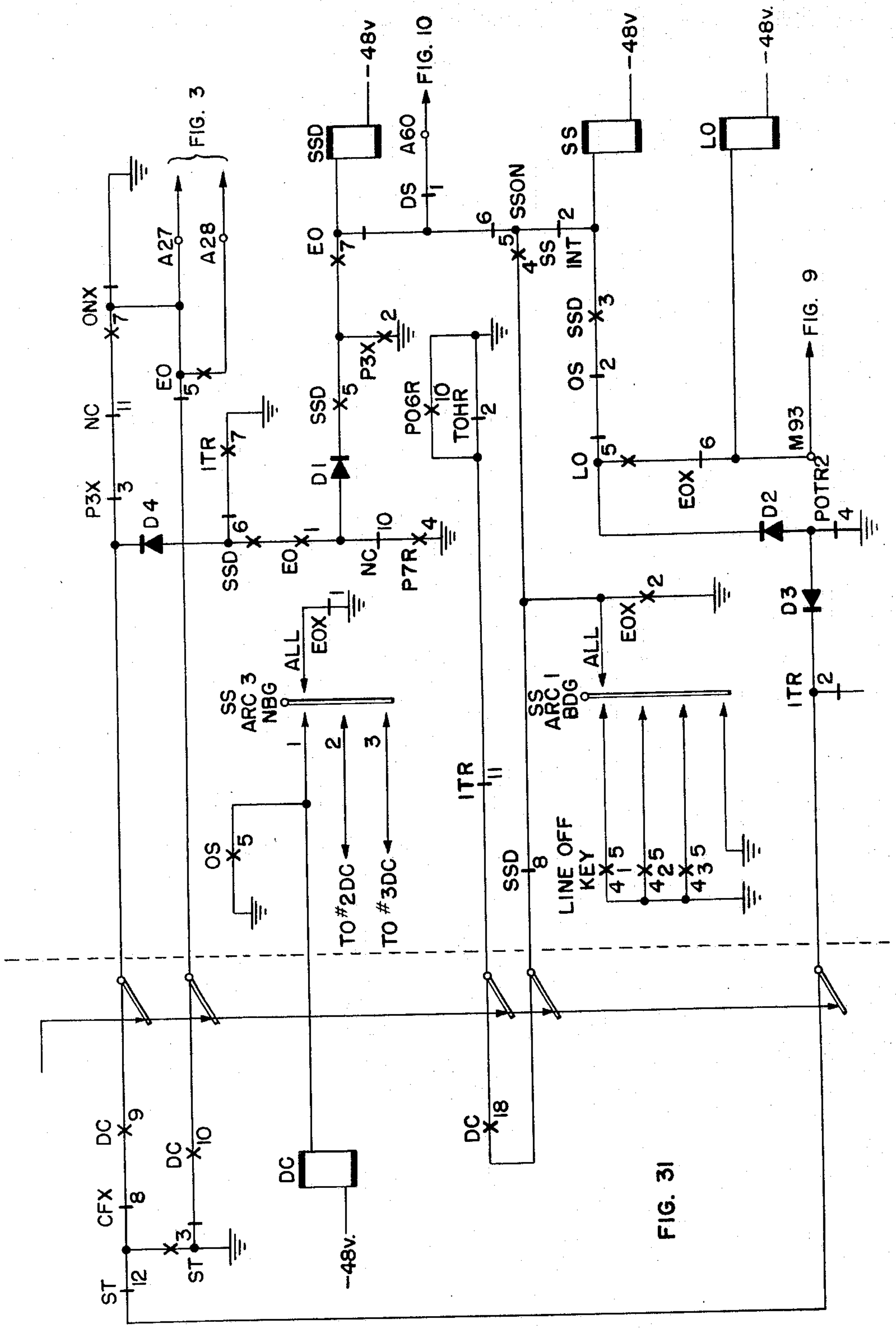
Figure 32:
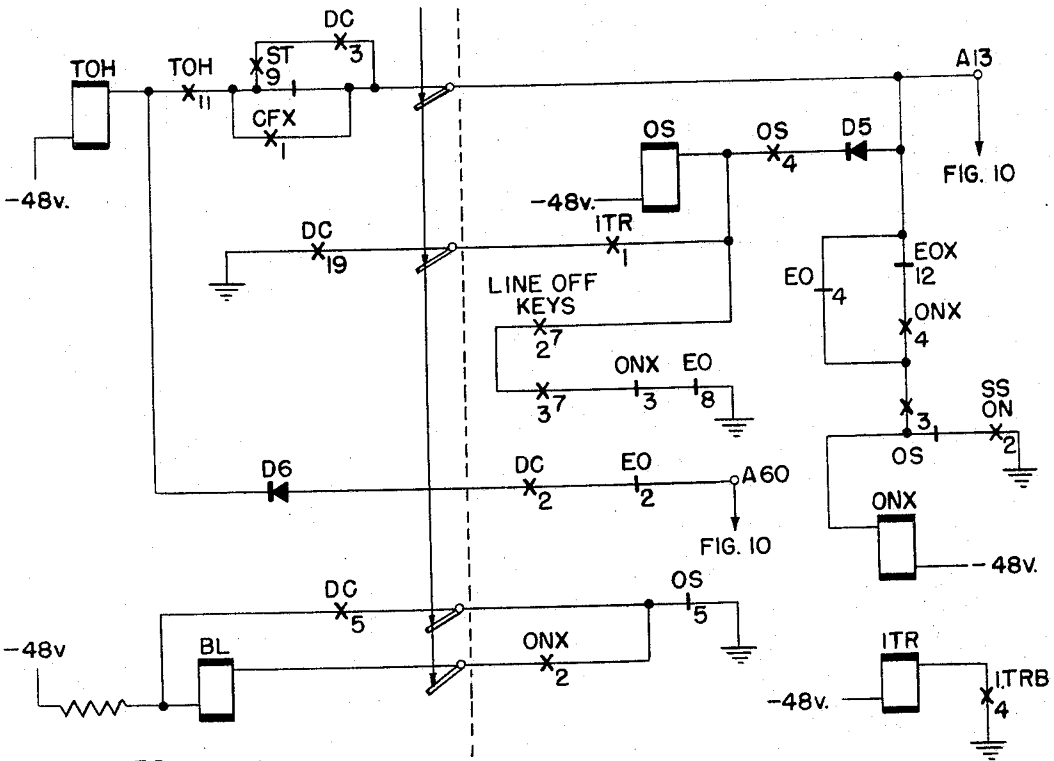
Figure 33:
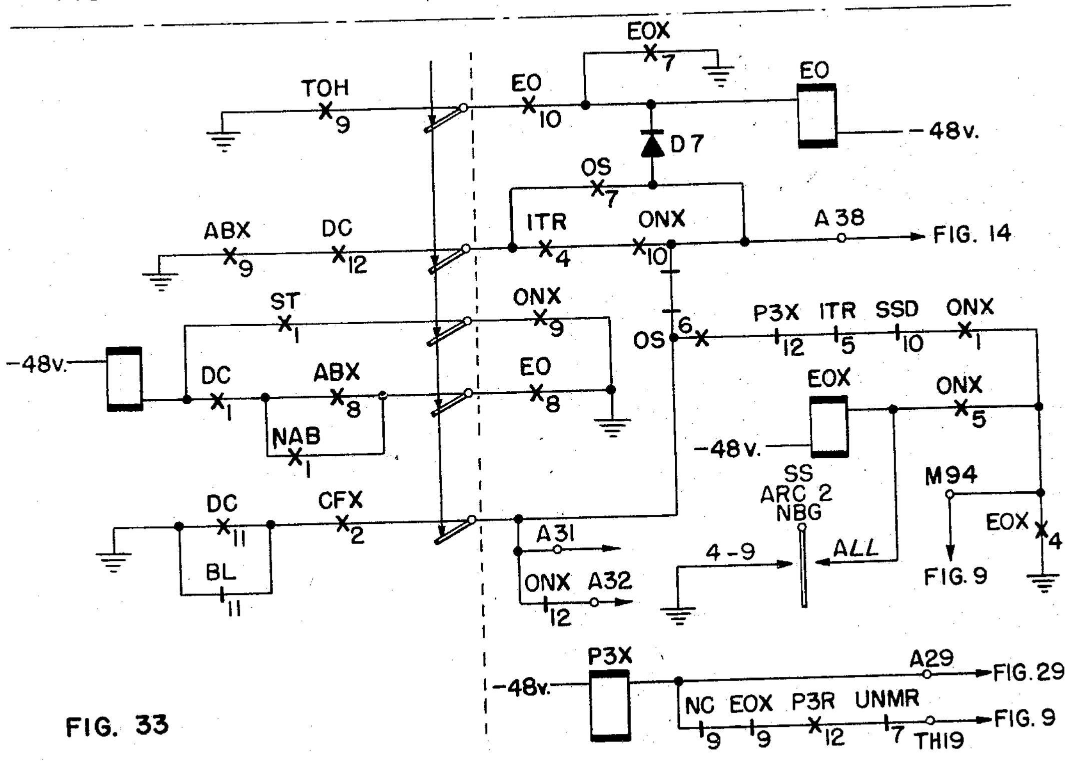
Figure 34:
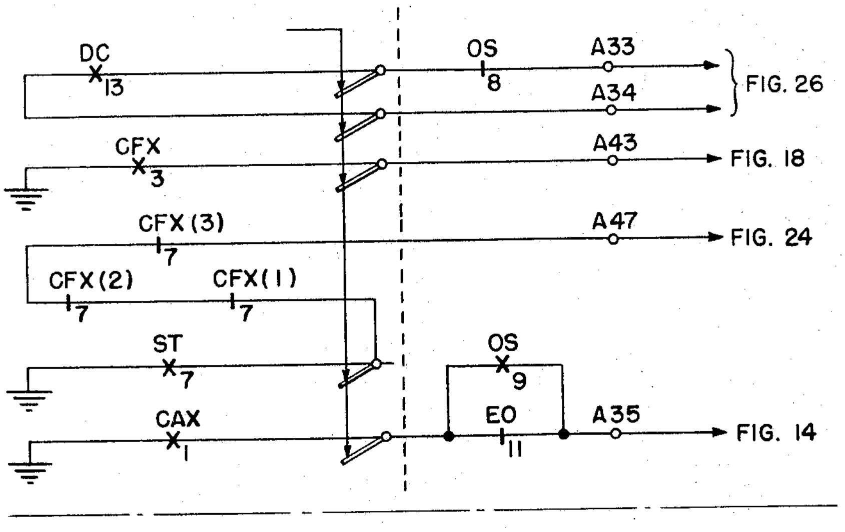
Figure 35:
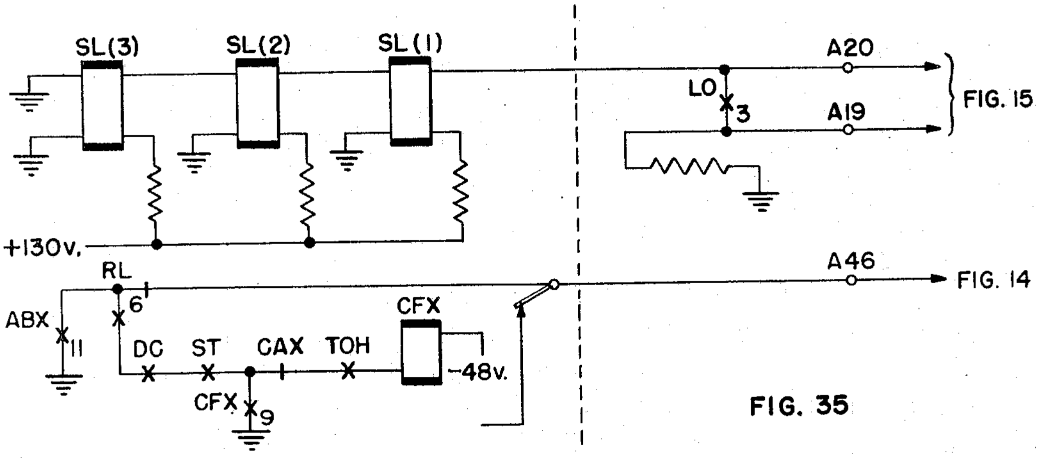
Figure 36:
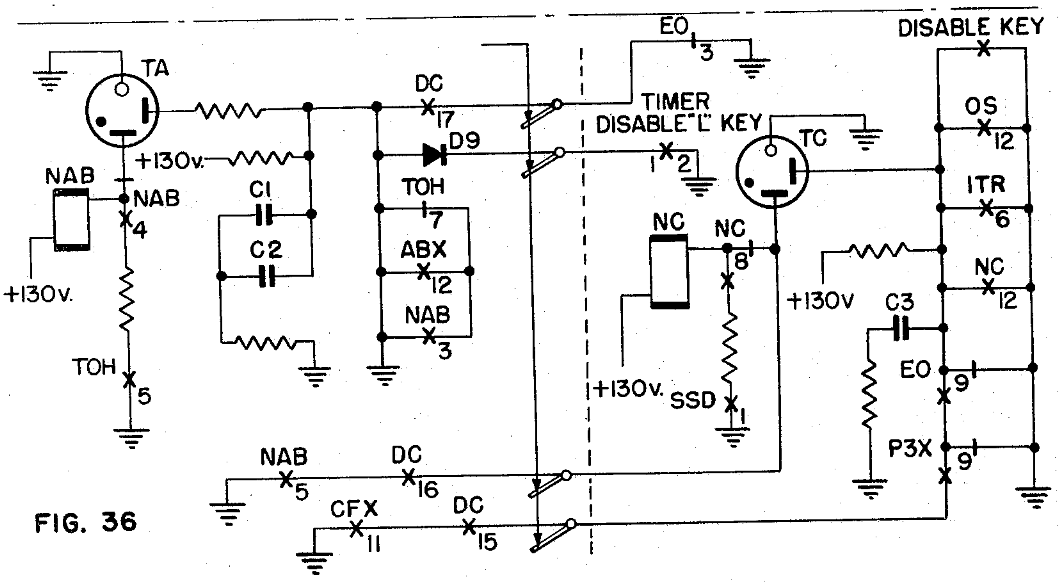

FIG. 3—Reader and distributor circuit
FIG. 4—Recognition relay circuit
FIG. 5—Recognition relay circuit (alarm)
FIG. 6—Run-out magnet circuit
FIG. 7—Tape clamp circuit
FIG. 8—Stop-run switch circuit
FIG. 9—Permutation relay circuit
FIG. 10—Transmitter off-hook circuit
FIG. 11—Reader and distributor contact circuit
FIG. 12—Intercept initiation circuit
FIG. 13—Lower notcher and line blind circuit
FIG. 14—Answer-back confirmation and circuit assurance
FIG. 15—Sending line circuit
FIG. 16—Tight-tape circuit
FIG. 17—Upper notcher circuit
FIG. 18—Pull-back and pull-forward relay circuit
FIG. 19—Pull-back magnet circuit
FIG. 20—Unsent DDD number memory circuit
FIG. 21—Trouble circuit
FIG. 22—Tape check circuit
FIG. 23—Monitoring circuit
FIG. 24—Timer relay circuit
FIG. 25—Alarm lamp and buzzer circuit
FIG. 26—Audible alarm control and system reset circuit
FIG. 27—Printer contacts
FIG. 28—Audible alarm circuit
FIG. 29—Translator circuit
FIG. 30—Subscribers set and transmitter interface showing the primary and one secondary circuit separated by a dot and dash line
FIG. 31—Reader control and data set selection
FIG. 32—Off-hook and single entry control
FIG. 33—End-of-address control
FIG. 34—"STAD" control and station functions
FIG. 35—Send line drive and confirmation circuit and
FIG. 36—Answer-back and confirmation timers circuits.

In the description of the circuitry the "detached contact" method of exposition used in Patent No. 2,722,675 granted to J. Michal et al. November 1, 1955, has been adopted for use herein, as was done in the copending application of Huffman et al. mentioned hereinbefore. In the "detached contact" method, relay contacts generally are not adjacent to their magnetic cores and windings but are separated or detached therefrom. For example, a core such as the core of an intercept transfer relay B shown on FIG. 12 is represented by a small rectangle and given a functional designation such as "ITRB." In the specification, the relay is referred to as "12–ITRB," where "12" indicates the figure number of the drawing on which the core is located and "ITRB" signifies the intercept transfer relay as the functional designation of the relay. On the drawing, each of the contacts controlled by the relay, and shown on the same figure with the winding, is given a designation, such for example as "ITRB–12," placed in proximity to the contacts, where the "ITRB" indicates that the contacts are controlled by the winding of relay "ITRB." In the specification the contacts may be referred to as "9–12–ITRB–5" where "9" indicates the figure number on the drawing on which the contacts are located, "12" indicates the figure number of the drawing on which the core is located, "ITRB" is the functional designation, and "5" is the contact number. If the contacts and core are on the same figure, only one figure number will precede the functional designation, e.g. 12–ITRB–12.

Contacts which are closed when the relay is de-energized, known as "break" contacts, are represented by a short line perpendicular to the line representing the conductor, while contacts which are closed when the relay is energized, known as "make contacts," are represented by two short crossed lines diagonally intersecting the conductor line. A "break" and "make" contact connected together on one side, in close proximity to each other and with the designation "C," indicate a set of "continuity" or "make-before-break" contacts. The contacts in the reader are designated in a manner similar to that used in designating relay contacts. Rotary selectors are shown with their operating coils and core illustrated in the same manner as the coils of relays and with interrupter and off-normal switches shown in the manner similar to that used in connection with the relays, whereas, the common brush or rotor of the switches is in each case designated "all" whereas the various contacts with which the rotor or brush will engage in stepping across the row of contacts associated with it are given reference numbers indicating that certain of the separate contacts in the particular row or arc are interconnected one to another, for example, in FIG. 11 the switch INSS–ARC–10 has its contacts 11, 15, 16, 18 and 20 interconnected or strapped together. These stepper switches are of the type which step their wipers or brushes when the operating magnet is released or deenergized. These switches open their interrupter contacts each time they are energized and close their off-normal contacts in all except the home or normal position. Similarly the normally open and normally closed contacts of keys or push buttons are shown in a manner similar to that used in designating relay contacts. The other circuit elements are shown in the conventional manner employed heretofore.

In some instances where the complete function of a circuit cannot be shown in a single figure due to the fact that there is an interaction between its functional operation and the functional operation of other portions of the apparatus a terminal may be shown by a very small circle with a reference numeral indicating the figure on which the continuation of this circuit may be presented.

Since in many instances, the detached contact method of exposition result in a drawing where the circuit elements have no apparent physical connection one with the other, it is to be assumed that all of the subject matter appearing within the confines of a single sheet of patent drawing constitutes a single patent figure unless otherwise indicated. When the subject matter on a sheet of patent drawing includes more than one figure, the subject matter of each figure will be identified by a separate figure number.

GENERAL DESCRIPTION

An understanding of the present invention will be facilitated by the following brief description of the system to which the present invention pertains.

Figure 1:
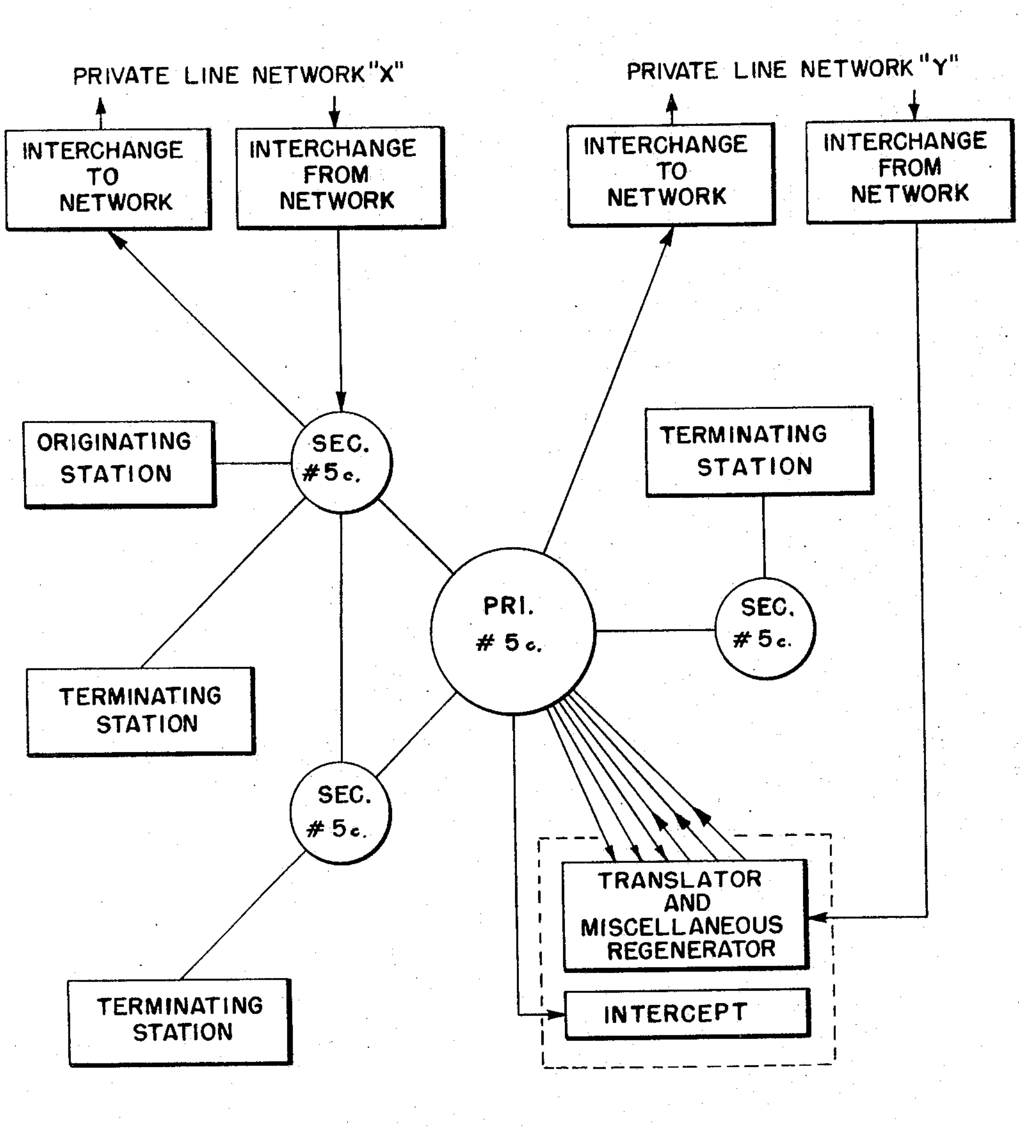
FIG. 1 is a block diagram of a system to which the present invention pertains.

The system, to which the invention pertains, utilizes what is known as "line" switching, that is, the type of switching that completes a connection through one or more exchanges to a called station from an originating station and then transmits the message to the called station designated on FIG. 1 as "Terminating Station." Thus the system is to be distinguished from the type of telegraph switching network wherein a "message" is transmitted from an originating station to a central exchange or communication center where it is recorded and retransmitted to a called or terminating station. The system is also designed to use the telephone switching network by so converting the message to be transmitted that it can be sent over a telephone switching network.

The block designated "Originating Station," is connected directly into a telephone exchange known as a secondary No. 5 crossbar switching exchange. If the message to be transmitted by the originating station is one which is to be directed to a distant area the connection to the terminating station may be completed through another telephone exchange designated "PRI No. 5" which is a primary exchange connected by trunk groups with other primary or secondary exchanges in the telephone system, in a direct dialing network.

If the message to be transmitted by the originating station is directed to a terminating station within the same telephone exchange then the message will be transmitted only through the secondary No. 5 telephone switching exchange office indicated by the circle at the upper left portion of the figure and designated "SEC No. 5C." This message will then be directed through the single secondary exchange to the terminating station connected into the same exchange. However, if the message to be transmitted by the originating station is directed to a terminating station such as that shown toward the lower left portion of FIG. 1, which terminating station is in the same local area as the originating station, the connection may be made through the first No. 5 secondary exchange to the second described No. 5 secondary exchange and to the terminating station without the necessity of going through one of the primary exchanges of the No. 5 type for transmission over a direct distance dialing type of network.

In the event that the originating station desires to transmit a message to a terminating station such as that shown at the right-hand side of the drawing, which is in a distant area, then the message will be transmitted from the originating station through the first No. 5 secondary switching exchange into the primary No. 5 switching exchange and over a trunk group to the secondary No. 5 switching exchange shown adjacent the terminating station at the right-hand side of the drawing.

In the event that it is desired to transmit messages to private line networks, such as the network shown schematically at the upper portion of the drawing and designated network X or to a private line network of a different type and shown as a private line network Y, two different types of procedures must be followed. If the message is to go to a private line network such as the one shown for network X, wherein there is provided a terminating station of the type used on this system but the network does not utilize the present system except to receive from and transmit to the present system, then the message may go through one or more secondary and one or more primary No. 5 telephone switching exchanges to an interchange of the network X where a terminating station will be provided of the type used on this system. Since the private line network X, is not a network of the type covered by this application, its stations could not be called directly by stations on the system being described herein and would always call the same direct distance dialing telephone number whenever it wanted to reach the system being described herein. A message originating at the interchange from network X would thus be directed through one or more secondary and primary telephone exchanges to a communication center such as that indicated within the dash lines in the lower portion of FIG. 1 and the mnemonic code for the called station on the present system would be translated in the mechanism designated "Translator and Miscellaneous Regenerator" to enter an address into the present system which address would include the direct distance dialing telephone number of the terminating station on this system. This address would then be directed back through the primary telephone exchange for transmission to the called terminating station.

Some of the private line networks such as the private line network Y could receive messages from the present system if its interchange to its private line were equipped with a terminating station of the type used on the present system and it could, over a direct wire connection, transmit a message wherein the address of the desired called station on the present network would appear only in the form of the mnemonic code. This message could be sent over the private wire to the translator and miscellaneous regenerator where the translation of the mnemonic code into both direct distance dialing and mnemonic code perforations could be effected.

The group of three leads from the primary No. 5 switching telephone exchange to the translator and the group of three leads directed from the translator back to the primary exchange are indicative of a plurality of connections which may be utilized where, for example, network X transmits from its interchange either directly or through a secondary switching exchange and utilize a single telephone direct distance dialing number which is assigned to the translator, to send messages to the translator which bear one DDD number but which may bear any one of a number of mnemonic codes indicating the particular terminating stations which it is desired to transmit to. On the contrary, since interchange from network Y does not have such mechanism, it may send its mnemonic code into the translator over a private line for translation into the type message address code that the present system will handle.

At the communication center indicated within the dash lines in the lower right-hand corner of FIG. 1, as disclosed in detail in the copending application of G. A. Locke, Serial No. 224,720, filed September 19, 1962, there is also provided an intercept apparatus which is designed to receive messages that could not be sent by an originating station due to the failure of the originating station in three attempts to make a direct connection with a called terminating station. This intercept apparatus is equipped with devices for receiving such messages and attempting a number of times to complete a connection to the desired called terminating station and upon failure to make such a connection to alarm so that an operator may take other steps to transmit the message to the terminating station.

A tape, as perforated in the manner described in said copending application of D. E. Huffman et al., is directed to the message processing portion of the apparatus to control the transmission of the messages to the stations which have been selected to receive it. The 0, 6, 7, and 8 levels of the tape as read by the reader are fed into logic circuitry which analyzes the coding of these levels and controls the setting up of circuitry for telling the transmitter distributor to perform certain functions such as to pierce the tape at either of two selected levels, to pull the tape back, etc. The reader also transmits the direct-distance-dialing (DDD) number in five-wire parallel circuitry to a translator which translates the DDD number from the five-unit code into a one out of ten code for sending it to a Data-type telephone set which will then transmit this information to the telephone facilities. The distributor will also feed the printer at the originating station to monitor the message being transmitted. It is to be understood that the details of all the circuit logic described generally herein will be described in detail hereinafter.

THE TAPE

Figure 2:
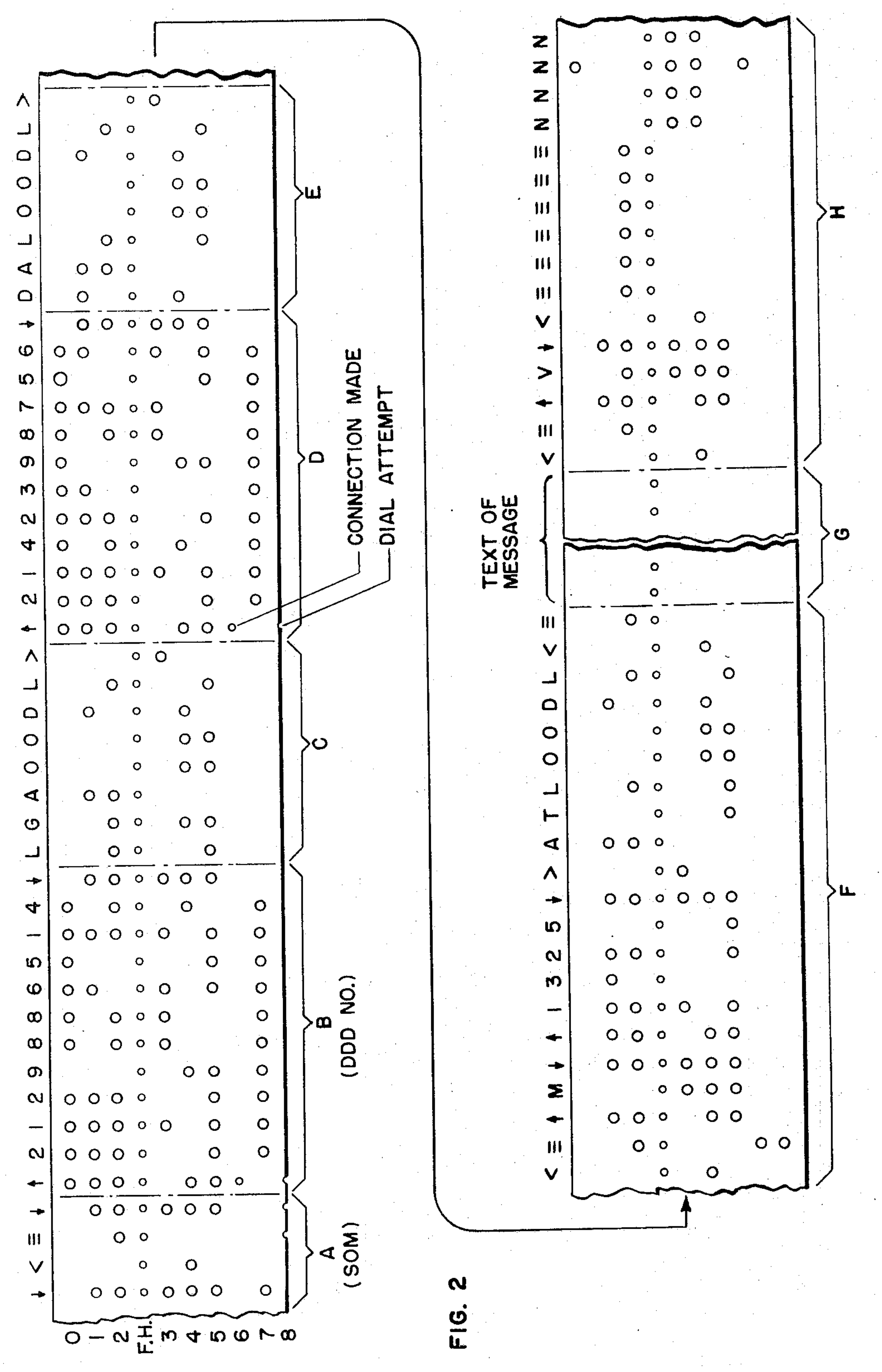
FIG. 2 is a view showing a sample of a perforated tape of the type used to control the transmission of messages in this system.

A sample tape is shown in FIG. 2 where, in the bracketed area designated by the letter A, there is shown the code of characters for a start-of-message combination. This combination comprises "LETTERS, CARRIAGE RETURN, LINE FEED, LETTERS." This start-of-message combination is followed by an address of a terminating station on the present system which address comprises the Baudot code for "figures," the ten digits representing the direct-distance-dialing telephone number assigned, in the telephone system, to the called terminating station plus control holes in the "0" and seventh levels, and the code for "Letters" also in Baudot code enclosed in bracket B. This is followed by the mnemonic code, enclosed in bracket C, for the called terminating station. In the example shown the tape is perforated in the area B with the figures code followed by the digits 2, 1, 2, 9, 8, 8, 6, 5, 1, 4, which may be assumed to be the direct-distance-dialing telephone number for the terminating station on Delta Air Lines at LaGuardia Field Operations Office as indicated by the mnemonic code of characters comprising L G A O O D L which in the memory system reads "LaGuardia Operations Office Delta Air Lines."

If the message is to be transmitted to a number of stations, for example five stations, the addresses of the other terminating stations that are to receive the message may follow in succession as illustrated by the codes bracketed under D and E which codes again follow the same pattern as the codes bracketed under B and C with the exception that the direct-distance-dialing telephone number is different and the mnemonic code for the second called station is, for example, D A L O O D L, indicating that telephone number is associated with the Dallas, Texas Operations Office Delta Air Lines.

In the event that the message is to be sent to subscribers not on the present system, the tape may be perforated with the address of stations having access to the present system and to a message switching system and also perforated with the mnemonic code for the stations on the message switching system.

As soon as the addresses of all of the stations to which the message is to be sent have thus been perforated in the tape, by mechanism such as that shown in the aforementioned application of D. E. Huffman et al., a combination indicating the end of addresses is perforated in the tape. This sequence is illustrated in FIG. 2 in the portion bracketed at "F" and comprises the code for "CARRIAGE RETURN, LINE FEED, FIGURES, M. LETTERS," this is the usual signal combination for end of address and is followed by "FIGURES, TIME OF DAY, LETTERS AND MNEMONIC CODE FOR ORIGINATING STATION, CARRIAGE RETURN, and LINE FEED."

The text of the message may then be perforated in the tape, either under control of the keyboard or under control of a Codomat card as indicated at G.

After the text of the message has been punched in the tape, a code sequence combination is perforated to indicate that the message is complete. This code is indicated, as bracketed, at H and comprises the code combinations for "CARRIAGE RETURN," six codes for "LINE FEED," and the code for "N" four times. The code for "N" sent four times in succession comprises the usual code for end of message.

The sixth and eighth levels of the tape are used to indicate the attempt to effect a connection to a called station and the success or failure of such attempt and these perforations or notches in the tape are effected in the reader portion of the apparatus. Each time an attempt is made to make a connection to a called station the lower notch or eighth level of the tape has a perforation or notch made in it which is along the edge of the tape. For example, as illustrated in the area bracketed A and in the beginning of the portion bracketed B there are three notches in the eighth level indicating that three attempts have been made to complete a connection to a called station. The perforation in the sixth level in line with the figures code combination indicates that this connection was made on the third attempt or that on a fourth attempt, was completed to an intercept station. In similar manner in the portion of the tape bracketed D in FIG. 2 one dialing attempt was successful and a connection was made as indicated by the notch in the eighth level and in the sixth level in alignment with the figures code combination. These notches are made under control of upper and lower notching magnets provided in the reader and the tape may be pulled back to a taut condition upon operation of a pullback magnet. These structural details are completely shown in the copending application of D. E. Huffman et al. referred to hereinbefore.

MESSAGE PROCESSING

1. *Start-of-message processing operation*

After a tape such as that shown in FIG. 2 has been prepared it may be entered into a reader such as that diagramatically illustrated in FIG. 11. With the tape in the reader a transmitter control switch 3–TRANS.SW is now manually set in Position 1, which is the position for normal operation of the message processing apparatus. With the tape thus positioned in the apparatus, a stop-run-tight-tape switch 8–SRTTS is moved to the run position. Closure of this circuit will complete a path from ground (FIG. 8) through the closed make contacts of switch 8–SRTTS through the winding of relay 8–SRR to —48 volt D.C. source. Upon the energization of relay 8–SRR a circuit will be completed to initiate a cycle of operation of the reader by energizing the reader clutch magnet 3–RCM in a path from ground (FIG. 31) through the now closed, normally closed off-normal break contacts 31–ONX–7, terminal A–27 on FIGS. 31 and 3, now closed break contacts 3–9–P07R1–8, now closed make contact 3–8–SRR–12, the interrupter contact of a lower notch stepper switch 3–13–LNSS–INT, now closed break contacts 3–24–TOTR–9 of a torn-tape relay, the now closed break contacts of permutation relays 3–12–P06R–5, 3–9–P67R–5, 3–9–P7R–8, 3–9–P07R2–5, now closed break contacts of recognition relay 3–4–R8B–2, intercept distributor relay contacts 3–12–IDSR–7, intercept transfer relay A contacts 3–12–ITRA–5, circuit assurance relay contacts 3–14–CAR–4, reset relay contacts 3–26–RES–6, sending alarm relay A contacts 3–26–SALA–7 and sending alarm relay B contacts 3–26–SALB–5, pull-forward relay contacts 3–18–PFR–4, intercept transfer relay A contacts 3–12–ITRA–4, through contacts 3–PSR–10 in the receiving set which are opened whenever the printer at the originating station is receiving a message from another originating station, the winding of the reader clutch magnet 3–RCM to the —48 volt D.C. source in FIG. 3. Upon being energized the reader clutch magnet 3–RCM will cause the reader to go through successive cycles to feed out a length of tape until the reader, in going through these successive cycles, reads the control hole in the seventh level of the tape at the beginning of the start-of-message code sequence.

As soon as the seventh level control hole is sensed by the reader, the recognition relay for the seventh hole 4–R7 will be energized over a path from ground (FIG. 4)

through terminal MD–147 (FIGS. 4 and 11) through the closed reader contact 7 in FIG. 11, terminal MD–188 (FIGS. 11 and 4) through the windings of the recognition relay for the seventh hole 4–R7 to −48 volt D.C. source (FIG. 4). Simultaneously with the energization of relay 4–R7, relay 4–LUR, which serves as a line unblinding relay, will be energized in a path from the terminal MD–188 through diode 4–D–14 and winding of the relay 4–LUR to −48 volt D.C. source in FIG. 4. When relay 4–R7 is energized, it will release a relay 9–PNR which is a relay that recognizes the absence of any control holes in the tape and which had been energized in a circuit from ground at FIG. 9 through contacts 9–26–RES–7 which are break contacts of a reset relay 26–RES and through the closed break contact 9–3–AUX–B, diode D–17, closed break contact of recognition relay for the zero hole 9–4–RO–6, closed break contacts 9–4–R6–10, through the winding of the relay 9–PNR to −48 volt D.C. source in FIG. 9. This permutation none relay 9–PNR has been energized and was locked energized over its own contacts 9–PNR–3 and the break contacts of recognition relays 9–4–R8A–8, 9–4–RO–8, 9–4–R7–7, and 9–4–R6–7. The energization of relay 4–R7 will thus open its contacts 9–4–R7–7 to break the circuit to the permutation none relay 9–PNR. When the line unblinding relay 4–LUR is energized, it will close its contacts 13–4–LUR–3 to shunt the line unblinding relay B, 13–LURB.

As the reader returns to its normal position at the end of its cycle, it closes its contacts 9–AUX–B to complete a path for the energization of permutation 7 relay 9–P7R in a circuit from ground (FIG. 9) through now closed break contact 9–26–RES–7, reader contacts 9–AUX–B, diode D–17, now closed make contacts 9–4–R7–4, break contacts 9–4–RO–4, break contacts 9–4–R6–6 and through the winding of relay 9–P7R to −48 volt D.C. source in FIG. 9. As soon as permutation 7 relay 9–P7R is energized, it will lock energized in a path from ground (FIG. 9) through reset relay break contacts 9–26–RES–7, break contacts of the pull-back and permutation relays 9–PO68R–10, 9–18–PBRB–10, 9–PO7R1–4, 9–POR–4, 9–P67R–4, and its own locking contact 9–P7R–10 now closed, through the winding of the relay 9–P7R to −48 volt D.C. source (FIG. 9). The operation of relay 9–P7R will open its break contacts 3–9–P7R–8 thus to open the previously established energizing path for the reader clutch magnet 3–RCM. The energization of the permutation relay 9–P7R will close a circuit through its make contacts 6–9–P7R–6 to energize the run-out magnet 6–ROM in a path from ground (FIG. 31) through now closed break contacts 31–32–ONX–7, through now closed break contacts 3–9–PO7R1–8, the now closed make contacts 3–8–SRR–12, 3–13–LNSS–INT, break contacts of torn-tape relay 3–24–TOTR–9, diode D–10, terminal TK–10 (FIGS. 6 and 3) through now closed break contact 6–7–TCR–5 of a tape clamp relay and now closed contact 6–9–P7R–6 through the winding of the run-out magnet 6–ROM to the −48 volt D.C. source (FIG. 6).

2. *Tape pull forward operation*

From the foregoing it is believed to be apparent that, through the circuitry just described, the run-out magnet 6–ROM will be energized to pull the tape forward at the start-of-message sequence when the seventh control hole in the tape is sensed and the tape will be pulled forward until it becomes taut between the reader feed wheel and the pull-forward feed wheel as described in the aforementioned application of D. E. Huffman et al. This will cause the closing of the tight-tape contact 16–TTS to energize the tight-tape relay 16–TTR from ground through the switch 16–TTS and winding of relay 16–TTR to the −48 volt D.C. source in FIG. 16. When relay 16–TTR is thus operated with the permutation relay 9–P7R, operated, a circuit will be completed from ground FIG. 7 through now closed make contacts 7–16–TTR–12 and 7–9–P7R–2 through the winding of relay 7–TCR to −48 volt D.C. source in FIG. 31 to operate tape clamp relay 7–TCR which will lock through its own contacts 7–TCR–2 and the transmitter switch in normal or No. 1 position and the now closed break contacts of the pull-forward relay 7–18–PFR–5, terminal TH–19 in FIGS. 7 and 9 and break contacts 9–26–RES–7 which are now closed, to ground (FIG. 9.)

When the tape clamp relay 7–TCR is energized, it will complete a circuit to operate the reader clutch magnet 3–RCM from ground in FIG. 3 over the same path as was described in connection with the establishment of the original circuit to the reader clutch magnet 3–RCM that was opened upon the energization of relay 9–P7R since the contacts 3–7–TCR–10 bridge the now opened contacts 3–9–P7R–8. This will cause the reader clutch magnet 3–RCM to be energized to initiate a reading cycle of the reader. The energization of the tape clamp relay 7–TCR will also break the circuit to the run-out magnet 6–ROM by opening its break contacts 6–7–TCR–5. As was described in connection with mechanical features of the copending application referred to hereinbefore, the release of magnet 6–ROM will clamp the tape.

3. *Dialing operation*

With the reader clutch magnet 3–RCM held energized, the reader will go through repeated cycles of operation, without transmitting any of the information perforated in the tape as the start-of-message code format, until the reader detects the presence of a perforation in the "0" level of the tape. As the reader goes through its repeated cycles, its auxiliary contacts 13–AUX–A and 9–AUX–B are operated on every revolution of the reader shaft. As soon as the reader feeds the tape forward one step the tight-tape switch 16–TTS will re-open to de-energize the relay 16–TTR. On the first sensing cycle of the reader, the absence of the perforation at the seventh level will prevent the re-energization of relays 4–R7 and 4–LUR since the reader contact 7 in FIG. 11 will not be closed. As soon as the tape has advanced far enough for the first digit of the direct distance dialing number, as shown enclosed in the bracket B on FIG. 2, to reach a point where the sensing pins in the reader detect the presence of a perforation in the zero control hole, which precedes the start of the direct distance dialing numbers and is aligned with the figures code, a circuit will be completed from ground in FIG. 3 through the now closed break contact of the manual resend key 3–MR–3, terminal MD–146 on FIGS. 3 and 11 through the closed reader contact for "0," terminal MD–190 on FIGS. 4 and 11 through the winding of recognition relay for the "0" hole R–RO, to the −48 volt D.C. source in FIG. 4. The circuit will also be completed from the terminal MD–190 (FIG. 4) through diode 4–D–13 and winding of relay 4–LUR to the −48 volt D.C. source in FIG. 4 thereby simultaneously to pull up the relays 4–RO and 4–LUR. Relay 4–RO in operating will open its break contacts 9–4–RO–8 to release the permutation none relay 9–PNR.

When the reader, in its cycle of operation wherein it senses the figures code, plus the "0" control hole in the tape, arrives at the point where it closes its contacts 9–AUX–B, a circuit will be completed from ground in FIG. 9 through now closed break contacts 9–26–RES–7, now closed contacts 9–AUX–B, diode 9–D–17, now closed break contacts 9–4–R7–4, now closed make contacts 9–4–RO–6, now closed break contacts 9–4–R6–8, diode 9–D–23, now closed break contact 9–P068R–5 the winding of the relay 9–P0R to −48 volt D.C. source in FIG. 9. A branch circuit will also be completed over the path from diode 9–D–23 through the now closed break contacts 9–R068R–5 and through diode 9–D–27, and now closed break contacts 9–12–ITRB–5 of the intercept transfer relay B; and through the winding of the line shunt relay 9–LSR to −48 volt D.C. source (FIG. 9) thus to energize the relay 9–LSR simultaneously with the relay 9–POR. The energization of relay 9–POR will also break the locking path to the relay 9–P7R by opening its break contacts 9–POR–4. When the relay 9–POR is energized it will lock up through its own contact in a path from ground in FIG. 9 through break contacts 9–26–RES–7, now closed break contacts 9–P068R–10 and 9–18–PBRB–10, diode 9–D–24, now closed break contacts 9–P07R2–7, now closed make contacts 9–POR–6, now closed break contact 9–P068R–5 through the winding of the relay 9–POR to the −48 volt D.C. source in FIG. 9. This locking path for the relay 9–POR will also maintain the relay 9–LSR energized.

On this cycle of operation of the reader, the closure of the reader contacts 13–AUX–A will complete a circuit from ground (FIG. 13) through the closed make contacts 13–AUX–A, now closed break contacts 13–12–ITRB–6, now closed make contacts 13–9–POR–12, diode 13–D–33, now closed break contact 13–9–P068R–8, now closed break contact 13–33–E0–12, now closed break contact 13–16–UNMR–10, through the winding of the lower notch stepper switch magnet 13–LNSS to –48 volt D.C. source in FIG. 13. The closure of the auxiliary contact 13–AUX–A will also complete a circuit from ground (FIG. 13) through the closed auxiliary contact 13–AUX–A, now closed break contact 13–12–ITRB–6, now closed make contact 13–9–LSR–4, diode 13–D–34 and through the winding of the magnet 13–LBR to −48 volt D.C. source in FIG. 13. When at a later time in the cycle of the reader, the contact 13–AUX–A re-opens, the lower notch stepping switch 13–LNSS will be released and will step its wipers from the normal number 11 position to Position 1. The operation of relay 13–LBR, which is the line blinding relay, in cooperation with the previously energized line unblinding relay 13–LUR, will close a path to shunt the distributor contacts shown in FIG. 11 by closing their make contact 11–13–LBR–12 and 11–13–LUR–8 to prevent the feeding to the sending line relay 11–SLR, of signals which may be read by the reader contacts in FIG. 11 during the time that the digits of the direct distance dialing number are being fed into the subscriber subset forming part of the telephone equipment which completes the connection through the No. 5 crossbar exchanges to the called stations.

The circuit operations just described have all taken place during the cycle of operation of the reader when the reader detected the presence in the tape of the figures code plus a perforation in the "0" level of the tape. The circuit to the reader clutch magnet 3–RCM, however, has not been broken and the reader will thus go through another cycle, at which time it will sense the first digit of the direct distance dialing number that, in the example of the tape shown in FIG. 2, is the digit 2 plus the "0" and seventh level perforations. When the reader senses this code combination, the relay 4–RO will have remained locked up from the previous sensing of the "0" control hole in connection with the figures shift code which preceded the first digit of the direct distance dialing number. When the reader is in its stop position, that is, at the end of its cycle, its auxiliary contact 33–AUX–B will be closed and consequently, when the sensing pins on the cycle of the reader wherein the reader is reading the first digit of the direct distance dialing number, sense the tape and find in the tape perforations in the "0" and seventh levels and will cause the relay 4–RO to remain energized and will cause the energization of relay 4–R7. The circuit for energizing the relays 4–RO and 4–R7 under control of the transmitter reader sensing contacts will be the same as described hereinbefore.

With the relays 4–R0 and 4–R7 energized, a circuit will be completed from ground in FIG. 9 through the now closed break contacts 9–26–RES–7, now closed make contacts 9–AUX–B, diode 9–D–17, now closed make contacts 9–4–R7–4, through the now closed make contact 9–4–R0–4, now closed break contact 9–4–R6–4 and through now closed break contact 9–P068R–6 through the winding of relay 9–P07R22 to the −48 volt D.C. source in FIG. 9. A branch circuit is also established from the now closed break contact 9–4R6–4 and now closed make contact 9–4–R7–2 and now closed break contact 9–R068R–4 through the winding of relay 9–P07R1 and to the −48 volt D.C. source (FIG. 9). This will cause the energization of the permutation relays 9–P07R2 and 9–P07R1. A locking path will be established for the permutation relay 9–P07R1 in a path from ground (FIG. 9) through now closed break contact 9–26–RES–7, now closed make contact 9–4–LUR–9, now closed break contact 9–12–ITRA–11, now closed make contact 9–P07R1–2, now closed break contact 9–P068R–4, the winding of relay 9–P07R1 to −48 volt D.C. source (FIG. 9).

The energization of relay 9–P07R1 will cause the energization of the transfer shift relay 10–TSR in a circuit path from ground (FIG. 25), the now closed break contact 25–26–RES–5, terminal TH–12 on FIGS. 25 and 10, through closed make contacts 10–9–P07R1–12, now closed break contacts 10–14–ABR–7, diode 10–D–26, winding of relay 10–TSR to the −48 volt D.C. source in FIG. 10. This circuit extending from terminal TH–12 in FIG. 10 will also be closed by the energization of relay 9–P07R1 in closing its make contacts 10–9–P07R1–3 and now closed contacts 10–26–SALA–5 of sending alarm relay A, and through the winding of relay 10–TOHR to −48 volt D.C. source (FIG. 10). When relay 10–TOHR is energized it will lock operated in a path from ground (FIG. 25) closed break contacts 25–26–RES–5, terminal TH–12 on FIGS. 10 and 25, now closed break contacts 10–9–PNR–8, make contacts 10–TOHR–12, break contacts 10–24–TORA–5, break contacts 10–26–SALA–5, winding of relay 10–TOHR to −48 volt D.C. source in FIG. 10.

Upon being energized the relay 9–P07R1 will also complete an operating path for the energization of the unsent direct distance dialing number relay 20–UDR in a circuit path from ground in FIG. 20 through the now closed break contact 20–21–STC–1, now closed break contact 20–9–P068R–7, now closed make contact 20–9–P07R1–1, through the winding of the relay 20–UDR to −48 volt D.C. source in FIG. 20. The previously described energizing circuit for the reader clutch magnet 3–RCM to ground in FIG. 3 will be broken by the energization of relay 9–P07R1 in operating its transfer contacts 3–9–P07R1–8 to open the break contacts and close the make contacts of this set of transfer contacts. By closing make contact 3–9–P07R1–8 the reader clutch magnet 3–RCM will be placed under control of the subscribers set shown enclosed in dotted lines in FIG. 3. Therefore, the next pulse to operate the reader clutch magnet 3–RCM must come from the subscriber's set which will respond upon receiving a digit of the address code of the called telephone subscriber, to energize the reader clutch magnet 3–RCM and call for the next digit to be read by the reader.

The momentary operation of relay 9–P07R2 opened the holding path which had been established to permutation "0" relay 9–POR by opening its break contacts 9–P07R2–7. The operation of relay 10–TSR as a consequence of the operation of relay 9–P07R1, will lock relay 10–TSR operated in a path from ground (FIG. 25) through the now closed break contact 25–26–RES–5, terminal TH–12 on FIGS. 25 and 10 and then through now closed break contacts 10–29–P3R–7 of the permutation "3" relay, now closed break contacts 10–18–PBRA–7, make contacts 10–TSR–12 and the winding of relay 10–TSR to −48 volt D.C. source in FIG. 10. The energization of this relay 10–TSR will place a series of numbering relays 11–NR–1 to 11–NR–5, shown on FIG. 11, under control of the reader contacts 1 to 5, respectively, also shown on FIG. 11. Consequently, the sensing of the tape by the reader will connect ground (FIG. 11)

through any of the reader contacts 1, 2, 3, 4 or 5 that are closed by their associated sensing pins, then through make contacts 11–10–TSR–4, 11–10–TSR–6, 11–10–TSR–8, 11–10–TSR–10, 11–10–TSR–2, to the windings of the relays in 11–NR1, 11–NR2, 11–NR3, 11–NR4, 11–NR5, respectively, the other side of the windings of all these relays being connected to the —48 volt D.C. source in FIG. 11.

By reference to FIG. 29 it will be seen that the permutative operation of the relays 11–NR1 to 11–NR5 will translate a digit as represented by code perforations in the tape, into any one of ten separate leads representative of the digits 1–9 and 0. For example, as illustrated in FIG. 2 the first digit of the direct distance dialing number to be transmitted by the reader to the subscriber set is the digit 2 which in the Baudot code is "marking" in the 1, 2 and 5 levels. Consequently, the reader in reading the Baudot code for the digit 2 in the tape will cause the energization of relays 11–NR1, 11–NR2 and 11–NR5. These three relays will thus close their make contacts 29–11–NR1–2, 29–11–NR5–4 and 29–11–NR2–2 to complete a circuit from ground through break contacts 29–TAXA–2 and make contacts 29–DM–11 in the subscriber's set, through now closed break contacts 29–12–ITRA–6, 29–11–NR4–4 and 29–11–NR3–6, make contacts 29–11–NR1–2, 29–11–NR5–4 and 29–11–NR2–2 to energize a single lead representative of the digit 2 leading to the subset thereby to cause the subscriber's set to, in effect, dial the digit 2. The source of ground in the subscriber's set cannot reach any other of the digital leads 1, 3 to 9 and 0, leading to the subset since, as may be best seen in FIG. 29, the leads to the digits 1, 0, 6 and 7 are open at the now open make contact 29–11–NR3–6, the lead to the 3 digit is broken at now open break contact 29–11–NR5–4 and the lead to the digits 8, 9, 4 and 5 is broken at the now open break contact 29–11–NR1–7.

When relay 10–TOHR became energized due to the energization of relay 9–PO7R1, as described hereinbefore, it closed a circuit to energize transmitter off hook relay A, 10–TOHA, in a path from ground (FIG. 10) through now closed make contact 10–THOR–7 through the winding of relay 10–TOHA to the —48 volt D.C. source (FIG. 10) and it also completed a circuit to energize the on-hook relay 10–ONHR in a circuit from ground (FIG. 25) through break contact 25–26–RES, terminal TH–12 in FIGS. 25 and 10 and the now closed contacts 10–TOHR–9 and through the winding of the relay 10–ONHR to the —48 volt D.C. source in FIG. 10. The relay 10–TOHR also closes a path from ground (FIG. 10) through its now closed make contact 10–TOHR–1 to break contact 10–26–SALA–9 of the sending alarm relay A and through a now closed break contact 10–SR–8 in the subscribers set and the now closed contact 10–BOH also in the subscribers set to an off-hook relay 10–OH in the subscribers set to —48 volt D.C. source in the subscriber set as shown in FIG. 10.

With the apparatus in the condition just described, it simulates the condition of a telephone apparatus when the receiver is lifted since in addition to the circuits operated under control relay 9–PO7R1 and described hereinbefore an additional circuit was completed from terminal TH–12 on FIG. 10 through a now closed make contact 10–9–PO7R1–12, now closed break contact 10–14–ABR–7 to a relay 10–DM in the subscriber set of the telephone apparatus to cause the telephone apparatus to go into dial mode. The energization of the off-hook relay 10–OH in the subscribers set conditions the set to receive the digits of the direct distance dialing number and particularly the first digit, which is still set up on the sensing pins of the reader and their associated contacts and through the numbering relay contacts NR1 through NR5 to the leads extending into the subscriber set of the telephone apparatus. Thus the subscribers set after going into dial mode upon energization of relays 10–DM is ready to receive the first digit of the called terminal station's direct distance dialing number (DDD). The subscribers set is arranged in such a manner that after receiving the first digit and succeeding digits of the direct distance dialing number, in the manner described hereinbefore in connection with the first digit, it will transmit a pulse through diode 3–D–11 and the now closed make contacts of transfer pair 3–9–PO7R1–8 to the reader clutch magnet, momentarily to pulse the reader clutch magnet 3–RCM thereby to initiate another cycle of the reader clutch magnet 3–RCM.

The reader clutch magnet 3–RCM will be maintained under control of the subscriber set until all of the digits are transmitted from the reader to the subset. Thus, this operation will continue until the reader senses the letters code in the tape at the end of the direct distance dialing number with no control holes in the tape. As the last digit of the direct distance dialing number is thus transmitted from the reader to the subscribers set, a No. 8 hole will be perforated in the edge of the tape in line with the figures code perforation which preceded the direct distance dialing number.

The operation of the relay 9–PO7R1, in addition to supplying ground to energize the relay 10–TM in the subscriber set of the telephone apparatus also completes a circuit ground on FIG. 25 through the now closed break contact 25–36–RES–5, terminal TH–12 on FIGS. 25 and 10 through the now closed contact 10–9–PO7R1–12, now closed break contact 10–14–ABR–7, terminal A60 on FIGS. 10 and 31 through now closed break contact 31–32–OS–1 and the stepper switch off-normal break contact 31–SS–ON–6 and its interrupter contacts 31–SS–INT–2 and then through the winding of the stepper switch magnet 31–SS to —48 volt D.C. source on FIG. 31 to energize this stepper switch magnet. Energization of the stepper switch magnet 31–SS and its release due to the breaking of its normally closed off-normal contact 31–SS–6 will cause the stepper switch to step from its normal position to its first position where the common brush designated "ALL" of arc 3 of the stepper switch 31–SS will supply ground (FIG. 31) through normally closed contact 31–33–EOX–1 and through contact 1 of arc 3 of stepper switch 31–SS to energize a data set connect relay 31–DC which has the opposite side of its winding connected to —48 volt D.C. source in FIG. 31. The stepper switch 31–SS has three brushes in arc 3 connected individually to data set connect relays such as the relay 31–DC thus to selectively energize these relays 31–DC to connect all the control leads successively to the secondary of the selecting mechanism which selects the three subscribers sets successively for operation. Thus the first of the subscriber sets, of which there are three in the present embodiment of the invention, will be conditioned to receive the direct distance dialing number and complete a connection through a telephone switching network to a called subscribers station. It might be well to note at this time that the subscriber set will stay in the off-hook condition while a second subscribers set is connected and if necessary a third subscribers set is connected to receive the text of the message and these subscribers sets will remain in the off-hook condition awaiting the text of the message.

As the stepper switch 31–SS moves to its off-normal position it will complete a circuit from ground (FIG. 32) through normally open, now closed contacts 32–SS–ON, now closed break contacts 32–OS–3 and through the winding of an off-normal 32–ONX to —48 volt D.C. source in FIG. 32 thus to energize the relay 32–ONX. With the relay 32–ONX energized and the relay 31–DC for the first subscriber set also energized, a shunt path will be completed through now closed break contact 32–OS–5 of original state relay 32–OS which is not operated, make contact 32–31–DC–5, the winding of blind relay 32–BL and the make contact 32–ONX to thereby prevent the operation of the relay 32–BL in the circuit associated with the first subscriber set. The operation of the relay 31–DC will close its make contacts 31–DC–9, 31–DC–10, 31–DC–18, 32–31–DC–3, 32–31–DC–19, 32–31–DC–5, 33–31–DC–12, 33–31–DC–1, 33–31–DC–11, 34–31–DC–13, 35–31–DC–14, 36–31–DC–17, 36–31–DC–16, 36–31–DC–15, 30–31–DC–2, 30–31–DC–6, and 30–31–DC–7 to complete the connection between the interface of the switching circuitry for selectively connecting the first of the three subscriber sets to the dialing and message control circuits. The operation of the relay 31–DC also completes a circuit to operate the telephone off-hook relay 32–TOH in the first secondary circuit from ground in FIG. 25 through contact 25–26–RES–5, terminal TH–12 on FIGS. 25 and 10, now closed contact 10–9–PO7R1–12, now closed break contact 10–14–ABR–7, terminal A–60 on FIGS. 10 and 32, now closed break contact 32–33–EO–2, now closed make contact 32–31–DC–2, diode 32–D6, the winding of the relay 32–TOH to −48 volt D.C. source in FIG. 32. When relay 32–TOH is thus energized it will lock up through its own contacts 32–TOH–11, normally closed break contacts 32–33–ST–9 over an off-hook lead and terminal A–13 on FIGS. 32 and 10 through normally closed contacts 32–26–SALA–9 and now closed make contact 32–10–TOHR–1 to ground in FIG. 10. With the apparatus in this condition a DDD number may be dialed by the subscriber set and the transmitter will be stepped under control of the subscribers set.

As previously pointed out, the stepper switch 13–LNSS had been stepped to Position 1 and this stepper switch will be advanced one step for each digit that is transmitted from the reader to the subscriber set, in a circuit from ground (FIG. 13) through make contact 13–AUX–A in the reader, which closes once in each cycle of the reader, now closed break contact 13–12–ITRB–6, now closed make contact 13–9–PO7R1–9, diode 13–D–33, now closed break contacts 13–9–PO68R–8, 13–33–EO–12 and 13–16–UNMR–10 through the winding of the magnet 13–LNSS to −48 volt D.C. source (FIG. 13). This magnet 13–LNSS will thus be energized and deenergized once in each cycle of the reader until the reader senses the letters code in the tape with no control holes, at which time the stepper switch 13–LNSS will have stepped to its tenth position. The next time contact 13–AUX–A closes, a circuit will be completed through it and through now closed break contact 13–12–ITRB–6, the wiper of stepper switch 13–LNSS–ARC–1, in the tenth position, thence through make contact 13–9–PO7R1–6 and break contact 13–21–STC–8 to operate the lower notch magnet 13–LNM. Operation of magnet 13–LNM will cause the piercing of the No. 8 level of the tape thereby to indicate that an attempt has been made to make a connection through the telephone switching system to the subscriber or terminating station whose address, in the form of the direct distance dialing number, has been read from the tape. This perforation by the piercing pin will be in line with the figures code perforated in the tape preceding the first digit of the direct distance dialing number.

When the tape is stepped forward, after reading the last digit of the direct distance dialing number, the sensing pins will sense the letters code, with no control perforations in the "0," sixth, seventh or eighth positions. Thus, on this cycle of the reader no circuit will be made by reader contacts 0, 6, 7 and 8 and the recognition relays 4–RO and 4–R7 will not be energized. The failure of any one of these contacts, in the reader, to be closed will also result in relay 28–LUR not operating since it was pulled up in parallel with relays 4–RO and 4–R7. When relay LUR is thus not operated its make contact 9–4–LUR–9 will be open to break the holding path to relay 9–PO7R1. Relay 13–LBR will also be released upon the deenergization of relay 4–LUR due to the opening of the locking path to the relay 13–LBR at make contact 13–4–LUR–4. In addition, the shunt around the distributor contacts shown on FIG. 11 will be removed by opening the make contacts 11–4–LUR–8. When relay 4–LUR is not operated the shunt around relay 13–LURB will be opened by opening make contact 13–4–LUR–3. On this cycle of the reader, when its auxiliary contact 9–AUX–B recloses, a circuit will be completed from ground (FIG. 9) through break contact 9–26–RES–7, the now closed contact 9–AUX–B, diode 9–D–17, now closed break contacts 9–4–R7–4, 9–4–RO–6 and 9–4–R6–10 and through the winding of relay 9–PNR to the −48 volt D.C. source in FIG. 9 to energize the permutation none relay 9–PNR. When relay 9–PNR is energized it will lock operated through its make contact 9–PNR–3 to complete a circuit from ground in FIG. 9 through the recognition relay break contacts 9–4–R6–7, 9–4–R7–7, 9–4–RO–8, 9–4–R8A–8 and its own make contact 9–PNR–3 and winding to −48 volt D.C. in FIG. 9.

The deenergization of relay 9–PO7R1 will also open the operating path to relay 10TOHR by opening its make contacts 10–9–PO7R1–3, it being understood that the locking path to relay 10–TOHR, at end of message, will be opened upon the energization of relay 9–PNR due to the opening of the break contacts 10–9–PNR–8 and upon opening of contacts 10–9–PO6R–4 and 3–AUX–8. Relay 9–PO7R1 in being deenergized will also break the operating path to the relay 10–TSR by opening its make contacts 10–9–PO7R1–12 and will also open the circuit path to the lower notch magnet 13–LNM by opening its make contacts 13–9–PO7R1–6. Relay 9–PO7R1, in releasing, also opens the operate path to relay 20–UDR which is the unsent DDD number relay by opening its make contacts 20–9–PO7R1–1.

The deenergization of relay 9–PO7R1 in opening its make contacts 10–9–PO7R1–12 broke the connection from ground through the contact 10–9–PO7R1–12 and now closed break contact 10–14–ABR–7, terminal A–60 on FIGS. 10 and 31 through the break contact 31–32–OS–1 and break contact 31–33–EO–7 to the switch drive relay 31–SSD and to −48 volt D.C. source in FIG. 31. This switch drive relay 31–SSD is a slow to release relay which would normally tend to hold the stepper switch 31–SS energized for a short time. However, the relay 9–PO7R2 has its locking path broken at make contact 9–32–OS–11 and consequently when the relay 9–PO7R1 is deenergized and opens its make contact 9–PO7R1–2 the relay 9–PO7R2 will be deenergized. The deenergization of the relay 9–PO7R2 will close its break contacts 31–9–PO7R2–4 before the drive switch 31–SSD becomes completely deenergized. Consequently a pulse will be fed to the stepper switch magnet 31–SS to cause it to step to its No. 2 position upon the release of the switch drive relay 31–SSD. This circuit for operating the stepper switch 31–SS will be completed from ground at FIG. 31 through the break contact 31–9–PO7R2–4, diode 31–D2, now closed break contact 31–32–ITR–3, now closed break contact 31–LO–5, now closed break contact 31–32–OS–2, the still closed make contact 31–SSD–3 and through the winding of the stepper switch magnet 31–SS to −48 volt D.C. source. In stepping from Position 1 to Position 2 the stepper switch 31–SS will move its common brush from contact 1 to contact 2 of 31–ARC–3 to release the relay 31–DC in the first subscribers set and energize the relay 31–DC in the second subscribers set.

Each of the secondary or subscriber set's associated circuits, that are controlled by the three relays 31–DC, has in it a timer circuit, one of which is illustrated in FIG. 36. The timer circuit is controlled by a pair of capacitors 36–C1 and 36–C2 arranged in parallel and having one side connected to ground and the other side connected to the control element of a timer tube 36–TA. The control element of the timer tube 36–TA is also connected through a make contact 36–31–DC–17 and a break contact 36–33–EO–3 to ground. Thus when the relay 31–DC in the first data set is energized no charging potential will be applied to the condensers 36–C1 and 36–C2 but immediately upon the deenergization of the relay 31–DC the capacitors will start to charge in a circuit from the 130 volt D.C. source in FIG. 36 through the capacitors to ground in FIG. 36. As soon as the capacitors have completely charged, which will require approximately 11 seconds with the arrangement of capacitor values and resistors shown in the drawing, the tube 36–TA will fire and will operate the no answer-back relay 36–NAB which will then lock up from the 130 volt D.C. source in FIG. 36 through its own locking contact 36–NAB–4 and the closed make contact 36–32–TOH–5 to ground. It will be understood that this timing out of the no answer-back relay 36–NAB will occur while the next or second of the secondary circuits, associated with the second subscriber set, is attempting to dial a second address or DDD number.

The operation, as described thus far, will be repeated for the second and third addresses or DDD numbers in the same manner as outlined hereinbefore and it will be assumed for the present that the called subscribers sets have been reached and, as a result thereof, answer-back relay 30–ABX has been energized to close its contacts 36–30–ABX–12 and thereby prevent the application of the charging potential to the capacitors 36–C1 and 36–C2 by grounding both sides of these capacitors.

After the second and third DDD numbers have been fed into the subscribers set to establish connections from the three subscriber sets to three subscribers at terminating stations, the stepper switch 31–SS will step to Position 4, being energized over the same circuit as was described in the stepping of this switch from Position 1 to Position 2 and from Position 2 to Position 3. Since in the embodiment of the invention being described herein there are only three access lines provided, that is, three separate subscriber sets, the stepper switch 33–SS is so arranged that its contacts in Position 4 to 9 are strapped together and connected to ground, FIG. 33, on its arc 2. This ground, FIG. 33, will be connected through Position 4 of arc 2 of stepper switch 33–31–SS through the winding of an end-of-address relay 33–EOX to —48 volts D.C. source in FIG. 33 to energize the relay 33–EOX. Upon being energized the relay 33–EOX will lock up to ground in a path from the —48 volt D.C. source in FIG. 33 through the winding in relay 33–EOX, now closed break contact 33–32–ONX–5 and the now closed make contact 33–EOX–4 to ground in FIG. 33. Since none of the data set connect relays 31–DC will be energized at this time due to the breaking of the circuit from ground in FIG. 31 at the now broken break contact 31–33–EOX–1, the operating circuit to the reader clutch magnet 3–RCM will be broken at each of the contacts 31–DC–10 in the secondary portion of the data connect circuits.

When end-of-address drive relay 33–EOX is operated it will close its contacts 33–EOX–7 to complete a circuit from ground, FIG. 33, through those contacts and the winding of the end-of-address relay 33–EO to —48 volt D.C. source in FIG. 33. This circuit to the end-of-address relay 33–EO will then lock up over a circuit from ground, FIG. 33, through now closed make contacts 33–32–TOH–9 of any one of the relays 32–TOH that has been energized. In addition the energization of the end-of-address drive relay 33–EOX will close its contacts 33–EOX–4 to supply ground from FIG. 33 through terminal M–94 in FIGS. 33 and 9, through the winding of relay 9–P67R to the —48 volt D.C. source in FIG. 9 thereby to energize this relay which will then lock up in a path from ground, FIG. 9, through now closed break contact 9–26–RES–7, now closed break contact 9–18–PBRB–8, now closed make contact 9–P67R–8 and through the winding of the relay 9–P67R to —48 volt D.C. source in FIG. 9. The energization of relay 33–EOX will also complete a circuit from ground (FIG. 31) through its contacts 31–33–EOX–2 which are now closed and through the off-normal and interrupter contacts 31–SS–ON–4 and 31–SS–INT–2, then through the winding of the stepper switch magnet 31–SS to —48 volt D.C. source to cause the stepper switch to be intermittently operated until it arrives in its normal position where its off-normal contact 31–SS–ON–4 will be opened.

As just described the stepper switch 31–SS will be returned to its home or normal position, at which position it will release the off-normal relay 32–ONX by opening its contacts 32–31–SS–ON–2. When the relay 32–ONX is released it will in turn open the locking path to the end-of-address drive relay 33–EOX by restoring its make contacts 33–32–ONX–5 to the open condition. The operation of relay 32–ONX will restore its make contacts 32–ONX–2 to the open condition thereby breaking the circuit to any of the blinding relays 32–BL which have been energized.

At this point the apparatus is in the condition where the addresses, comprising the direct distance dialing numbers of receiving stations to which the message text as perforated in the tape is to be transmitted, has been sent through the three subscriber sets to make connections to the called or receiving stations and the dialing of each of these numbers has been recorded in the tape by perforating the number 8 pierce control area for each DDD number. Consequently, it becomes necessary to pull the tape back preparatory to printing the mnemonic code for the called stations on the monitor and transmitting the message text to the stations and printing it on the monitor. This pull-back operation is effected in the manner now to be described.

*4. Pull back after dialing*

The operation of relay 9–P67R under control of the end-of-address drive relay 33–EOX will cause the energization of relay 18–PBRA in a circuit from ground, FIG. 18, through the now closed make contact 18–9–P67R–2, the now closed make contact 18–20–UDR–4, the now closed break contact 18–PBRB–5, the winding of relay 18–PBRA to the —48 volt D.C. source in FIG. 18. When this relay 18–PBRA is operated, it will supply an operating path for energizing the pull-back magnet 19–PBM shown in FIG. 19 in a circuit from ground (FIG. 19) through the now closed break contacts 19–9–P06R–10, now closed make contacts 19–18–PBRA–2, the winding of the pull-back magnet 19–PBM to —48 volt D.C. source in FIG. 19. As described in conjunction with the mechanical features of the apparatus of the aforementioned copending application, the operation of the pull-back magnet 19–PBM will cause the tape to be pulled back, through the reader gate or reader head, until the tape is taut between the reader and the pull-forward sprocket feed wheel.

As the tape is pulled taut between the point where the sensing pins read it and the pull-forward or sprocket feed wheel, the tight-tape switch 16–TTS will be closed to connect ground in FIG. 16 through the tight-tape relay 16–TTR to —48 volt D.C. source in FIG. 16, thus, to energize the tight-tape relay 16–TTR. When relay 16–TTR is operated under control of the tight-tape switch 16–TTS, it will release relay 20–UDR by opening its break contacts 26–16–TTR–5 and will operate relay 18–PBRB by completing a circuit from ground, FIG. 18, through the now closed make contact 18–9–P67R–2, now closed make contact 18–PBRA–4, now closed break contact 18–9–P06R–8, now closed make contact 18–16–TTR–2 through the winding of the relay 18–PBRB to the —48 volt D.C. source in FIG. 18. As a result of the energization of relay 18–PBRB the circuit to pull-back relay "A," 18–PBRA will be broken at break contact 18–PBRB–5 and relay 18–PBRA upon becoming deenergized will open the circuit to the pull-back magnet 19–PBM by re-opening its make contacts 19–18–PBRA–2. With the apparatus in this condition the tape has been pulled back to a taut condition where the forward feeding of the tape may be reinitiated.

The operation of pull-back relay "B" 18–PBRB will open the locking path to relay 9–P67R, which is the permutation 6–7 relay, by opening its contacts 9–18–PBRB–

8 thereby effecting the release of relay 9–P67R. When relay 18–PBRB was energized, a locking path was provided for it over a path through its locking contacts 18–PBRB–2 and break contact 18–9–PNR–6 which is now closed terminal M–92 on FIGS. 18 and 9, closed make contact 9–18–PBRB–10, closed break contact 9–P068R–10 and closed break contact 9–26–RES–7 to ground. This circuit assured that relay 9–P67R was released and remains released until the pull back of the tape is completed.

When the pull-back relay "B," 18–PBRB is energized, it will operate the reader clutch magnet 3–RCM in a circuit from ground in FIG. 31, now closed break contacts 31–32–ONX–7, terminal A–27 on FIGS. 31 and 3, through now closed break contacts 3–9–P07R1–8, now closed make contacts of stop-run switch relay 3–8–SRR–12, interrupter of the stepper switch 3–13–LNSS–INT, now closed break contacts of torn-tape relay 3–24–TOTR–9, now closed break contact 3–9–P06R, now closed make contact 3–18–PBRB–4, now closed break contacts 3–14–CAR–4, 3–26–RES–6, 3–26–SALA–7, 3–26–SALB–5, 3–18–PFR–4, 3–12–ITRA–4, 3–PSR–10, the winding of the reader clutch magnet 3–RCM to −48 volt D.C. source in FIG. 3 thus to energize the reader clutch magnet. The energization of the relay 18–PBRB will also open the locking path to relay 9–P7R by opening its break contacts 9–18–PBRB–10.

At this time the tape has been returned to its original starting or clamped position and the operation of the reader clutch magnet 3–RCM will start the tape advancing through the reader mechanism. As the tape advances, the characters are sensed by the sensing pins in the reader which in turn, code the distributor as described hereinbefore and are transmitted to the lines and to the monitor circuits by way of the sending line relay 11–SLR and the monitor line relay 11–MLR.

In view of the fact that the individual subscribers sets, in the present embodiment of the invention, have their own send line relays 35–SL(1), 35–SL(2), and 35–SL (3) associated with them, the outgoing lines from the subscriber sets will be blinded although the relay 11–SLR may be operated. This blinding of the lines in the three subscriber sets is effected by the shunting of the sending loop as illustrated in FIG. 30, on the completion of the circuit from ground in FIG. 30 through the now closed break contacts 30–35–CFX–6 and 30–33–ST–5 of the now deenergized confirmation and second time relay 35–CFX and 33–ST, respectively, which will maintain a marking or current condition in the send loop. The monitor line relay 11–MLR is not blinded at this time and will receive the signals from the tape.

Since the reader clutch magnet 3–RCM on its first operation in this sequence will thus move the tape out of the position which it occupied after the pull-back operation, the first code combination to be sensed by the reader will be the "CARRIAGE RETURN" code combination within the bracket A of FIG. 2 and the second character to be sensed in the tape will be the code combination for "LINE FEED." The telegraph printer at each of the subscribers sets at the originating station is equipped with a so-called "Stunt Box" which upon receiving the sequence of "CARRIAGE RETURN" and "LINE FEED" code combinations, will close a switch 23–CR–LF–switch thereby to energize a monitor blinding relay 23–MBR in a circuit from ground (FIG. 23) through now closed break contact 23–PSR–9 and the switch 23–CR–LF–switch and now closed make contacts 23–18–PBRB–12 and thence through the winding of the relay 23–MBR to −48 volt D.C. source in FIG. 23. This operation of the monitor blinding relay 23–MBR will cause the relay 23–MBR to be locked up over its own locking contacts 23–MBR–2 and the now closed make contacts 23–10–TOHR–5.

*5. Blinding called DDD number after pull back*

As the tape is advanced by successive operations of the reader clutch magnet 3–RCM, the sensing pins in the reader will sense the control holes "0," and "8" at the beginning of the DDD number, thus, to energize relays 4–RO, and 4–R8A and 13–LUR by closing the reader contacts "0," and "8" in FIG. 11. The line unblinding relay 3–LUR operates upon the energization of any one of the relays associated with 0, 6 and 7 control holes in the same manner as was described hereinbefore in connection with the energization of the relay 13–LUR upon the original sensing of the "0" perforation in the tape. Relay 4–RO will be operated in a circuit similar to that described hereinbefore when the relay 4–RO was previously energized, that is, through the contacts of the transmitter reader shown on FIG. 11. Similarly, relay 4–R8A will be operated in a circuit originating at ground in FIG. 4 through the reader sensing contacts shown in FIG. 11 and thence through the terminal MD–187 through the windings of the relay 4–R8A to the −48 volt D.C. source in FIG. 4.

The operation of relay 4–RO will open the locking path for the permutation none relay 9–PNR by opening its break contacts 9–4–RO–8. When, in this cycle of operation of the reader, the reader contact 9–AUX–B is closed, it will complete a circuit from ground in FIG. 9 through the now closed break contact 9–26–RES–7, the contact 9–AUX–B, diode 9–D17 and through the now closed break contacts 9–4–R7–4, make contacts 9–4–RO–6, break contacts 9–4–R6–8, diode 9–D23, break contacts 9–PO68R–5 and through the winding of the relay 9–POR to the −48 volt D.C. source in FIG. 9. This circuit will also be completed through diode 9–D27 and now closed break contact 9–12–ITRB–5 to energize relay 9–LSR. Energization of relay 9–LSR closes a circuit from ground in FIG. 11 through its sets of contacts 11–9–LSR–5, 8, 9, 12 and 13 to the distributor contacts 1, 2, 3, 4, and 5, respectively. The application of this ground potential to the distributor contacts 1 to 5 as shown on FIG. 35 will cause the code combination for letters to be transmitted instead of the code combination for figures which is sensed by the sensing pins in this cycle of operation of the reader. When, in this sequence, the make contact 13–AUX–A of the reader is closed it will complete a circuit from ground (FIG. 13) through its now closed contacts 13–AUX–A, now closed break contact 13–12–ITRB–6, make contact 13–9–LSR–4 and diode 13–D34 through the winding of the relay 13–LBR to −48 volt D.C. source in FIG. 13. As soon as the relay 13–LBR is thus operated it will lock operated through its own make contacts 13–LBR–4 and the now closed make contacts 13–4–LUR–4.

The operation of the relay 13–LBR, which is the line blinding relay, will cause the blinding or non-operation of the line and monitor functions during the sensing of the direct distance dialing number which had been fed to the telephone switching equipment and which had caused the completion of circuits to the stations whose addresses were read in the previously described portion of the operation. This blinding of the line and monitor is effected by completing a shunt around the distributor contacts through the now closed make contacts 11–13–LBR–12 and 11–4–LUR–8. The tape will continue to advance through the reader and the perforations in the "0" and "7" control holes of the tape associated with the direct distance dialing number will maintain the relays 4–LUR and 13–LBR operated thus to keep the line and the monitoring printer blinded. The tape will be advanced in this manner until the end of the direct distance dialing number and upon the reader sensing the first character after the direct distance dialing number without the control holes in the "0" and "7" positions of the tape, the relays 4–RO, 4–R7, and 4–LUR will be released, since the transmitter reader sensing contacts shown on FIG. 11 for the "0" and "7" control holes will not be closed. When relay 4–LUR is thus released, it will re-open its make contacts 11–4–LUR–8 to remove ground in FIG. 11 from the leads going to the relays 11–MLR and 11–SLR, thereby, to permit the relays 11–MLR and 11–SLR to follow the output of the distributor contacts shown on FIG. 11 and designated SS and 1 to 5. When relay 4–LUR was released, it re-opened its make contacts 13–4–LUR–4 to open the locking path to the relay 13–LBR, thus, releasing this line-blinding relay 13–LBR.

When in this cycle of the operation of the apparatus, the reader contact 9–AUX–B recloses, a circuit will be completed from ground in FIG. 9 through the break contact 9–26–RES–7 and the break contacts 9–AUX–B, the diode 9–D17 and the now closed break contacts 9–4–R7–4, 9–4–RO–6 and 9–4–R6–10 to the winding of the relay 9–PNR and thence to —48 volt D.C. source in FIG. 9. This will cause the permutation none relay 9–PNR to be energized and this relay will lock operated from ground, through the break contacts 9–4–R6–7, 9–4–R7–7, 9–4–RO–8, 9–4–R8A–8 and the now closed make contacts 9–PNR–3, through the winding of the relay 9–PNR to the —48 volt D.C. source in FIG. 9.

During this second pass of the tape through the reader, the lower notch stepping switch magnet 13–LNSS will be held unoperated due to the fact that at this time the end-of-address relay 33–EO is operated and consequently will have opened its normally made break contact 13–33–EO–12.

On this second pass of the tape through the reader, the reader in sensing the first zero and seven control holes in the tape operates the permutation 0–7 relay "1," 9–P07R1 over the circuit which has been described in connection with the previous operation of this relay. The operation of the relay 9–P07R1 completes a circuit from ground in FIG. 25 through now closed break contacts 25–26–RES–5 and terminal TH–12 by closing its contacts 10–9–P07R1–12 through the now closed break contacts 10–14–ABR–7, terminal A–60 on FIG. 10 and 31 through now closed break contact 31–32–OS–1, now closed break contact 31–SS–ON–6 and interrupter contact 31–SS–INT–2 through the winding of the stepper switch magnet 31–SS to —48 volt D.C. source. This energization of the stepper switch magnet 31–SS will cause the switch to step its movable brushes to Position 1 on their respective arcs.

The stepper switch 31–SS in its Position 1 will complete a circuit from ground in FIG. 31 through now closed break contact 31–33–EOX–1, brush 1 of stepper switch arc 3, 31–SS–ARC–3 to energize the data set connect relay 31–DC in the first subscriber set since the other side of the relay 31–DC is connected to the —48 volt D.C. source as shown in FIG. 31. When the steppper switch 31–SS steps off normal it will complete a circuit through its off-normal make contact 32–31–SS–ON–2 and the now closed break contacts 32–OS–3 through the winding of the relay 32–ONX to —48 volt D.C. source in FIG. 32. This will transfer the control of the reader clutch magnet 3–RCM to the first of the secondary circuits associated with the first subscribers set.

6. *Transmission of confirmation mnemonics* (*multientry*)

It will be assumed for the purpose of this description that an answer-back signal has been received from the called subscribers station to which a connection has been established through the dialing of the direct distance dialing number as described hereinbefore. When this occurs an answer-back signal will be sent back to the relay 30–ABX to energize it in the manner described hereinbefore. When relay 30–ABX is energized it will complete a circuit from ground in FIG. 33 through the now closed make contact 33–EO–8, the now closed make contact 33–30-ABX–8, the now closed make contact 33–31–DC–1 through the winding of the second time relay 33–ST to —48 volt D.C. source in FIG. 33. The operation of the relay 33–ST will complete a circuit from ground in FIG. 31 through the now closed make contacts 31–33–ST–3, the now closed break contacts 31–36–CFX–8, the now closed make contacts 31–DC–9, the now closed break contact 31–33–P3X–3, the now closed break contacts 31–36–NC–11, the now closed make contact 31–32–ONX–7, the now closed make contact 31–33–EO–5, terminal A–28 on FIGS. 31 and 3, the now closed contact 3–9–P07R1–8, the switch 3–SRR–2, interrupter contact 3–13–LNSS–INT, the now closed break contact 3–24–TOTR–9, the now closed make contact 3–9–P07R1–10, the now closed break contact 3–14–CAR, the now closed break contacts 3–26–RES–6, 3–26–SALA–7, 3–26–SALB–5, 3–18–PFR–4, 3–12–ITRA–4, 3–PSR–10 and the winding of the reader clutch magnet to the —48 volt D.C. source in FIG. 3.

This circuit will cause the tape to be stepped through the reader while the line and the monitoring printer are both blinded by the operated relay 13–LBR which is energized under control of the sensing of the first of the zero control holes in the tape which precedes the DDD number. The tape will continue to be stepped until the sensing of the letters character on the tape following the DDD number which has no control holes perforated in it and will thus break the circuit to relay 4–LUR which is the line unblinding relay and the operation of this relay will unblind the line and the monitor in the first subscribers set. This circuit for releasing the relay 4–LUR will be broken at the transmitter, as shown on FIG. 11, and diagramatically illustrated on FIG. 4 where the transmitter sensing contacts will find no perforations in the tape in the 6, 0, 7 levels to open the circuit to relay 4–LUR.

The mnemonic of the called station, as represented by the perforations in the area bracketed under C on FIG. 2, will be read by the transmitter reader sensing contacts shown on FIG. 11 and will be transmitted only to the first line and the first subscribers set and the monitor in the first subscribers set will copy this mnemonic. The second and third subscribers sets at their associated lines are blinded due to the fact that their relays 33–ST are released. Upon the sensing of the code perforation representative of the space function which follows the mnemonic code, relay 33–P3X which is the pulse 3 relay will be energized. This relay 33–P3X will be pulled up in a circuit from ground (FIG. 9) through now closed break contact 9–26–RES–7, reader contact 9–AUX–B which is a break contact now closed, terminal TE–8 on FIGS. 9 and 29 through the now closed break contacts 29–11–NR4–10, 29–11–NR5–10, 29–11–NR1–6, 29–11–NR2–10 and the now closed make contacts 29–11–NR3–12, terminal A–29 on FIGS. 29 and 33 through the winding of the relay 33–P3X to —48 volt D.C. source in FIG. 33. This relay 33–P3X in becoming energized will open its break contact 31–33–P3X–3 to break the circuit to the reader clutch magnet 3–RCM, thus to stop the transmitter.

When the pulse 3 relay 33–P3X is operated it will complete a circuit from ground in FIG. 31 through its make contacts 31–33–P3X–2 and now closed make contacts 31–33–EO–7 through the winding of the switch drive relay 31–SSD to the —48 volt D.C. source in FIG. 31. When the switch drive relay 31–SSD is energized, it will complete a circuit from ground in FIG. 31 through the now closed break contact 31–9–P07R2–4, diode 31–D2, now closed break contacts 31–32–ITR–3, 31–LO–5, 31–32–OS–2, the now closed make contacts 31–SSD–3 through the winding of the stepper switch magnet 31–SS to the —48 volt D.C. source.

7. *Confirmation recorded*

At this time it will be assumed that the dialing of the direct distance dialing number (DDD) had cause the completion of the circuit to the proper called subscribers equipment. In the dialing operation the completion of the DDD number by the subscriber set caused a pierce to be made in the tape at the eighth level to record the fact that the dialing attempt had been made. If the call is completed to the called subscriber and the called station's mnemonic has been transmitted, the fact that the circuit has been completed to the proper called subscriber will cause the operation of the receiving relay 14–REC in that subscribers set. This will result in the closing of the contact 30–14–REC–12 and the consequent energization of relay 30–RL in the secondary circuit associated with the No. 1 subscriber set. The operation of relay 30–RL will result in the completion of a circuit from ground in FIG. 35 through the now closed make contacts 35–30–AZX–11, now closed make contacts 35–30–RL–6, now closed make contacts 35–31–DC–14, now closed make contact 35–33–ST–6, now closed break contact of the circuit assurance relay 35–37–CAX–4, now closed make contact 35–32–TOH–6, the winding of the confirmation relay 35–CFX to —48 volt D.C. source. Upon energization relay 35–CFX will lock operated from ground through its own contacts 35–CFX–9, the closed break contacts 35–37–CAX–4 and 35–32–TOH–6. When the confirmation relay 35–CFX is energized, it will prepare a path to be later closed upon operation of the blind relay 32–BL, when the stepper switch 31–SS is released and steps to its No. 2 position. This path is prepared by closing contacts 30–35–CFX–5 which will become effective when the blind relay 32–BL is operated and closes its make contacts 30–32–BL–12 to shunt out the contact 30–35–SL–6 and prevent the last-named contact from controlling the pulsing of the send loop. When relay 35–CFX is operated it will close a path from ground in FIG. 33 through the still closed contacts 33–31–DC–11, now closed make contacts 33–35–CFX–2 and terminal A–31 on FIG. 33 and FIG. 14, then through the now closed make contacts 14–29–P3R–2 and 14–10–TOHR–11 and the winding of the relay 14–CFR to —48 volt D.C. source in FIG. 14. When relay 14–CFR is energized it will lock operated over its locking contacts 14–CFR–5.

8. *Confirmation received*

Upon being operated the relay 14–CFR will close an operating path for the upper notch magnet 17–UNM. The circuit for operating the upper notch magnet 17–UNM extends from ground in FIG. 17 through the now closed break contact 17–12–ITRB–9, now closed make contact 17–14–CFR–12, now closed break contact of slow to operate upper notch memory relay 17–UNMR–3, the now closed break contact 17–32–ONX–11, the now closed break contact 17–21–STC–11 and the winding of the upper notch magnet 17–UNM to the —48 volt D.C. source in FIG. 17. The relay 17–UNMR which is low to operate will pull up in parallel with the upper notch magnet 17–UNM and in so doing will open the break contacts 17–UNMR–3. Thus, a hole will be perforated in the sixth level of the tape to record the receipt of the confirmation and this hole will be pierced in line with the 8-level pierce, which was made when the attempt to connect to a terminal station was recorded. This mechanism for piercing the tape is described in the copending application of D. E. Huffman et al. mentioned hereinbefore.

When relay 17–UNMR is operated it will open its contacts 33–17–UNMR–7 to open the locking path from ground in FIG. 9 through closed break contacts 9–26–RES–7 and terminal TH–19 on FIGS. 9 and 33 through the now closed make contacts 33–29–P3R–12 and the now closed break contact 33–EOX–9 and 33–36–NC–9 which extends to both the relay 33–P3X and 29–P3R, consequently, both the relays 33–P3X and 29–P3R will be released.

When relay 33–P3X is released it will open its contacts 31–33–P3X–2 to break the ground path to the switch drive relay 31–SSD. When the switch drive relay 31–SSD is released it will break the circuit to the stepper switch magnet 31–SS by opening its make contact 31–SSD–3, thereby releasing the stepper switch magnet and permitting the switch to step its brushes to the No. 2 position.

When the stepper switch 31–SS moves its brushes to Position 2, the data set connect relay 31–DC in the secondary associated with the first of the subscriber sets will be released and the data set connect relay 31–DC associated with the second subscribed set will be energized. The release of the data set connect relay 31–DC associated with the first subscriber set will remove the shunt from the first blinding relay 32–BL by opening its contacts 32–31–DC–5. Therefore, the relay 32–BL in the secondary associated with the first subscribers set will be energized in a path from ground in FIG. 32 through now closed break contact 32–OS–5, now closed make contact 32–ONX–2 and the winding of the relay 32–BL associated with the first subscribed set to —48 volt D.C. source in FIG. 32. This will result in the completion of the circuit, which had been prepared for operation, for blinding the send line or send loop through now closed make contacts 30–35–CFX–5 and 30–32–BL–12. The combination of the release of the data set connect relay 31–DC and the operation of the blind relay 32–BL, opens the path to relay 14–CFR, which is the confirmation relay, by opening the contact 33–31–DC–11 and opening the break contact 33–32BL–11. When the conformation relay 14–CFR is released it will release the upper notch magnet relay 17–UNMR by opening its contacts 17–14–CFR–12.

At this point in the operation the apparatus is in the condition where three numbers have been dialed and three separate subscriber sets have made connections to called subscribers sets and the first of the subscribers sets called has had the connection to it confirmed as being a proper connection. The procedure just described for confirming the completion of a circuit from a calling to a called station will be repeated for the second and third addresses in the message, at which time, if it is assumed that confirmation of the connection to the subscribers sets whose direct distance dialing numbers have been dialed, is received, the apparatus is in condition to pull the tape back and transmit the message to all three of the subscribers sets which have been interconnected through telephone switching systems to the three subscribers sets provided in this apparatus.

9. *Pull back after confirmation mnemonics* (*multi-entry*)

Thus far in the description of the operation, it has been assumed that all of the three stations to whom it was desired to direct a message have been properly connected to the three subscribers sets provided herein and this connection has been confirmed. The release of the stepper switch magnet 31–SS, after the confirmation of the third connection, will cause the stepper switch 31–SS to step to its No. 4 position. When the stepper switch 31–SS steps into its No. 4 position it will complete a circuit through its arc 2, 33–SS ARC2, and through the winding of the relay 33–EOX which is the end-of-address drive relay, to —48 volt D.C. source in FIG. 33 thereby to energize the relay 33–EOX in the primary portion of the circuit. As was described in detail hereinbefore, in connection with the confirmation of the various connections, the respective relays 31–DC in each of the secondaries associated with the subscribers sets were released when the connection to them was broken through ARC 3 of 31–SS. Therefore, the data set connect relay 31–DC associated with the third secondary circuit is released when the stepper switch steps to its No. 4 position. Consequently, the confirmation relay 14–CFR and the upper notch magnet relay 17–UNMR will be released at this time as described under the Confirmation Received section.

When the end-of-address drive relay 33–EOX is operated it will close its make contact 31–33–EOX–2 to complete a circuit through the stepper switch off-normal contact 31–SS–ON–4 and the interrupter switch 31–SS–INT–2 to the winding of the stepper switch magnet 31–SS and thence to —48 volt D.C. source in FIG. 31 to drive the stepper switch step-by-step to its normal position at which time the off-normal contact 31–SS–ON–4 will reopen. As soon as the stepper switch 31–SS arrives in its home position, it will open its make contact 32–31–SS–ON–2 to break the circuit from ground through the off-normal relay 32–ONX which will thereupon be released and will in turn release the end-of-address drive relay 33–EOX by opening its contacts 33–32–ONX–5. The release of the relay 32–ONX will also release all of the blinding relays 32–BL by opening contacts 32–ONX–2.

When relay 32–ONX is released it will close its break contacts 33–32–ONX–12 to connect ground from FIG. 33 through the now closed break contacts 33–32–BL–11, now closed make contacts 33–35–CFX–2, now closed break contacts 33–32–ONX–12, terminal A–32 on FIGS. 33 and 14, now closed make contacts 14–10–TOHR–11, the winding of the relay 14–CFR to the −48 volt D.C. source. At the same time a circuit will be completed from ground in FIG. 33 through the now closed break contacts 33–32–BL–11, now closed make contacts 33–35–CFX–2, now closed break contacts 33–32–OS–6, now closed break contacts 33–32–ONX–10, terminal A–38 on FIGS. 33 and 14, now closed make contact 14–10–TOHR–3 through the winding of the answer-back relay 14–ABR to the −48 volt D.C. source on FIG. 14. When the relay 14–CFR pulls up it will operate relay 17–UNMR in a circuit from ground (FIG. 17) through the now closed break contact 17–12–ITRB–9, now closed make contact 17–14–CFR–12 and the winding of the upper notching magnet relay 17–UNMR to the −48 volt D.C. source in FIG. 17. The operation of the end-of-address relay 33–EOX will also complete a circuit from ground in FIG. 33 through the now closed make contact 33–EOX–4, terminal M–94 on FIGS. 33 and 9 and through the winding of the relay 9–P67R to the −48 volt D.C. source on FIG. 9.

When the permutation 6–7 relay P67R is thus energized it will complete a circuit from ground in FIG. 18 through its now closed make contacts 18–9–P67R–2, now closed make contacts 18–20–UDR–4 and the now closed break contacts 18–PBRB–5 through the winding of the relay 18–PBRA to —48 volt D.C. source. Relay 18–PBRA in becoming energized will complete a circuit from ground (FIG. 19) to the now closed break contacts 19–9P06R–10 and the now closed make contacts 19–18–PBRA–2 and through the winding of the pull-back magnet 19–PBM to the −48 volt D.C. source, to initiate a tape pull-back operation. The tape will be pulled back until it is stretched taut between the reader and the transmitter and will then operate the taut-tape contact 16–TTS which will cause the tight-tape relay 16–TTR to be energized in a circuit from ground through the closed switch 16–TTS and the winding of the taut-tape relay 16–TTR to the −48 volt D.C. source. In operating, the tight-tape or taut-tape relay 16–TTR will release the unsent DDD number relay 20–UDR by opening its contacts 20–16–TTR–5. When the taut-tape relay 16–TTR is operated it will also complete a circuit from ground in FIG. 18 through the now closed make contacts 18–9–P67R–2, now closed make contacts 18–PBRA–4, now closed break contacts 18–9–P06R–8 and the now closed taut-tape relay contacts 18–16–TTR–2 through the winding of the relay 18–PBRB to the −48 volt D.C. source. When the relay 18–PBRB is energized it wil lock operated in a path from the −48 volt D.C. source in FIG. 18 through its windings, now closed make contacts 18–PBRB–2, now closed make contacts 18–10–TOHR, terminal A–43 on FIGS. 18 and 34 and any one of the three sets of contacts 34–35–CFX–3 in the secondary circuits to ground in the secondary circuits as illustrated in FIG. 34.

Since it has been assumed that confirmation of the connections to the three called stations has been received after an answer-back signal was received and that the transmitting subscribers sets are in an off-hook condition, the relay 18–PBRB will remain energized at this time. When relay 18–PBRB is energized it will cause the release of relay 18–PBRA by opening its break contacts 18–PBRB–5 and will release relay 9–P67R by opening its break contacts 9–18–PBRB–8. The release of relay 18–PBRA will effect the release of the pull-back magnet 19–PBM by opening its make contacts 19–18–PBRA–2 and the deenergization of the pull-back magnet 19–PBM will permit the switch 3–SRR–12 to close to complete a circuit to operate the reader clutch magnet 3–RCM. With the circuit in this condition, the tape will be advanced and the mnemonic code, end-of-address code, text and end-of-message code will be transmitted to the line and monitored by the selective operation of relays 11–MLR and 11–SLR under control of the distributor contacts shown in FIG. 11. This will cause the transmission of the message text together with the mnemonic code to the terminating stations whose addresses had been read in the reading of the direct distance dialing numbers. When the end-of-message code, which follows the text of the message, is sensed by the sensing pins, the distributor contacts shown in FIG. 11 will cause the transmission of all of the characters of the end-of-mesage sequence to be transmitted over the line to the terminating station.

10. *End of message*

In the operation of the apparatus as described hereinbefore, it has been assumed that a message is to be directed to all of the connected lines, that the connections have been established through the telephone switching equipment and confirmed by receipt of answer-back and confirmation signals, that the tape was pulled back, that the reader clutch has been reoperated to cause the tape to be advanced, blinding the line and monitor circuits to the DDD numbers, and that the text has been transmitted to the lines and to the monitoring circuit to transmit he message to the terminating stations and also to print, on the teletypewriter at the transmitting station, the text of the message together with the mnemonic code for the addressed stations. When the tape was advanced through the reader to cause the reader to read the message text and transmit it over the line, the completion of the transmission of the message text preceded the end-of-message code sequence. When the end-of-message code sequence is read by the sensing pins at the reader, the sensing of the "0" and "6" control holes associated with the third "N" of the series of four "N's" at the end-of-message code sequence will cause the relay 9–P06R to be energized in a circuit from ground through the now closed break contacts 9–26–RES–7, reader break contacts 9–AUX–B, the diode 9–D17, break contacts 9–4–R7–4, make contacts 9–4–R0–6, make contacts 9–4–R6–8, break contacts 9–4–R8A–4, winding of relay 9–P06R to −48 volt D.C. source in FIG. 9. This relay 9–P06R upon being energized will lock operated through its own contacts 9–P06R–12 and the now closed break contacts 9–16–TTR–7 and break contact 9–26–RES–7 to ground.

The tape will continue to be fed and when the reader contacts sense the next character which happens to be "N" with no control holes, the relays 4–R0 and 4–R6 will not be energized and consequently relay 9–PNR will be operated in a circuit from ground (FIG. 9) through the break contact 9–26–RES–7, the auxiliary contact of the reader 9–AUX–B, the diode 9–D17, now closed break contacts 9–4–R7–4, 9–4–R0–6, 9–4–R6–10, through the winding of the relay 9–PNR to the −48 volt D.C. source in FIG. 9. Thus, in this cycle of operation of the reader, when the reader contact 9–AUX–B is closed, operation of relay 9–PNR will ensue and this relay will lock up under control of the unoperated recognition relays 4–R6, 4–R7, 4–R0 and 4–R8A and its own locking contact 9–NR–3 in a circuit from ground (FIG. 9) through the break contacts 9–4–R6–7, 9–4–R7–7, 9–4–R0–8, 9–4–R8A–8, and its own locking contacts 9–PNR–3.

The energization of relay 9–PNR will open its break contact 3–9–PNR–10 to break the operating circuit to the reader clutch magnet 3–RCM and will also effect the operation of relay 18–PFR which is the pull-forward relay. The circuit for operating relay 18–PFR extends from ground (FIG. 18) through the now closed make contacts 18–9–PNR–2 and 18–9–P06R–2 and through the break contacts 18–20–UDR–5 and 18–9–P67R–6 and the winding of the relay 18–PFR to −48 volt D.C. source in FIG. 18. In addition the energization of the relay 9–PNR will open the locking circuit of the transmitter off-hook relay 10–TOHR by opening its break contacts 10–9–PNR–8 which is in one of the locking circuits for transmiter off-hook relay 10–TOHR.

The release of the reader clutch magnet as just described will stop the transmission to the monitor and line at the end of the cycle of operation in which the relay 9–PNR was operated. As soon as relay 18–PFR is energized, it will open its contacts 7–18–PFR–5 to cause the release of relay 7–TCR. In this same cycle, the opening of the contacts 3–DIST–AUX–D, which occurs just prior to the end of the cycle, will cause the release of the relay 10–TOHR by breaking the only remaining path from ground through terminal TN–38 on FIGS. 3 and 10 and diode 10–D29 to the relay 10–TOHR.

When relay 10–TOHR is released, it will release relay 10–TOHA which is a transmitter off-hook relay A, by reopening make contacts 10–TOHR–7. The release of relay 10–TOHR will also release the on-hook relay 10–ONHR by reopening its make contacts 10–TOHR–9 and will also release the on-hook relay 10–OH in the subscribers set shown in FIG. 10 by opening its make contacts 10–TOHR–1. Since the transmitter off-hook relay 10–TOHR controls the coding circuit for relays 14–ABR, 4–CFR, 18–PBRB and 23–MBR, it will release these relays by opening its contacts 14–10–TOHR–3, 14–10–TOHR–11, 18–10–TOHR–10, 23–10–TOHR–5, respectively. When relay 10–TOHA is released, it will open the circuit to time out relay A, 24–TORA by opening its make contacts 24–10–TOHA–8.

When the answer-back relay 14–ABR is released, it blinds the monitoring teletypwriter by reclosing its contacts 23–14–ABR–5. When relay 14–CFR, which is the confirmation relay, is released, it releases the upper notch memory relay 17–UNMR by opening its make contacts 17–14–CFR–12. Relays 29–P3R and 33–P3X are released due to the release of the on-hook relay 10–0NHR which in opening its contacts 29–10–ONHR–8 opens the circuit to relay 29–P3R which in turn in being deenergized opens its contacts 33–29–P3R–12.

If in this pass of the tape to transmit the message to the three connected stations, the unsent DDD number relay, 44–UDR had been pulled up in a circuit from ground, FIG. 20, through the closed break contacts 20–21–STC–1 and 20–9–P068R–7 and the closed contacts 20–9–P07R1–1 through the winding of the relay 20–UDR to the −48 volt D.C. source, it will initiate further dialing operations. Relay 20–UDR will be pulled up whenever the reader detects perforations in the "0" and "7" level of the tape and has not detected perforations in the "6" and "8" levels of the tape at the start of the "DDD" number sequence. Once the relay 20–UDR is thus energized it will lock up through the normally closed break contacts of the taut-tape relay 20–16–TTR–5 and its own locking contacts 20–UDR–2 to ground in FIG. 25. When relay 20–UDR is not energized and the transmitter off-hook relay is deenergized, the tape will be fed through the reader past the end-of-message sequence, searching for the next start-of-message condition or taut-tape condition, in a circuit from ground in FIG. 31 through the now closed break contact 31–32–ONX–7, terminal A–27 on FIGS. 31 and 3, now closed break contact 3–9–P07R1–8, now closed make contacts 3–8–SRR–12, break contacts 3–13–LNSS–INT and the now closed break contacts 3–24–TOTR–9, 3–10–TOHA–4, 3–20–UDR–6, 3–9–P67R–5, 3–9–P7R–8, 3–9–P07R2–5, 3–4–R8B–2, 3–12–IDSR–7, 3–12–ITRA–5, 3–14–CAR–4, 3–26–RES–6, 3–26–SALA–7, 3–26–SALB–5, 3–18–PFR–4, 3–PSR–10 and the winding of the reader clutch magnet 3–RCM to the −48 volt D.C. source in FIG. 3. When the tape is fed forward under this condition it will continue to feed until it reads the start-of-message code of a succeeding group of direct distance dialing numbers to which another message is to be transmitted. The reader clutch magnet 3–RCM will remain energized over this circuit to advance the tape until the reader senses the first character of the start-of-message sequence of the next message, at which time a cycle of operation will be reinitiated as described in connection with the reading of the first start-of-message code sequence in Section 1.

*11. Blinding uncalled DDD number after pull back*

The description thus far has assumed that three addresses were to receive the message text and consequently, the address of only three terminating stations were perforated in the tape. In the event that it is desired to transmit the same message to more than three addresses or terminating stations, the tape would be perforated as shown in FIG. 2 with the telephone address and the mnemonic code for one terminating station appearing, respectively, in the portions bracketed B and C, and then instead of having the end-of-address code perforated after the third terminating station's address, there would be the direct distance dialing numbers of other stations, such as shown bracketed by the letter D, and the mnemonic code of those stations, as bracketed by the letter E, preceding the end-of-address code and time of day and identification of the originating station. The message text may be sent to any desired number of terminating stations and this may be done by entering the addresses in the form of the direct distance dialing numbers and the mnemonic codes for the addressed terminating stations in sequence prior to the end-of-address code in the tape. When a multiple address, such as that just described, is to be transmitted the direct distance dialing numbers for the terminating stations to which a connection has not been completed, will not be transmitted to the terminating stations which have been connected to the originating station, but the mnemonic code for those stations will be transmitted to the called terminating stations to which connections have been completed. Consequently, it becomes necessary to blind the uncalled direct distance dialing numbers and this is effected by the reader sensing the presence of the "0" control hole in the tape which forms a part of the code sequence for a direct distance dialing number. As described hereinabove, the sensing by the reader of a perforation at the "0" level of the tape in connection with Section 3, regarding the dialing operation, the following relays will be energized: Recognition relay 4–RO for the "0" hole, line unblinding relay 4–LUR, and then when the reader contacts 9–AUX–B close, relay 9–POR, that is the permutation zero relay, and relay 9–LSR, the line shunting relay will be operated. In being operated, relay 9–LSR will apply ground to the distributor contacts 1 to 5, shown on FIG. 11, and since the distributor shaft is starting its cycle at this time, with ground applied to all of the distributor contacts, the "LETTERS" combination will be transmitted to the line and the monitor, for the first character of the DDD number. As the reader contacts 13–AUX–A close, at the start of the next cycle of the reader shaft, the line blinding relay 13–LBR will be operated, as described in Section 3 in connection with the dialing operation, to complete the short around the distributor contacts 1 to 5 as shown on FIG. 11. As the first digit of the uncalled direct distance dialing number is sensed, the control holes "0" and "7" are sensed and this will cause relay 4–R7 to be operated and relay 4–RO will remain operated from the previous sensing of the "0" control hole. The operation of the circuit during the time that the reader is reading the direct distance dialing numbers will be the same as in connection with the dialing operation considered under Section 3 with the exception that the lower notch stepping switch 13–LNSS will not be operated at this time, as its operating path is open due to the fact that the upper notch memory relay 17–UNMR has been pulled up. Relays 9–P07R1 and 9–P07R2 will be operated and when relay 9–P07R1 is operated, it will complete a circuit to operate relay 20–UDR by closing its contacts 20–9–P07R1–1 and the energization of relay 9–P07R2 will release relay 9–POR by opening its contacts 9–P07R2–7.

The tape will keep on advancing through the reader head with the "0" and "7" control holes being sensed to keep the relays 4–LUR and 13–LBR operated thereby to keep the line and monitor blinded. This will continue until the reader senses the first character without control holes following the direct distance dialing numbers, whereupon, relays 4–LUR, 4–RO and 4–R7 will be released since these relays are only held up when the reader finds control holes such as the "0" hole, and the "7" hole in the tape. When relay 4–LUR, that is the unblinding relay, is released it will release the line blinding relay 13–LBR by opening its contacts 13–4–LUR–4, and the permutation "0–7" relay No. 2, 9–P07R2 by opening its contacts 9–4–LUR–9. When in this cycle of the reader, the reader contacts 9–AUX–B close, the relay 9–PNR will be energized over the path to this relay described hereinbefore in connection with the operation of it. Similarly, relay 9–LSR will be deenergized due to the break of the circuit to it at the contacts 9–4–LUR–9. With this condition of the circuitry, the tape will be advanced through the reader to present the code combinations for the mnemonic codes of the addressed stations and through the end-of-address, text and end-of-message code sequence, to transmit to the line, the connected stations and the monitor, by way of the reader sensing contacts shown on FIG. 11, and their associated distributor contacts, and the sending relay 11–SLR and monitoring line relay 11–MLR. After the reader contacts sense the "0" and "6" control holes associated with the third "N" of the series of "N's" in the end-of-message code sequence and they sense the fourth "N," the tape will be pulled back in a manner to be described hereinafter.

*12. Counting dialing attempts*

As described in Section 3, under the dialing operation, at the completion of the feeding of each DDD number to an originating subscribers set, in the "dialing" of the DDD numbers by the subscriber sets, a pierce is made in the tape at the eighth level to record the fact that the dialing attempts have been made for each DDD number. When a number is dialed and the receiving station is not connected, due to a busy or a trouble condition, it will be necessary to redial the direct distance dialing number. The sensing of No. 8 pierce in the tape and the absence of a pierce in the No. 6 position of the tape indicates that an attempt has been made to complete a connection to an addressee having a certain direct distance dialing number and this attempt has been unsuccessful. When the tape reader fails to find a pierce in the sixth level of the tape and finds a pierce in the eighth level of the tape, for any one or more of the three addressee's, whose addresses were in the tape and to whom connections had been attempted, relay 4–R8A and 4–R8B will be operated upon sensing such a condition. The relay 13–TRR, which is the timer reset relay, will be operated upon the closure of the reader contact 13–AUX–A in a circuit from ground in FIG. 13 through the now closed contacts 13–AUX–A, break contacts 13–12–ITRB–6, break contacts 13–14–CFR–6, which is closed at this time due to the fact that the confirmation relay has not pulled up, thence through the diode 13–D35 and the make contacts 13–7–TCR–12, through the winding of the relay 13–TRR to the —48 volt D.C. source in FIG. 13. The operation of the relay 13–TRR will partially close the operating path to the relay 4–R8B and the relay 4–R8B will be pulled up together with the relay 4R8A in a circuit from ground in FIG. 4, through terminal MD–147 in FIGS. 4 and 11, through the now closed reader contact 8 shown in FIG. 11, terminal MD–187 on FIGS. 11 and 4 and through the now closed contact 4–R7–10 to the winding of the relay 4–R8A and from the terminal MD–187 through the now closed make contact 4–13–TRR–12 and the winding of the relay 4–R8B to —48 volt D.C. source in FIG. 4.

As described hereinbefore the operation of the relay 13–TRR will shunt the capacitor 24–C1 by closing its contacts 34–13–TRR–2. When the relay 4–R8B operates, it will close its contacts 13–4–R8B–6 to complete a circuit from ground, through the now closed break contacts 13–12–ITRB–7, 13–4–R6A–7, now closed make contacts 13–4–R8B–6, diode 13–D39 and now closed break contacts 13–9–P068R–8, 13–33–EO–12 and 13–17–UNMR–10 and through the winding of the lower notch stepping switch magnet 13–LNSS to —48 volt D.C. source in FIG. 13. When the normally open reader contact 13–AUX–A opens in this cycle of operation, it will break the circuit from ground in FIG. 13 that had energized the relay 13–TRR which will thereupon open the circuit to relay 4–R8B to cause this relay to release. Since the relay 4–R8B has a shorted secondary winding, it will be slow to release and will allow the lower notch stepper switch magnet 13–LNSS to operate before becoming completely deenergized. Since the lower notch stepping switch magnet 13–LNSS had been connected to ground potential through the closing of the make contacts 13–4–R8B–6, the opening of these contacts on the release of relay 4–R8B will deenergize the lower notch stepping switch magnet 13–LNSS and cause it to step from its normal position into Position 1. Relay 4–R8B in becoming deenergized will close its contacts 3–4–R8B–2 to close an operating path to the reader clutch magnet 3–RCM.

Since, as just described hereinbefore, the lower notch stepper switch magnet 13–LNSS will be stepped to its No. 1 position under control of the relay 4–R8B, control of the magnet 13–LNSS will be transferred to the reader contacts 13–AUX–A. In stepping over the ten digits of the direct distance dialing number perforated in the tape the magnet 13–LNSS will be operated in a circuit from ground (FIG. 13) through contacts 13–AUX–A, now closed break contact 13–12–ITRB–6 and the now closed make contact 13–9–P07R1–9 or 13–9–POR–12 and the diode 13–D33 and now closed break contact 13–9–P068R–8, 13–33–EO–12 and 13–17–UNMR–10 and will arrive at its No. 10 position one character earlier than it did when operating in the manner described under dialing operation in Section 3. Thus, the lower notch stepping switch 13–LNSS will be operated under control of the reader contact 13–AUX–A in the manner described under the dialing operation in Section 3, but due to the additional step of the lower notch stepper switch 13–LNSS through relay contacts 13–4–R8B–6 the stepper switch 13–LNSS will actuate the lower notch magnet 13–LNM one code combination earlier in its operation than it did under dialing operation, and when the brush on ARC–1 of the lower notch stepper switch 13–LNSS reaches contact 10 it will energize the lower notch magnet 13–LNM upon the closure of the reader contact 13–AUX–A in that cycle of operation in a circuit from ground (FIG. 13) through the reader contact 13–AUX–A, now closed break contact 13–12–ITRB–6, then through the common brush of ARC–1 of 13–LNSS and the contact at Position 10 of ARC–1 of 13–LNSS through the now closed make contact 13–9–P07R1–6 and now closed break contact 13–21–STC–8, the winding of the lower notch magnet 13–LNM to —48 volt D.C. source in FIG. 13. This will cause the piercing of a hole at the eighth level of the tape under the "LETTERS" code combination of the start-of-message code sequence.

Thus, the first No. 8 pierce to record a dialing attempt is under the "FIGURES" character at the start of the DDD number, the second No. 8 pierce to record that a second dialing attempt has been made is under "LETTERS" character at the end of the start-of-message code sequence, and the third and last No. 8 pierce to record a third dialing attempt is under the "LINE FEED" code combination of the start-of-message code sequence. In the event that the connection is not completed to the addressee whose direct distance dialing number is perforated in the tape after making three attempts to make such a connection the message will be sent to an intercept station which is explained hereinafter in Section 13 under Intercept Call Initiation.

In Section 9 under the heading, Pull Back After Confirmation Mnemonics, the operation of the system was described with the assumption that connections had been established to all three of the addressees whose direct distance dialing numbers were in the first three areas of the tape. The transmission of the message to those connected stations was effected. In the event that at least one of the first three addressees had a connection completed to its station, the message would be transmitted to that station or the connected stations as described hereinbefore. If one or two of the terminating stations to which connections were sought to be established were not reached and confirmed, the message would be sent to those stations to which connections had been completed and the tape, on its next passage through the reader, will not have a perforation in the sixth level and consequently that direct distance dialing number or those direct distance dialing numbers which had not been reached will again be dialed together with one or two more terminating stations whose addresses appear in the tape. For example, if connections were established to the first and second addresses in the tape the apparatus would transmit to those stations and on the next passage of the tape an attempt would be made to reach the second address and the fourth and fifth addresses perforated in the tape in the form of DDD numbers and mnemonics. This procedure would be repeated and the failure of a third attempt to complete a connection to a terminating station, the address of which is in the tape, will initiate a call to the intercept station.

13. *Intercept call initiation*

After the sending or originating station has failed on three attempts to receive an answer-back signal and confirmation signal from an addressed terminating station, the tape will contain perforations in the eighth level in the form of pierced holes and will not have a pierced hole in the sixth level in line with any one of the pierced holes in the eighth level. The pierced holes in the eighth level will appear under the code combination for "FIGURES" at the beginning of the direct distance dialing number, under the code combination for "LETTERS" in the start-of-message code sequence and under the "LINE FEED" code combination in the start-of-message code sequence as bracketed at A in FIG. 2. Thus, when the tape is pulled back and the reader shaft starts its sensing cycle, it will sense the third, second and first holes pierced at the eighth level of the tape and when it senses the pierce that is under the "FIGURES" character at the start of the direct distance dialing number, which has an associated "0" control hole, the reader contact 13–AUX–A will close and will effect the operation of the relay 13–TRR as described hereinbefore. The sensing of the "0" and "8" control holes will also operate relay 4–RO, 4–R8A, and 4–R8B in the manner described in connection with the counting of dialing attempts in Section 12 to release the reader clutch magnet 3–RCM as also described in Section 12.

In this sensing cycle when the reader contacts 13–AUX–A open they will release the relay 13–TRR and when the reader contacts 9–AUX–B close later on, towards the end of this cycle, relays 9–POR, 12–ITRA and 12–ITRC will be energized. The path for energizing relay 9–POR extends from ground (FIG. 9) through the now closed break contacts 9–26–RES–7, the now closed contact 9–AUX–B, the diode 9–D17, now closed break contact 9–4–R7–4, now closed make contact 9–4–RO–6, now closed break contact 9–4–R6–8 (since the reader did not detect a hole in the sixth position of the tape at this code combination), then through the diode 9–D23, now closed break contact 9–P068R–5 and the winding of the relay 9–POR to the −48 volt D.C. source in FIG. 9. The circuit for energizing the relays 9–ITRA and 9–ITRC will be completed from ground in FIG. 9 through the now closed break contacts 9–26–RES–7, the reader contacts 9–AUX–B, the diode 9–D17, the now closed break contacts 9–4–R7–4, the now closed make contact 9–4–RO–6, the now closed break contact 9–4–R6–8, now closed make contacts 9–4–R8B–4 and 9–4–R8A–1, the terminal TJ–40 on FIGS. 9 and 12, the now closed break contact 12–13–TRR–10, the common brush of the ARC–3 of the lower notch stepping switch magnet 12–13–LNSS, and the No. 2 terminal on this ARC and then through the now closed break contact 12–ITRB–11 to the winding of the relays 12–ITRA and 12–ITRC and thence to −48 volt D.C. source in FIG. 12. With the opening of the make contact 4–13–TRR–12, the slow release relay 4–R8B will be released and the release of relay 4–R8B will open its contacts 13–4–R8B–6 the stepper switch 13–LNSS will step to its third position.

When relay 9–POR is energized, it will lock operated in a path from ground (FIG. 9) through the now closed break contacts 9–26–RES–7, the now closed break contacts 9–P068R–10, 9–18–PBRB–10 diode 9–D24, now closed break contacts 9–P07R2–7 and its own make contacts 9–POR–6 and the break contacts 9–P068R–5. When relay 12–ITRC is energized it will close an operating path to the intercept stepping switch 3–INSS from ground in FIG. 3 through the now closed make contacts 3–12–ITRC–5 and now closed break contacts 3–12–ITRB–3, through the winding of the intercept stepping switch magnet 3–INSS–MAG to −48 volt D.C. source in FIG. 3. The relay 12–ITRC on becoming energized will lock operated through a circuit extending from ground in FIG. 12, through the now closed break contacts 12–26–RES–9, 12–14–CFR–8, and its own make contact 12–ITRC–2. The same locking path will also lock relay 12–ITRA operated. The energization of relay 12–ITRC will also connect the distributor contacts 1 to 5 shown on FIG. 11 to ARC's 6 to 10, respectively, of the intercept stepper switch 11–3–INSS by closing its contacts 11–12–ITRC–4, 6, 8, 10, and 9, respectively.

When the relay 12–ITRA is energized, it opens the operating path to the reader clutch magnet 3–RCM by opening its break contacts 3–12–ITRA–4 and through the same contacts transfers the ground path to partially close an operating path for the distributor clutch magnet 3–DCM. In operating, the relay 12–ITRA also prepares a path for the operation of the intercept stepping switch 3–INSS by closing its make contact 3–12–ITRA–10 to place the intercept stepping switch 3–INSS under control of the subscriber set and in closing its contacts 3–12–ITRA–12 prepares a path from the distributor auxiliary contacts 3–AUX–D to control the intercept stepper switch 3–INSS in the event that an answer back is received from the intercept terminating equipment. The operation of the relay 12–ITRA causes the lower notch stepping switch 13–LNSS to be returned to its home or normal position by completing a circuit from ground in FIG. 12 through the now closed break contact 12–26–RES–9, the off-normal switch contact of the lower notch stepping switch 12–13–LNSS–ON–4, the terminal TK–18 on FIGS. 12 and 13, now closed contacts 13–12–ITRA–2, now closed break contacts 13–12–ITRB–1 and 13–9–P07R2–6, contacts of the stepper switch 13–LNSS–INT–1 through the winding of 13–LNSS–MAG to −48 volt D.C. source in FIG. 13. The lower notch stepper switch interrupter contact 13–LNSS–INT–1, operates repeatedly and the off-normal switch 12–13–LNSS–4 is closed at all times that the lower notch stepping switch is out of its normal position. Thus, the lower notch stepping switch 13–LNSS will be returned to its home position and will stop in that position.

When the lower notch stepping switch 13–LNSS arrives in its home position, it will operate the relay 12–ITRB in a circuit from ground (FIG. 12) through the now closed break contact 12–26–RES–9, the now closed break contact 12–13–LNSS–ON–5, now closed make contact 12–ITRC–11 and the winding of the relay 12–ITRB to −48 volt D.C. source in FIG. 12. Energization of the relay 12–ITRB will open its contacts 3–12–ITRB–3 to deenergize the intercept stepper switch magnet 3–INSS–MAG, thus to cause the intercept stepper switch 3–INSS to step to Position 1. When relay 12–ITRB is energized it will close its make contacts 32–12–ITRB–4 to connect ground in FIG. 32 through the winding of intercept relay 32–ITR to −48 volt D.C. source in FIG. 32 to energize relay 32–ITR. When relay 12–ITRB is energized, it will lock energized in a path from ground (FIG. 12) through the now closed break contacts 12–26–RES–9 and 12–29–P3R–10 and its own contacts 12–ITRB–12. When relay 12–ITRB is energized, it will open the operating path to the upper notch magnet 17–UNM and to the upper notch magnet memory relay 17–UNMR by opening its break contact 13–12–ITRB–9. When the intercept stepper switch moves into Position 1, it will initiate an intercept call as described hereinafter.

14. *Dialing the intercept DDD number*

When the intercept stepper switch 3–INSS has been stepped to Position 1, it will through its ARC–2, shown in FIG. 9, complete a circuit from ground (FIG. 9) through break contact 9–26–RES–7 and the brush associated with 9–3–INSS–ARC–2 and contacts 1 to 10 of ARC–2, then through the now closed make contacts 9–12–ITRC–12 and the break contacts 9–P068R–4 through the winding of relay 9–P07R1 to the −48 volt D.C. source in FIG. 9. This path will also be completed through break contact 9–P068R–6 and the winding of the relay 9–P07R2 to the −48 volt D.C. source in FIG. 9 to energize both relays 9–P07R1 and 9–P07R2. When relay 9–P07R1 is energized, it will cause the operation of relay 10–TOHR, 10–TSR, 20–UDR in the same manner that they were operated in connection with the regular dialing operation as described under Section 3.

If the apparatus is conditioned for multi-entry operation at the time when there is a failure to receive a confirmation signal after three attempts, the stepper switch 31-SS will be stepped to Position 1. The circuit for thus selecting the first of the secondary subscribers sets is completed by relay 9-P07R1 which in closing its contacts 31-9-P07R1-12 completes a path from ground in FIG. 25 through now closed break contacts 25-26-RES-5, terminal TH-12 on FIGS. 25 and 10, now closed make contacts 10-9-P07R1-12, now closed break contacts 10-14-ABR-7, terminal A-60 on FIGS. 10 and 31, now closed break contacts 31-32-OS-1, stepper switch off-normal break contacts 31-SS-ON-6 and the winding of switch 31-SS to −48 volt D.C. source in FIG. 31.

When the stepper switch 31-SS steps to Position 1 it will complete a circuit from ground in FIG. 31 through now closed break contacts 31-33-EOX-1, its brushes in Position 1, now closed break contacts 31-L1 and the winding of the first relay 31-DC to −48 volt D.C. in FIG. 31 to energize the relay 31-DC of the first subscriber's set. The energization of this relay 31-DC will close a circuit from ground in FIG. 32 through make contacts 32-31-DC-19 and 32-ITR-1 and the winding of original state relay 32-OS to −48 volt D.C. source in FIG. 32 to operate relay 32-OS which will lock operated through its locking make contacts 32-OS-4, diode 32-D5, terminal A-13 on FIGS. 32 and 10, now closed break contacts 10-26-SALA-9 and now closed make contacts 10-TOHR-1 to ground in FIG. 10. This places the apparatus in the same condition it would be in if it were operating as a single entry device as will be described in Sections 19 through 24.

If the unit had been set manually for single entry operation, the original state relay 32-OS would have been operated through the keys which control the single entry in a circuit from ground in FIG. 32 through now closed break contacts 32-33-E0-8, 32-ONX-3 and the closed contacts 7 of line off keys L2 and L3 through the winding of the original state relay 32-OS to −48 volt D.C. source in FIG. 32. When the first data set connect relay 31-DC was operated it completed a path from ground in FIG. 25 through now closed break contact 25-26-RES-5, terminal TH-12 on FIGS. 25 and 10, now closed make contact 10-9-P07R1-12, now closed break contacts 10-14-ABR-7, terminal A-60 on FIGS. 10 and 32, now closed break contacts 32-33-E0-2, now closed make contact 32-31-DC-2, diode 32-D6 and the winding of the telephone off-hook relay 32-TOH to −48 volt D.C. source in FIG. 32. With the relay 32-TOH operated the first of the data sets will control the stepping of the switch 3-INSS to effect the dialing of the direct distance dialing telephone number of the intercept station. When relay 9-P07R2 is energized, it will release 9-POR by opening the locking path to the relay 9-POR at contacts 9-PO7R2-7 and relay 9-P07R2 will lock up through its own contacts in a circuit from ground (FIG. 9), the now closed break contacts 9-26-RES-7, now closed break contacts 9-14-ABR-1, now closed make contacts 9-32-OS-11, diode 9-D19, now closed break contacts 9-24-TORA-7 and its own contacts 9-P07R2-2 and break contacts 9-P068R-6. When relay 10-TOHR is operated, the circuit action that follows the operation of this relay is the same as that described under the dialing operation in Section 3 when relay 10-TOHR was operated, until the first digit is to be presented to the telephone subscriber's subset.

In this case the direct distance dialing number is not read from the tape since the tape is not being fed past the reader, but rather the direct distance dialing number of the intercept terminating station is dialed under control of the intercept stepping switch 3-INSS which in its ARC No. 5, as shown on FIG. 29, has the terminals TP-1 to 10 connected to the terminals TP-11 to 20 in such a manner as to apply ground from the sending or originating subscriber's set, as shown in FIG. 29, through break contacts 29-TAXA-2 and the now closed make contact 29-DM-11 (the subscriber's set being in dial mode) and now closed make contacts 29-12-ITRA-6 to the common brush of 29-INSS-ARC-5 and through the contact in Position 1 of this intercept stepping switch 29-3-INSS-ARC-5 to one of the leads connected to the terminals TP-11 to 20 on FIG. 29, thus, to selectively supply ground to one of the terminals TK-20 to TK-29 which are connected into the subscriber's set. When the subscriber's set requests the next digit, as was described in connection with the dialing operation in Section 3, it will step the intercept stepper switch 3-INSS to Position 2 and will continue to step the intercept stepping switch 3-INSS, step-by-step, until the stepper switch has arrived in Position 11. The circuit for intermittently operating the intercept stepper switch 3-INSS originates at ground in the sending subscriber's set shown in FIG. 3 through diode 3-D11, now closed make contacts 3-12-ITRA-10, now closed break contact 3-14-ABR-8, and the winding of the intercept stepper switch magnet 3-INSS-MAG to −48 volt D.C. source in FIG. 3.

By reference to FIG. 13 it will be seen that when the intercept stepper switch 3-INSS moves into Position 5, it will complete a circuit to operate the lower notch stepping switch magnet 13-LNSS by connecting the ground associated with ARC-3 of 13-3-INSS through the common brush and contact 4 of ARC-3 of 13-3-INSS through the winding of the lower notch stepping switch magnet 13-LNSS to −48 volt D.C. source in FIG. 13. As the intercept stepping switch 3-INSS moves into Position 6, it will break the circuit to the lower notch stepping switch magnet 13-LNSS which has just been described. This will cause the lower notch stepping switch 13-LNSS to step into Position 1 thereby to record that an attempt has been made to reach the intercept direct distance dialing terminating station.

When the intercept stepper switch 3-INSS moves to Position 11, relay 9-P07R1 will be deenergized since the operating circuit to it had been broken by the operation of relay 12-ITRA in opening contacts 9-12-ITRA-11 and relay 9-P07R1 was held operated through the intercept stepper switch 9-3-INSS-ARC-2 in Positions 1 to 10 and through the closed contacts 9-12-ITRC-12 and 9-P068R-4. Thus, when the intercept stepper switch reaches its eleventh position, the circuit for holding relay 9-P07R1 operated, will be broken and in releasing relay 9-P07R1 will open its contact 10-9-P07R1-12 to release the dial mode relay 10-DM in the subscriber's set. After this occurs, the transmitting station will wait for an answer-back signal as described in the next section under Answer-Back Received in Response to the Calling of an Intercept Number.

The timing circuit for causing the transmitting circuit to wait for an answer-back signal from the intercept station is the same circuit used in the system of the copending application of Huffman et al. mentioned hereinbefore. This circuit is used since it is undesirable to go forward with the dialing of new DDD numbers until the message to the unconnected addressee's terminating station has been processed. Therefore, instead of dialing new DDD numbers while the timing circuit goes through its cycle, up to six attempts will be made to send the message to the intercept station and the originating station will wait up to eleven seconds to receive an answer back from the intercept station. This time interval of eleven seconds is controlled by the timer relay circuit shown in FIG. 24 which is called into operation by operating and then releasing the timer reset relay 13-TRR each time the make contacts 13-reader AUX-A closes and then opens provided the relay 12-ITRB and the relay 14-CFR are not energized. A circuit for operating the timer reset relay 13-TRR is completed from ground (FIG. 13) through make contacts 13-AUX-A, closed break contacts 13-12-ITRB-6, closed break contacts 13-14-CRF-6, diode 13-D-35 and closed make contacts 13-7-TCR-12 of the tape clamp relay now energized then through the winding of relay 13-TRR to the —48 volt D.C. source in FIG. 13. The operation of timer reset relay 13-TRR will release the timer relay circuit shown on FIG. 24 by closing its contacts 24-13-TRR-2. It should be noted at this time the line following relay 15-LFR is normally energized and consequently its break contacts 24-15-LFR-5 are open at this time.

The timer circuit illustrated in FIG. 24 initiates a timing cycle each time the relay 10-TOHA is operated due to the closing of the make contacts 24–10–TOHA–8 to apply a charging potential from ground in FIG. 24 through the 2.5 megohm variable resistor 24–VR–1, 2.2 megohm resistor 24–R–1, now closed break contact 24–14–CFR–7 to one side of the 4.28 mf. capacitor 24–C1, the other side of the capacitor 24–C1 being connected through the now closed make contact 24–10–TOHA–8, break contact 24–14–CFR–10, the winding of the relay 24–TORA to —120 volt D.C. source in FIG. 24. This circuit will not energize the relay 24–TORA but will apply a charging potential to the capacitor 24–C1. By regulating the variable resistor 24–VR–1 the charging rate of the capacitor 24–C1 may be varied up to eleven seconds and if the circuit for charging the capacitor 24–C1 is not disabled, the capacitor will charge in approximately eleven seconds and cause the timer tube 24–T1 to fire, thereby to complete a circuit from ground (FIG. 24) across the tube 24–T1 and through the now closed make contact 24–10–TOHA–8 and the now closed break contact 24–14–CFR–10 through the winding of the relay 24–TORA to operate the relay 24–TORA. As soon as the relay 24–TORA is energized it will lock up in a path from ground (FIG. 24) through the now closed break contact 24–12–ITRA–9, now closed make contacts 24–10–ONHR–10, its own contact 24–TORA–2 and resistance 24–R5, through the winding of the relay 24–TORA to the —120 volt source in FIG. 24. The sequence of operations initiated upon the failure to receive an answer back from the subscriber's set will be described hereinafter in Section 22 and it will be assumed for the present that a connection has been established.

The No. 5 cross bar telephone switching systems are provided with circuitry whereby the terminating cross bar office, operating in conjunction with the subscriber's receiving or terminating station, will cause a polarity change in the transmission circuit through the office, which results in circuit action at the transmitting stations subscriber's set to operate the answer-back relay 30–ABX and thereby establish a circuit from ground in the secondary through the now closed make contacts 33–30–ABX–9, 33–31–DC–12, 33–32–ITR–4, 33–32–ONX–10, terminal A–38 on FIGS. 33 and 14, now closed make contacts 14–10–TOHR–3, through the winding of relay 14–ABR to the —48 volt D.C. source in FIG. 14. This will indicate that a connection has been made through the telephone switching equipment to the intercept station. Operation of relay 30–ABX will cause energization of relay 33–EO in a circuit from ground in FIG. 33 through the now closed make contacts 33–30–ABX–9, 33–31–DC–12, 33–32–OS–7, diode 33–D7 and winding of relay 33–EO to —48 volt D.C. in FIG. 33. Relay 33–EO in operating will complete a circuit for operating relay 33–ST in a path from ground in FIG. 33 through now closed make contacts 33–E0–8, 33–30–ABX–8, 33–DC–1 and winding of relay 33–ST to —48 volt D.C. in FIG. 33. This operation of relay 33–ST will open its normally closed break contacts 30–33–ST–5 to unblind the individual line that is operative at this time.

*15. Answer-back received in response to intercept number*

At this point in the operation, the direct distance dialing number of the intercept station's terminating subscriber's set has been dialed and the transmitting station is waiting for an answer-back. When the receiving set at the intercept station goes off-hook, a circuit will be completed, similar to that completed when the terminating station was called under the dialing operation as described in Section 3, and relay 14–ABR will be operated by the circuit action in the sending or transmitting subscriber's set. When the relay 14–ABR is operated, it will unblind the monitor teletypewriter apparatus as described in connection with the dialing operation in Section 3 and will also remove the shunt from the monitor line relay 11–MLR as described hereinbefore and will also release relay 9–P07R2 by opening its contacts 9–14–ABR–1. The intercept stepping switch 3–INSS will also be removed from control of the sending subscriber's set by the opening of the break contacts 3–14–ABR–8 of the answer-back relay. The deenergization of relay 9–P07R2 will cause its break contacts 3–9–P07R2–5 to reclose and this will complete the circuit to operate the distributor clutch magnet. The circuit for operating the distributor clutch magnet will extend from ground in FIG. 31 through terminal A–27 on FIGS. 31 and 3 and then through the now closed break contact 3–9–P07R1–8, now closed stop-run relay make contacts 3–8–SRR–12, the now closed interrupter contact 3–13–LNSS-INT, the now closed break contact 3–24–TOTR–9 and the now closed break contacts 3–9–P06R–5, 3–9–P67R–5, 3–9–P7R–8, 3–9–P07R2–5, 3–4–R8B–2, 3–12–IDSR–7, now closed make contacts 3–14–ABR–12, now closed break contacts 3–14–CAR–4, 3–26–RES–6, 3–26–SALA–7, 3–26–SALB–5, 3–18–PFR–4, and now closed make contacts 3–12–ITRA–4 through the winding of the distributor clutch magnet 3–DCM to the —48 volt D.C. source in FIG. 3.

The energization of the distributor clutch magnet 3–DCM over the circuits just described will start the distributor shaft rotating and on each cycle of the distributor shaft the closing and opening of its contacts 3–AUX–D will repeatedly connect ground in FIG. 3 through the contact 3–DIST–AUX–D, terminal TN–38, closed make contact 3–12–ITRA–12 and 3–14–ABR–8 and the winding of the intercept stepper switch 3–INSS–MAG to the −48 volt D.C. source in FIG. 3 to cause this magnet to be energized once for each cycle of the distributor shaft. ARC–5, 6, 7, 8, 9 and 10 of the intercept stepper switch 11–3–INSS, as shown on FIG. 11, have their common brush connected to ground and have their contacts coded as indicated in FIG. 11 to transmit the mnemonic code for the intercept station by selectively applying ground to the distributor contacts 1 to 5 as shown in FIG. 11. As indicated in FIG. 11, ARC–6 of 11–INSS has its contacts in Positions 11, 17, and 20 connected to the distributor contact No. 1 through make contact 11–12–ITRC–4, ARC–7 has its contacts in the eleventh, twelfth, fourteenth, fifteenth, eighteenth and twentieth positions connected through now closed make contacts 11–12–ITRC–6 to the No. 2 distributor contact. Correspondingly, the other ARC's 8, 9 and 10 will supply ground, at the indicated position thereof, to the distributor contacts 3, 4 and 5, respectively, as the intercept stepper switch 3–INSS steps through Positions 11 to 20, thereby to transmit to the sending line relay and monitoring line relay 11–SLR and 11–MLR the mnemonic code for the intercept station.

When the intercept stepper switch 3–INSS is stepped into Position 20, it will complete a circuit from ground (FIG. 9) through the now closed break contact 9–26–RES–7, the common brush of 9–3–INSS–ARC–2 to the contacts in Positions 20 to 25 thence through the winding of relay 12–IDSR to the −48 volt D.C. source in FIG. 12 to energize relay 12–IDSR. When relay 12–IDSR is energized, it will open its contacts 3–12–IDSR–7 to break the circuit to the distributor clutch magnet 3–DCM. As soon as the distributor clutch magnet 3–DCM is released, transmission to the line and monitor over the monitor line relay 11–MLR and sending line relay 11–SLR will cease and the transmitting station will wait for confirmation of the completion of transmission of this mnemonic code to the intercept station.

16. *Confirmation received in response to intercept mnemonic*

As described hereinbefore, the direct distance dialing number of the intercept station has been transmitted to the line and upon receipt of the answer back and consequent energization of relay 14–ABR, the mnemonic code for the intercept station has been transmitted and the transmitting station is waiting for a confirmation signal to be received from the intercept station. If the intercept station has been reached through the direct distance dialing network, the receive line relay 30–RL will be operated in the teletypewriter apparatus at the transmitting station thereby to operate relay 14–CFR as described in connection with confirmation recorded in Section 7 hereinbefore. When confirmation relay 14–CFR is energized, it will cause the lower notch stepper switch 13–LNSS to return to its home or eleventh position by completing a circuit from ground in FIG. 13 through the common brush of 13–LNSS–ARC–2 and contacts 1 to 10 then through the now closed make contact 13–14–CFR–1 and the now closed break contacts 13–9–P07R2–6 and the interrupter contacts 13–LNSS–INT–2 to the winding of the magnet 13–LNSS and then to −48 volt D.C. source in FIG. 13. The relay 14–CFR on becoming energized will lock up through its own contacts in a path from ground (FIG. 33) through now closed make contacts 33–31–DC–11, 33–35–CFX–2, terminal A–31 on FIGS. 33 and 14 through now closed make contacts 14–CFR–5 and 14–10–TOHR–11 and thence through the winding of the relay 14–CFR to the −48 volt D.C. source in FIG. 14. Energization of the relay 14–CFR will also open its shunting contact 24–14–CFR–7 to add the resistor 24–R3 to the timer relay circuit so that the timer relay circuit will now take 45 seconds to time out rather than eleven seconds. In addition the operation of the relay 14–CFR will re-establish the circuit to the distributor clutch magnet 3–DCM which had been interrupted upon the energization of relay 12–IDSR. This re-establishment of the circuit to the distributor clutch magnet 3–DCM will be effected upon the closure of make contacts 3–14–CFR–11 which are connected in parallel with the contacts 3–12–IDSR–7. The operation of the distributor clutch magnet 3–DCM will initiate a cycle of rotation of the distributor shaft and, with the intercept stepper switch 3–INSS in Position 20, its ARC's 11–3–INSS, ARC's 6, 7, 8, 9 and 10 will code the distributor contact to send the "FIGURES" combination to the line and the monitor. When the distributor, in this cycle of rotation, closes its auxiliary contacts 3–DIST–AUX–D, the intercept stepper switch magnet 3–INSS–MAG will be energized through closed contacts 3–12–ITRA–12 and the closed make contacts 3–14–ABR–8 and in addition the relay 9–P07R2 will be operated in a circuit from the auxiliary contact 3–DIST–AUX–D terminal TN–38, now closed make contacts 3–12–ITRA–12, now closed make contacts 3–14–CFR–3 and 3–12–IDSR–12 and diode 3–D16, terminal TM–35 on FIGS. 3 and 9 through the winding of the relay 9–P07R2 to −48 volt D.C. source in FIG. 9.

When relay 9–P07R2 is thus energized, it will open the operating path to the distributor clutch magnet 3–DCM by opening its contacts 3–9–P07R2–5. As soon as the distributor, in this cycle of operation, reopens its auxiliary contacts 3–DIST–AUX–D, the circuit to the intercept stepper switch magnet 3–INSS–MAG will be broken and consequently the stepper switch 3–INSS will step to its twenty-first position. In moving into its twenty-first position, the intercept stepper switch 3–INSS will complete a circuit from ground in FIG. 3 through its common brush, 3–INS–ARC–1 and contacts 21 to 25 on this ARC of the stepper switch through the interrupter contacts 3–INSS–INT–2 to the intercept stepping switch magnet 3–INSS–MAG thus to drive the stepper switch 3–INSS back to its home or twenty-sixth position.

When the stepper switch 3–INSS arrives in its home position, the circuit from ground in FIG. 9 through the closed break contact 9–26–RES–7, and the common brush of 9–3–INSS–ARC–2 to the contacts 20 to 25 of this ARC of the interrupter stepper switch will be broken and consequently relay 12–IDSR will be deenergized. When the relay 12–IDSR is deenergized, it will open its contacts 3–12–IDSR–12 to open the circuit through terminal TM–35 on FIGS. 3 and 9 thereby to deenergize the relay 9–P07R2. When relay 12–IDSR is deenergized, it will also open its contacts 12–IDSR–8 thus to release relays 12–ITRA and 12–ITRC. When relays 12–ITRA and 9–P07R2 are deenergized together with relay 12–IDSR, the circuit path to the reader clutch magnet 3–RCM will be re-established by the closing of the break contacts 3–9–P07R2–5, 3–14–CFR–11 and 3–14–ABR–12 and as a result of the energization of the reader clutch magnet the tape will be advanced.

Since the tape was stopped with the first digit of the DDD number of the addressee to whom a connection had been attempted to be established in line with the sensing pins and the "FIGURES" code combination has been transmitted, the reader contacts will not read the tape and due to the fact that the relay 10–TSR is energized at this time the reader contacts will close the circuit from ground through the reader contacts 1 to 5 and thence over the make contacts 4, 6, 8, 10 and 2 of relay 11–10–TSR to the numbering relays 11–NR1 to 11–NR5, respectively, to energize these relays and cause them to close their contacts 11–NR1–9, 11–NR2–9, 11–NR3–9, 11–NR4–9, 11–NR5–9, selectively. The relays 11–NR1 to 11–NR5 will thus, under control of the reader contacts 1 to 5 shown in FIG. 11 complete circuits from ground in FIG. 11 through their respective closed contacts and the now closed break contacts 11–12–ITRC–4, 6, 8, 10 and 7 of relay 11–12–ITRC to the distributor contacts 1 to 5 shown in FIG. 11 which will apply this ground to the monitor line relay 11–MLR and sending line relay 11–SLR to cause transmission of the direct distance dialing number of the party to whom an unsuccessful attempt has been made to complete connection. This operation will continue until the complete direct distance dialing number of the called terminating station and the mnemonic code for the called terminating station have been transmitted over the line to the intercept station.

At the end of the mnemonic code for the called terminating station the "SPACE" character code combination will be sensed at the end of the mnemonic code to operate relay 11–NR3 without operating any other of the numbering relays 11–NR1, 11–NR2, 11–NR4 or 11–NR5 to complete a circuit from ground in FIG. 9 through the now closed break contact 9–26–RES–7 the reader contact 9–AUX–B, terminal TE–8 on FIGS. 9 and 29, the now closed make contacts 29–11–NR3–12, and the now closed break contacts 29–11–NR4–10, 29–11–NR5–10, 29–11–NR1–6, and 29–11–NR2–10, closed make contact 29–10–ONHR–8 and the winding of relay 29–P3R to the −48 volt D.C. source in FIG. 29. When relay 29–P3R is energized relay 33–P3X will be energized with relay 29–P3R over the circuit from now closed break contact 29–11–NR2, through terminal A–29 on FIGS. 29 and 33 and thence through the winding of relay 33–P3X to the −48 volt D.C. source in FIG. 33. When, at the end of this cycle of operation the distributor contacts 3–DIST–AUX–D open with relay 24–P3R operated, relay 12–ITRB will be released by the opening of the 3–AUX–D contacts. When relay 29–P3R is operated, it will lock operated, with relay 33–P3X, in a path from ground in FIG. 9 through closed break contacts 9–26–RES–7, terminal TH–19 on FIGS. 9 and 33, now closed break contacts 33–17–UNMR–7, now closed make contacts 33–29–P3R–12, now closed break contacts 33–EOX–9, 33–36–NC–9, terminal A–29 on FIGS. 33 and 29, now closed contacts 29–10–ONHR–8 and winding of relay 29–P3R to −48 volt D.C. source in FIG. 29 and relay 29–P3R will stay operated so long as the relay 10–ONHR holds its contacts 29–10–ONHR–8 closed. When relay 31–P3X is operated, it will open the circuit to the reader clutch magnet 3–RCM by breaking its break contacts 31–33–P3X–3 thus, to stop the reader at this position. Relay 33–P3X in being energized will close its make contacts 31–33–P3X–2 to connect ground (FIG. 31) through now closed make contacts 31–33–E0–7 and the winding of switch drive relay 31–SSD to −48 volt D.C. in FIG. 31 to energize relay 31–SSD. The energization of relay 29–P3R will also open the locking path to relay 10–TSR by opening its break contacts 10–29–P3R–7. Release of relay 10–TSR in turn releases relay 11–NR3 by opening its make contacts 11–10–TSR–8.

Upon its release, as just described, relay 12–ITRB will close its break contacts 17–12–ITRB–9 and due to the fact that the confirmation relay 14–CFR had been operated and had closed its contacts 17–14–CFR–12, the upper notch magnet 17–UNM will be energized as will be the slow to operate upper notch memory relay 17–UNMR. The relay 17–UNMR being slow to operate will not operate until after the upper notch magnet 17–UNM has caused a pierce to be formed in the sixth level control hole of the tape to record in the tape the receipt of confirmation, whereupon the upper notch magnet 17–UNM will be denergized due to the opening of the contact 17–UNMR–3. In addition to opening the circuit path to the upper notch magnet 17–UNM, the operation of the relay 17–UNMR will close a circuit to energize the pull-back relay 18–PBRA in a circuit from ground in FIG. 18 through the now closed make contacts 18–17–UNMR–8, now closed break contacts 18–9–P7R–4 and 18–9–P06R–8 and 18–PBRB–5 through the winding of the relay 18–PBRA to −48 volt D.C. source in FIG. 18. The operation of the circuit will now be the same as that described under the Pull Back After Confirmation in Section 9 hereinbefore.

17. *Foreign interconnect or broadcast messages with call direction codes*

In the description thus far it has been assumed that the message to be transmitted has been directed to terminating stations on this system or upon failure of the completion of a connection to a terminating station on this system the messages have been transmitted to the intercept terminating station. If it be assumed that a message is to be sent to a station not on this system, i.e., a system to which the present system has access, but at a single point rather than access to all of the stations on the foreign system, the tape will be prepared in a slightly different manner. When such connections are to be made a tape is prepared, under control of the Codomat card or under control of the operator, with a direct distance dialing number followed by either a mnemonic code sequence or a pseudo-mnemonic code sequence. If the message is to be a broadcast message, that is, a message simultaneously transmitted to a number of terminating stations on a system other than the present system, then the Codomat card is prepared, having on it control perforations that will cause the tape to be perforated with the direct distance dialing number address of a terminating station which can connect into a broadcast type of circuit. This direct distance dialing number will then be followed by mnemonic code sequence indicating that a broadcast message is to be sent, such for example as the sequence W. B. C. S. T. D. L. SPACE and each of these characters comprising the mnemonic code for the broadcast circuit will have perforations in the seventh level. The tape may then be perforated with a call direction code such as A, B, "LETTERS" having the sixth level perforated for each of the characters of this sequence. This will then be followed by the mnemonic code for the terminating station to which the message is to be sent, followed by a "SPACE" code. This may then be followed by the call direction code and mnemonic code of a second station to which the broadcast message is to be sent such as K, Q, "LETTERS," B, T, W, O, A, C, L, "SPACE." This may then be followed by the end-of-address code sequence including the time and address of the transmitting station in mnemonic code which may be put into the tape under control of the end-of-address key and then the text of the message may be put into the tape followed by the end-of-message code sequence as described in connection with the regular processing of a message to be delivered to a terminating station on this system.

If it is desired to connect to a foreign system not on this system, the tape is prepared, either under keyboard control or under Codomat control, to insert in the tape, the direct distance dialing number of the relay station to which the message is to be transmitted and this code sequence will be the same, as prevoiusly described, then the pseudo-mnemonic code for the relay station to whom the message is addressed will be perforated in the tape together with the seventh hole for each character of the pseudo-mnemonic including the "SPACE" code combination at the end of the pseudo-mnemonic code sequence. This will be followed by the call directing code of the addressed station comprising three characters each of which also has the sixth control hole perforated in alignment with it and the mnemonic code for the called station will be followed by the end-of-address code sequence, the text, and the end-of-message sequence.

When tapes of this type are fed into the reader, the pseudo-mnemonic codes are transmitted to a relaying station which would be a communications center having translator equipment for translating these pseudo-mnemonic codes for processing in systems other than the present type of system. When this tape is fed through the reader at the originating station, an attempt will be made to complete a circuit through the telephone switching system to the addressee as represented by the direct distance dialing number perforated in the tape. If such a connection is made and an answer-back is received, the reader clutch magnet 3–RCM will be operated as described in connection with the dialing attempts in Section 3. The distributor contacts as shown in FIG. 11 will then pulse the relays 11–MLR and 11–SLR which are the monitor line relay and the sending line relay. As soon as the reader sensing pins sense a control hole in the seventh level associated with the first character of the pseudo-mnemonic code combination, relays 4–R7 and 4–LUR will be operated in the same manner as was described hereinbefore in connection with these relays. When relay 4–LUR operates, it will partially close the shunt path around the distributor contacts "SS" and 1 to 5, shown on FIG. 11, by closing its make contacts 11–4–LUR–8 and it will also shunt relay 13–LURB by closing its contacts 13–4–LUR–3.

In this cycle of operation of the reader mechanism, when the reader contacts 9–AUX–B close, relay 9–P7R will be operated in a circuit path from ground (FIG. 9) through break contacts 9–26–RES–7, break contacts 9–AUX–B, diode 9–D17, now closed make contact 9–4–R7–4 and break contacts 9–4–R0–4 and 9–4R6–6 through the winding of the relay 9–P7R to −48 volt D.C. source in FIG. 9. When the relay 9–P7R is energized, it will lock operated over its own locking contacts in a circuit from ground in FIG. 9 through the break contacts 9–26–RES–7, break contacts 9–P068R–10, 9–18–PBRB–10, 9–P07R1–4, 9–POR–4 and 9–P67R–4 and its own locking contacts 9–P7R–10.

As the tape continues to be stepped through the reader, the reader contacts will sense the "SPACE" code combination at the end of the pseudo-mnemonic code sequence thereby operating the relay 11-NR3 in a path from ground (FIG. 11) through the reader contact 3, make contact 11-10-TSR-8 which had been closed when the transmitter relay shift 10-TSR was operated due to the sensing of the zero and seven control holes associated with the direct distance dialing number, thence through the winding of the relay 11-NR3 to −48 volt D.C. source in FIG. 11. As described hereinbefore the energization of the relay 11-NR3 will close the operating path to the relay 29-P3R by closing make contact 29-11-NR3-12 since the relay 11-ONHR, that is the off-hook relay, had previously been operated and closed its contacts 29-10-ONHR-8. The circuit just described will also cause energization of pulse 3 relay, 33-P3X, from battery in FIG. 33 through relay 33-P3X to ground through the now closed contacts 29-11-NR3-12. Upon energization of the relays 29-P3R and 33-P3X they will lock up through their locking contacts 33-P3R-12 as described hereinbefore. The energization of the magnet 33-P3X will open its break contacts 31-33-P3X-3 to break the operating path to the reader clutch magnet 3-RCM. Operation of relay 29-P3R will release relay 10-TSR by opening its break contacts 10-29-P3R-7. The release of relay 10-TSR will release relay 11-NR3 by opening its make contacts 11-10-TSR-8. The operation of relay P3X will cause operation of switch drive relay 31-SSD by closing its contacts 31-33-P3X-2 to supply ground on FIG. 31 through now closed make contacts 31-33-E0-7 and winding of relay 31-SSD to battery in FIG. 31. Upon being operated the switch drive relay 31-SSD will lock operated in a path from −48 volt battery (FIG. 31) through its winding and now closed make contacts 31-33-E0-7 and 33-SSD-5, diode 33-D1, now closed break contacts 31-36-NC-10, now closed make contacts 31-9-P7R-4 to ground in FIG. 31. When relay 31-SSD is energized it will close its contacts 31-SSD to complete a circuit from ground in FIG. 31 through now closed break contacts 31-9-P07R2-4, diode 31-D2, now closed break contacts 31-32-ITR-3, 31-33-L0-5, 31-32-OS-2, now closed make contacts 31-SSD-3 and the winding of stepper switch 31-SS to ground in FIG. 31.

At this point in the operation, the originating or transmitting station will wait for the confirmation of the reception of the pseudo-mnemonic code combination sequence and the operation that follows will be the same as described under Confirmation Received, in Section 8, until the relay 17-UNMR is operated as a result of the receipt of confirmation from the called or addressed relaying station. Of course, at this time the operation of the upper notch magnet relay 17-UNMR occurred simultaneously with the operation of the upper notch magnet 17-UNM. However, since the relay 17-UNMR is slow to operate, it will complete pull up after the operation of the upper notch magnet 17-UNM and thereupon release the upper notch magnet 17-UNM by opening its break contacts 17-UNMR-3. The operation of the upper notch magnet relay 17-UNMR will also bridge the now open break contacts 3-29-P3R-5 by closing its contacts 3-17-UNMR-2 to reoperate the reader clutch magnet 3-RCM.

Since, in the code sequence being discussed herein, the call directing code sequence of characters follows the "SPACE" signal at the end of the pseudo-mnemonic code sequence and since the call directing code characters have associated with the perforations at the sixth level of the tape, the reader in sensing the code combinations for the call directing codes will pulse the monitor line relay and sending line relay 11-MLR and 11-SLR and will operate the relay 4-R6 in a circuit from ground in FIG. 4 through terminal MD-147 and the closed sending contacts for the sixth level in FIG. 11, thence through the terminal MD-189 and the winding of the relay 4-R6 to −48 volt D.C. source in FIG. 4. Relay 4-LUR will be pulled up simultaneously with relay 4-R6 in the circuit path as previously described to shunt relay 13-LURB by closing its contacts 13-4-LUR-3.

When the confirmation signal was received, the confirmation relay 35-CFX was operated in the manner described in Section 8, Confirmation Received, in connection with the confirmation of a regular mnemonic to cause the pierce to be made in the sixth level of the tape. As a result of the operaiton of the upper notch memory relay 17-UNMR, which is incident to the piercing of the sixth level in the tape, relay 33-P3X will be released by the opening of the break contacts 33-17-UNMR-7.

The release of relay 33-P3X will cause its contacts 31-33-P3X-3 to close to furnish ground from FIG. 31 through now closed make contacts 31-9-P7R-4, closed break contacts 31-36-NC-10, closed make contacts 31-33-EO-1, 31-SSD-6, diode 31-D4, now closed break contacts 31-33-P3X-3 and 31-36-NC-11, now closed make contacts 31-32-ONX-7, terminal A-27 on FIGS. 31 and 3, and the chain of now closed contacts 3-9-P07R1-8, 3-8-SRR-12, 3-13-LNSS-INT, 3-24-TOTR-9, 3-9-P06R-5, 3-9-P07R-5, 3-7-TCR-10, 3-9-P07R2-5, 3-4-R8B-2, 3-12-IDSR-7, 3-12-ITRA-5, 3-14-CAR-4, 3-26-RES-6, 3-26-SALA-5, 3-18-PFR-4, 3-12-ITRA-4, 3-PSR-10 and the winding of the reader clutch magnet 3-RCM to −48 volt D.C.

When the tape advances to the point where the first character following the call directing code sequence is sensed, relays 4-LUR and 4-R6 will be released due to the absence of a control hole in the tape at the sixth level. The release of relay 4-LUR will remove the shunt around relays 13-LURB by opening its contacts 13-4-LUR-3 thereby permitting relay 13-LURB to be energized. Relay 13-LURB will be operated in a circuit from ground (FIG. 13) through the closed reader contacts 13-AUX-A, now closed break contacts 13-12-ITRB-6, now closed break contacts 13-18-PBRB-7, make contacts 13-14-CFR-2 and the winding of the relay 13-LURB to −48 volt D.C. source in FIG. 13. As soon as relay 13-LURB pulls up, it will lock operated through its own make contacts 13-LURB-2, now closed break contacts 13-18-PBRB-7 and now closed make contacts 13-14-CFR-2 through the winding of the relay 13-LURB to −48 volt D.C. in FIG. 13. The energization of relay 13-LURB will close its make contacts 11-13-LURB-5 to shunt the distributor contacts 1 to 5 and "SS" as shown on FIG. 11.

The tape will continue to advance and since there are no control holes perforated in the tape, relay 9-PNR will be operated in a circuit from ground in FIG. 9 through the now closed break contacts 9-26-RES-7, reader contacts 9-AUX-B, diode 9-D17, the now closed break contacts 9-4-R7-4, 9-4-R0-6, 9-4-R6-10 and through the winding of the relays 8-PNR to the —48 volt D.C. source in FIG. 9. The tape will continue to advance through the characters representing the mnemonic code that follows the call directing code sequence, with the line and monitor blinded due to the shunting of the distributor contacts by the closure of the contacts 11-13-LURB-5.

The control of the distributor contacts shown on FIG. 11 will, at this time, be exercised by relay 4-LUR since blinding relay 32-BL is shunted by now closed contacts 32-31-DC-5 of data set connect relay 31-DC.

In the event that the tape format contains a second direct distance dialing number, the tape would advance until the reader contacts sense the "0" control hole of a second DDD number, whereupon, relay 4-RO would be energized by the closure of the "0" contact of the group of sensing contacts in the reader as shown in FIG. 11 to energize relay 4-RO in a circuit path from ground in FIG. 3 through the break contact of the key 3-MR terminal, MD-146 on FIGS. 3 and 11 thence through the closed zero contacts in FIG. 11, through terminal MD-190 on FIGS. 11 and 4, thence through the winding of the relay 4-RO to the —48 volt D.C. source in FIG. 4. With the relay 4-RO energized, the closing of the reader contacts 9-AUX-B will complete a circuit from ground in FIG. 9 through the now closed break contacts 9-26-RES-7, the reader contacts 9-AUX-B, the diode 9-D17, the now closed break contact 9-4-R7-4, the now closed make contact 9-4-R0-6, the now closed break contact 9-4-R6-8, the diode 9-D23, and the now closed break contacts 9-P068R-5, and through the winding of the relay 9-POR to the —48 volt D.C. source in FIG. 9 thereby to operate the relay 9-POR. Operation of the relay 9-POR will cause the release of relay 9-P7R by opening its contacts 9-POR-4.

The release of the permutation seven relay 9–P7R will open the locking path for switch drive relay 31–SSD by opening the break contacts 31–9–P7R–4, thereby to open the holding path to stepping switch 31–SS at contacts 31–SSD–3. This will allow the stepping switch 31–SS to step to its next position. In stepping from one position to another the stepping switch 31–SS will release one relay 31–DC and energize the next relay 31–DC at its ARC3. When the first relay 31–DC is released it will allow its associated relay 32–BL to operate by opening contacts 32–31–DC–5. This will shunt the associated send line by closing contacts 30–32–BL–12 since at this time contacts 30–35–CFX–5 are closed. The operation of pull back relay A, 18–PBRA will initiate a pull-back operation such as that described under Pull Back After Confirmation in Section 9 hereinbefore.

If the tape format does not contain another direct distance dialing number, the tape will advance to the beginning of the end-of-address code sequence and will continue until the reader contacts sense the control holes in the sixth and seventh levels aligned with the "LINE FEED" code combination forming a part of the end-of-address code sequence. This will initiate a pull-back operation which is described in full in Section 18 under the heading End-of-Address Pull Back (Multi-entry). In either of these two cases when the reader clutch magnet 3–RCM re-operates, the succeeding circuit operation will be the same as that described in Section 5 under the heading Blinding Called Direct Distance Dialing Number After Pull Back.

18. *End-of-address pull back (multi-entry)*

Upon sensing hte control holes six and seven of an end-of-address sequence, the reader contacts will complete a circuit from ground in FIG. 4 through terminal MD–147 on FIGS. 4 and 11 thence through the reader sensing contacts six and seven and then through terminals MD–189 and MD–188, respectively, on FIGS. 11 and 4 to energize relays 4–R6 and 4–R7. The operation of relay 4–R6 will close its contacts 4–R6–12 to supply ground to energize relay 4–R6A. When, in this cycle of operation, the reader contacts 9–AUX–B are closed, a circuit will be established to operate relays 9–P67R and 22–P67R–2. The circuit for energizing the relay 9–P67R extends from ground in FIG. 9 through the break contacts 9–26–RES–7 and 9–AUX–B, diode 9–D17, the now closed make contact 9–4–R7–4, now closed break contact 9–4–RO–4, now closed make contact 9–4–R6–6, and the winding of the relay 9–P67R to —48 volt D.C. source in FIG. 9. The circuit for energizing relay 22–P67R–2 will extend from ground in FIG. 9 through the break contacts 9–26–RES–7, the reader contacts 9–AUX–B, terminal TE–8 on FIGS. 9 and 22, diode 22–D31, the now closed break contacts 22–4–RO–10 and 22–4–R8A–10 and now closed make contact 22–4–R6A–2 and 22–4–R7–5 through the winding of the relay 22–P67R–2 to —48 volt D.C. source in FIG. 22.

At this time, the operation of the reader will be interrupted by breaking the circuit to the reader clutch magnet 3–RCM at now open break contact 3–9–P–67R–5. The operation of the relay 9–P67R will also cause the operation of the pull-back relay A, 18–PBRA. The circuit for operating relay 18–PBRA extends from ground in FIG. 18 through the now closed make contacts 18–9–P67R–2, now closed make contacts 18–20–UDR–4, now closed break contact 18–PBRB–5 and the winding of the relay 18–PBRA to —48 volt D.C. source in FIG. 18. When relay 18–PBRA is energized, it will close a circuit from ground in FIG. 19 through the now closed break contacts 19–9–P06R–10 and make contacts 19–18–PBRA–2 and the winding of the pull-back magnet 18–PBM to the —48 volt D.C. source in FIG. 19. The relay 18–PBRA will lock operated through its own contacts 18–PBRA–4, the tape will be pulled back through the reader until the tape becomes taut between the reader and the feed-out tape feed wheel thereby to operate the tight-tape switch contacts 16–TTS when the tape returns to its original starting position. When relay 9–P67R is operated, the circuit to operate it will branch at terminal M–94 on FIGS. 9 and 33 also to operate relay 33–EOX through now closed make contacts 33–32–ONX–5 and the winding of relay 33–EOX.

The closure of the tight-tape switch 16–TTS will energize the relay 16–TTR by completing a circuit from ground through the winding of the relay to the —48 volt D.C. source in FIG. 16. The energization of the tight-tape relay 16–TTR will complete a circuit from ground in FIG. 18 through now closed make contacts 18–9–P67R–2, now closed make contacts 18–PBRA–4, now closed break contacts 18–9–P06R–8, now closed make contacts 18–16–TTR–2 and the winding of the relay 18–PBRB to —48 volt D.C. source in FIG. 18. The energization of the tight-tape relay 16–TTR will also release relay 20–UDR which is the unsent direct distance dialing number relay, by opening its contacts 20–16–TTR–5. The operation of the relay 18–PBRB will complete a circuit to energize the reader clutch magnet 3–RCM in a circuit from ground in FIG. 31 through now closed break contacts 31–32–ONX–7, terminal A–27 on FIGS. 31 and 3 through the now closed break contacts 3–9–P07R1–8, now closed make contacts 3–8–SRR–12, now closed break contacts 3–LNSS–INT–4, now closed break contacts 3–24–TOTR–9, now closed break contacts 3–10–TOHA–4, now closed break contacts 3–20–UDR–6, now closed make contacts 3–18–PBRB–4, now closed break contacts 3–14–CAR–4, now closed break contact 3–26–RES–6, 3–26–SALA–7, 3–26–SALB–5, 3–18–PFR–4, 3–12–ITRA–4, 3–23–PSR–10, and the winding of the reader clutch magnet 3–RCM to —48 volt D.C. source in FIG. 3. Energization of the relay 18–PBRB also opens the path from ground through to relay 18–PBRA by opening its break contacts 18–PBRB–5. When relay 20–UDR is released, it will complete an operating path for the reader clutch magnet 3–RCM shunting the now open contacts 3–9–P67R–5 by closing its break contacts 3–20–UDR–7. When relay 18–PBRA is released, it will open the operating path which had been established to the pull-back magnet to deenergize the pull-back magnet by opening its contacts 17–18–PBRA–2.

The operation of the reader clutch magnet 3–RCM will start the tape advancing through the reader. As the first code combination sensed by the reader contains no control holes, relays 9–P67R and 22–P67R–2 will be released due to the fact that the contacts 22–4–R7–5 are opened and the tight-tape relay contacts 22–16–TTR–4 have been opened as well as make contacts 9–4–R6–6. With this condition prevailing, the reader will advance the tape and will transmit the mnemonics and text of the message to the line as described in Section 9.

19. *Single entry operation*

The apparatus is provided with a mechanism whereby a single outgoing line or all lines except any given number less than the total number of outgoing lines may be utilized. This permits the system to operate during light load periods by using a single one of the subscriber sets at the transmitting station. Line-off keys 31–L1, 31–L2 and 31–L3 are provided in the embodiment of the invention disclosed herein to control this operation. For example, if during a period when the number of messages to be transmitted is relatively small, it is desired utilizing a single subscriber's data set, the keys L2 and L3 could be operated to open contacts 31–L2 and 31–L3 while closing contacts 32–L2 and 32–L3. The operation of any one of the three line-off keys 31–L1, 31–L2 or 31–L3 will prevent the connection of its associated data set for transmission. Suitable lamps are provided for indicating the on or off condition of these keys and when two of the line-off keys such as 31–L2 and 31–L3 are operated and line-off key 31–L1 is not operated, a circuit will be completed from ground in FIG. 32 through now closed break contacts 32–33–EO–8, now closed break contact 32–ONX–3, closed key contacts 32–L3 and 32–L2 to the winding of the original state relay 32–OS and thence to —48 volt D.C. in FIG. 32. The operation of the original state relay 32–OS conditions the apparatus so that the mode of operation will vary from that described hereinbefore so that the operation may no longer comprise the steps of dialing the DDD number, pulling the tape back, transmitting the confirmation mnemonic, pulling the tape back and transmitting the message. With the original state relay 32–OS operated the apparatus will perform subsequently in the manner disclosed in the copending application of D. E. Huffman et al. mentioned hereinbefore. In other words, after the DDD number is dialed and the confirmation mnemonic is transmitted as described hereinbefore, the tape is pulled back and the message is transmitted, provided a confirmation signal has been received due to the receipt of an answer-back signal and a confirmation pulse from the station whose address has been dialed. Single entry operation takes place only when the line-off keys L2 and L3 are operated. Otherwise the apparatus will operate as a multi-entry system.

20. *Dialing (single entry)*

The transmitting equipment is set up for single entry operation when the original state relay 32–OS is operated and the No. 1 data set connect relay is consequently operated in a circuit from ground, FIG. 31, through the now closed contacts 31–32–OS–5 and the line-off key 31–L1, in its normal condition and through the winding of the No. 1 data set connect relay 31–DC to —48 volt D.C. in FIG. 31.

With the original state relay 32–OS operated, neither the switch drive relay 31–SSD nor the stepper switch magnet 31–SS will be operated due to opening of the break contacts 31–32–OS–1 and break contacts 31–32–OS–2. This will prevent the stepper switch 31–SS from stepping and as a consequence the timing of the DDD number, transmission of the mnemonics, the wait for the confirmation of the mnemonics together with the other operations, incidental to the specified operations, will take place in the manner described in Section 3 under Dialing and the subscriber set will wait for eleven seconds for the receipt of an answer-back signal.

When that portion of the tape, having a DDD number in it, is read by the reader, the presence of perforations in the zero and seventh control levels on the tape will cause the operation of the relays 9–P07R1 and 9–P07F2, as described hereinbefore in connection with the other dialing operations. When relay 9–P07R2 is operated it will release the permutation zero relay 9–POR by opening its break contacts 9–P07R2–7 and it will also release last one relay 31–LO by opening break contacts 31–9–P07R2–4.

The operation of the relay 9–P07R1 will transfer control of the reader clutch magnet 3–RCM to the data set shown in FIG. 3 to supply ground through contacts 3–30–DM–4, either contacts 3–CT–10 or 3–CTA–10, now closed break contacts 3–30–TAXA–8, make contacts 3–PA–12, break contacts 3–30–TAXA–4, diode 3–D11, break contacts 3–12–ITRA–10, terminal 3–MD200, make contacts 3–9–P07R1–8, make contacts 3–SRR–12, break contacts 3–13–LNSS–INT, break contacts 3–24–TOTR–9, make contacts 3–9–P07R1–10, break contacts 3–14–CAR–4, 3–26–RES–6, 3–26–SALA–7, 3–26–SALB–5, 3–18–PFR–4, 3–36–ITRA–4, 3–23–PSR–10 through the winding of the reader clutch magnet to —48 volt D.C. source in FIG. 3. The data set will thus assume control and pulse the reader clutch magnet 3–RCM to cause the tape to be fed through and read by the reader.

The permutation O7 relay No. 1, 9–P07R1 upon being operated will also condition the data set to indicate an off-hook condition by completing a circuit from ground in FIG. 25 through break contact 25–26–RES–5, terminal TH–12 on FIGS. 25 and 10, now closed make contact 10–9–P0R1–3, break contact 10–26–SALA–5, winding of the transmitter off-hook relay 10–TOHR to —48 volt D.C. in FIG. 10. When the relay 10–TOHR is energized it will close its contact 10–TOHR–7 to connect ground through the winding of the transmitter off-hook relay A, 10–TOHA to the —48 volt D.C. source in FIG. 10, thus to energize this relay. When relay 10–TOHR operates it will connect ground in FIG. 25 through now closed break contact 25–26–RES, terminal TH–12 on FIGS. 25 and 10 through the now closed make contacts 10–TOHR–9, the winding of the relay 10–ONHR to the —48 volt D.C. source in FIG. 10. The transmitter off-hook relay 10–TOHR in operating will close its contacts 10–TOHR–1 to connect ground in FIG. 10 through the now closed break contact 10–26–SALA–9, terminal A–13 on FIGS. 10 and 32 through now closed break contact 32–33–E0–4, now closed make contact 32–OS–3 and the winding of the off-normal relay 32–ONX to —48 volt D.C. source in FIG. 32. Relay 9–P07R1 in being energized will close its contacts 10–9–P07R1–12 to complete a circuit from ground in FIG. 25 through now closed break contacts 25–26–RES–5, terminal TH–12 on FIGS. 25 and 10, make contacts 10–9–P07R1–12, now closed break contacts 10–14–ABR–7, terminal A–60 on FIGS. 10 and 32, now closed break contacts 32–33–E0–2, now closed make contacts 32–31–DC–2, diode 32–D6 through the winding of the off-hook relay 32–TOH to —48 volt D.C. source in FIG. 32. When the relay 32–TOH is energized it will lock energized over its own contacts 32–TOH–11, now closed break contacts 32–33–

ST, terminal A–13 on FIGS. 32 and 10, now closed break contacts 10–26–SALA–9 and make contacts 10–TOHR–1 to ground in FIG. 10. As in other dialing operations described hereinbefore, a pierce will be made in the eight level of the tape to mark that an attempt has been made to complete a connection to the DDD number associated with the pierce.

The number eight pierce having been made in the tape to indicate that a dialing attempt has been made and the tape having been stepped as a consequence of the dialing of the last digit of the DDD number, the reader will sense the absence of control holes in the 0, 6 and 7 levels of the tape which is at this point perforated with the "LETTERS" character. On sensing the absence of perforations in the 0, 6 and 7 levels of the tape, relays 4–RO, 4–R6 and 4–R7 will be released by the open condition of the transmitter reader sensing contacts 0, 6 and 7, as shown on FIG. 11, thus to release the relays 4–RO, 4–R6 and 4–R7 and also to release relay 4–LUR. When relay 4–LUR is released it will open its make contacts 9–4–LUR–9 to break the locking path to relay 9–P07R1. This will transfer the control of the reader back to the transmitting station set from the data set. At this time relay 9–P07R2 is held locked operated in a path from ground, FIG. 9, through break contacts 9–26–RES–7, 9–14–ABR–1, now closed make contacts 9–32–OS–11, diode 9–D19, now closed break contact 9–24–TORA–7, the now closed break contact 9–P07R2–2, now closed break contact 9–P068R–6 and the winding of relay 9–P07R2 to the —48 volt D.C. source in FIG. 9. Since at this time relay 9–P07R2 and relay 32–OS are operated and relay 9–P07R1 is deenergized they will have opened their contacts 3–9–P07R2–5, 3–32–OS–10, 3–9–P07R1–10 to open the circuit path to the reader clutch magnet 3–RCM. As a result of this the feeding of the tape is stopped to await the eleven second interval for an answer back. This eleven second interval will be timed by the timing circuit shown in FIG. 24 and the originating or transmitting station will wait up to eleven seconds for confirmation from the terminating station. When the originating station fails to receive a confirmation signal, the timer relay circuit tube 24–T1 will fire and operate relay 24–TORA in the same manner as described in Section 14 under Dialing Intercept DDD Number.

The answer-back timer shown in FIG. 24 will be effective since the answer-back timer shown in FIG. 36 will be deactivated due to the fact that at this time relay 33–EO is operated and has opened the ground connection to the no answer-back timer circuit of FIG. 36 by opening its contacts 36–33–E0–3.

21. *Answer back* (*single entry*)

If a connection has been established to a terminating station equipped for use in this system, a circuit will be completed to relay 30–ABX which will close its contacts 33 through now closed contacts 33–31–DC–12, now closed make contacts 33–32–OS–7 and the diode 33–D7 through the winding of the end-of-address relay 33–EO to —48 volt D.C. source in FIG. 33. When end-of-address relay 33–EO is energized it will open its contacts 23–33–E0–6 to partially unblind the monitor by removing the shunt from the monitor line relay contacts 23–11–MLR–1 and 5. At this time relay 14–ABR has been operated and consequently has opened its break contacts 23–14–ABR–5 so that the opening of contacts 23–33–E0–6 completely removes the shunt from the monitor line relay contacts 23–11–MLR–1 and 5. The energization of the end-of-address relay 33–EO will also cause energization of the second time relay 33–ST in a path from ground in FIG. 33 through now closed make contacts 33–E0–8, now closed make contacts 33–30–ABX–8, now closed make contacts 33–31–DC–1 and winding of relay 33–ST to —48 volt D.C. source in FIG. 33.

The operation of answer-back relay 30–ABX upon receipt of an answer-back signal also operates answer-back relay 14–ABR in a circuit from ground in FIG. 33 through now closed make contacts 33–30–ABX–9, 33–31–DC–12, 33–32–OS–7, terminal A–38 on FIGS. 33 and 14, now closed make contacts 14–10–TOHR–3 and the winding of relay 14–ABR to —48 volt D.C. in FIG. 14. When answer-back relay 14–ABR is energized it will open the circuit from ground in FIG. 9 through now closed break contacts 9–26–RES–7 at now open break contact 9–14–ABR–1 which circuit had been closed through closed make contacts 9–32–OS–11, diode 9–D19, break contact 9–24–TORO–7, closed locking contacts 9–P07R2–2 and break contacts 9–P068R–6 through the winding of relay 9–P07R2, thereby to release relay 9–P07R2. The release of relay 9–P07R2 will again close the circuit for controlling the reader clutch magnet 3–RCM at contacts 3–9–P07R2–5 and the transmission of the confirmation mnemonics will then take place.

22. *Answer back not received* (*single entry*)

In the preceding section it was assumed that an answer-back signal was received and in Section 20, Dialing (Single Entry) it was pointed out that the sensing of the "LETTERS" character following the DDD number relays 4–RO, 4–R7 and 4–LUR were released. It will now be assumed that no answer-back signal is received and then when relay 4–LUR is released, it will break the holding path to relay 9–P07R1 by opening its make contacts 9–4–LUR–9 and will cause the release of relay 13–LBR by opening its make contacts 13–4–LUR–4. In addition the deenergization of relay 4–LUR will open its make contacts 13–4–LUR–3 to remove the shunt from around relay 13–LUBR. The release of relay 13–LBR together with relay 4–LUR will remove the shunt from around the distributor contacts "SS" and 1 to 5 as shown on FIG. 11 by opening the make contacts 11–13–LBR–12 and 11–4–LUR–8.

In this sensing cycle of the reader when the reader contacts 9–AUX–B reclose, a path will be established from ground in FIG. 9 through the break contacts 9–26–RES–7, the reader contacts 9–AUX–B, the diode 9–D17, break contacts 9–4–R7–4, 9–4–RO–6, 9–4–R6–10 and the winding of the relay 9–PNR to the —48 volt D.C. source in FIG. 9. When the relay 9–PNR is energized, it will lock operated through its own make contact 9–PNR–3 and the break contacts of the recognition relays 9–4–R6–7, 9–4–R7–7, 9–4–RO–8, 9–4–R8A–8. The release of relay 9–P07R1 will open the operating path which had been established to the reader clutch magnet 4–RCM by opening its contacts 3–9–P07R1–10. The release of relay 9–P07R1 will also break the circuit to the relay 10–DM in the subscriber's subset by opening its contacts 10–9–P07R1–12. As a result of the deenergization of the reader clutch magnet 3–RCM, the reader shaft will stop rotating and at this time the sending set will wait up to eleven seconds for an answer back from the terminating equipment to which a call has been directed.

Since the line following relay 15–LFR will be energized, in following the sending line relay 11–SLR, contacts 24–15–LFR–5 will be opened to remove the shunt from around the capacitor 24–C1, thus to start the capacitor 24–C1 to be charged. In about eleven seconds the capacitor 24–C1 will reach about 72 volts and will fire the tube 48–T1 thereby to operate the relay 48–TORA. At this point it should be noted that normally, the receipt of the answer-back signal would start the transmitter and the sending line relay 11–SLR would follow distributor signals, thus, operating relay 15–LFR to disable, with each character, the timer circuit shown in FIG. 24.

When relay 24–TORA operates, it will open the locking path to relay 9–P07R2 by opening its break contact 9–24–TORA–7 and it will also open the path to relay 10–TOHR by opening its break contacts 10–24–TORA–5 and will lock operated through its own contacts 24–

TORA–2 in a circuit from ground in FIG. 24 through make contacts 24–10–ONHR–10, break contacts 24–12–ITRA–9, make contacts 24–TORA–2 and through resistance 24–R5 and the winding of the relay 24–TORA to −120 volt D.C. source in FIG. 24. The release of relay 10–TOHR will open its contacts 10–TOHR–7 to deenergize relay 10–TOHA and by opening its contact 10–TOHR–9 will release relay 10–ONHR. In addition, the release of relay 10–TOHR will open its make contacts 10–TOHR–1 to release the off-hook relay 10–OH in the subscriber's subset. When relay 10–ONHR is released, it will open the locking path for relay 24–TORA by opening its make contacts 24–10–ONHR–10 so that when relay 10–ONHR, which is the on-hook relay, is released, relay 24–TORA will be deenergized.

When relay 24–TORA was operated, and as a consequence relay 9–P07R2 was released, as just described hereinbefore, a circuit was completed through break contacts 3–9–P07R2–5 to operate the reader clutch magnet 3–RCM thereby to cause the tape to be advanced through the reader and the reader will sense the mnemonic code (as included in the bracket C of FIG. 2), to encode the distributor contacts 1 to 5 on FIG. 12. However, if relay 14–ABR has not been energized, due to the failure of an answer-back signal to be received at the transmitting station, its contacts 23–14–ABR–5 will remain closed and although the monitoring line relay 11–MLR operates under control of the contacts 1 to 5 in FIG. 11, its contacts 23–11–MLR–3 will be shunted by the closed contact 23–14–ABR–5 and the printer selector magnets shown in FIG. 23 will be held energized. This blinds the monitoring teletypewriter equipment.

In view of the fact that relay 10–TOHR has been released, the off-hook relay 10–OH in the subscriber's set will be deenergized, as described hereinbefore, and consequently, although the sending line relay 11–SLR operates, the on-hook condition of the subscriber's set blocks the application of pulses through the transmission line and the printer of the originating station will be blinded by now closed break contacts 23–14–ABR–5. As the tape continues to advance, the "SPACE" code combination, at the end of the mnemonic code, will not initiate a pull back operation due to the fact that the operating path to the relay 29–P3R is open at the now open make contact 29–10–ONHR–8.

If a multiple address message is being transmitted, the tape, in being fed forward to the point where the second direct distance dialing number (as bracketed under D in FIG. 2), comes into alignment with the sensing pins of the reader operation will be initiated as described in Section 20 under Dialing (Single Entry). If the second direct distance dialing number as perforated in the tape causes a connection to be completed to a terminating station, the message will be transmitted to that terminating station as described hereinbefore. If on the first attempt none of the terminating station addressees are reached through the telephone switching system, the tape will continue to advance through the reader until the reader senses the sixth and seventh control holes at the start of the end-of-address sequence as shown under the "LINE FEED" code combination at the start of the portion bracketed F in FIG. 2. The tape is pulled back at this point to search an unsent DDD number.

23. *Confirmation of regular mnemonics (single entry)*

When the apparatus is arranged for single entry operation and a direct distance dialing number has been transmitted to and received by the terminating station, the answer-back signal will be received in the originating station as described in Section 21. This will result in the operation of the answer-back relay 14–ABR in the same manner as described in that section and the originating or transmitting station will then send the mnemonic code to the terminating station to which it has been connected in the manner described in Section 6. At the end of transmission of the mnemonic code, the reader will sense the "SPACE" code combination at the end of the mnemonic code sequence to operate relay 11–NR3 in the manner described hereinbefore in connection with the reading of the end of a mnemonic code. As also described hereinbefore, at the end of the reader cycle when the reader contacts 9–AUX–B reclosed, a circuit will be completed from ground in FIG. 9 through break contact 9–26–RES–7, the break contacts 9–AUX–B, terminal TE–8 on FIGS. 9 and 29 and thence through now closed break contacts 29–11–NR4–10, now closed make contacts 29–11–NR3–12, break contacts 29–11–NR5–10, 29–11–NR1–6, 29–11–NR2–10, now closed make contacts 29–10–ONHR–8 and through the winding of the relay 29–P3R to the −48 volt D.C. source in FIG. 29.

The circuit path for energizing relay 29–P3R has a branch extending through terminal A–29 on FIGS. 29 and 33 and through now closed contacts 33–17–UNMR–7, now closed contacts 33–29–P3R–12, 33–EOX–9 and 33–36–NC–9 and the winding of relay 33–P3X to −48 volt D.C. in FIG. 33. Therefore, relay 29–P3R in operating together with relay 33–P3X will lock operated with relay 33–P3X over its own contacts 29–P3R–12. In operating, relay 33–P3X will open its break contacts 31–33–P3X–3 to deenergize the reader clutch magnet 3–RCM. The circuit, closed at contacts 29–11–NR3–12, will also complete a circuit through terminal A–29 on FIGS. 29 and 33 and through the winding of the relay 33–P3X to −48 volt D.C. source in FIG. 33 thereby to energize relay 33–P3X simultaneously with the energization of relay 29–P3R. The operation of relay 29–P3R will also open its break contacts 10–29–P3R–7 to open the locking path to the transmitter shift relay 10–TSR, thereby releasing this relay which, in turn, in being released, will release relay 11–NR3 by re-opening its make contacts 11–10–TSR–8. At this point, the reader clutch magnet 3–RCM being deenergized, the reader shaft will stop and the transmitter will also stop transmitting.

When relay 33–P3X is operated it will close its make contacts 31–33–P3X–2 to complete a circuit from ground in FIG. 31 through now closed make contacts 31–33–EO–7 and through the winding of switch drive relay 31–SSD to −48 volt D.C. source in FIG. 31 thereby to energize the switch drive relay 31–SSD.

If it be assumed that a confirmation signal is received indicating that the connection has been made to the proper terminating station, relay 30–RL will be energized. This receive line relay upon being energized will complete a circuit from ground in FIG. 35 through the now closed make contacts 35–30–ABX, 35–30–RL–6, 35–31–DC–14, 35–33–ST–6, 35–37–CAX–4, 35–32–TOH–6, and the winding of the confirmation relay 35–CFX to −48 volt D.C. source in FIG. 35 thereby to energize the confirmation relay. When the confirmation relay 35–CFX is energized it will complete a circuit from ground in FIG. 33 through the now closed make contacts 33–31–DC–11, 33–35–CFX–2, terminal A–31 on FIGS. 33 and 14, now closed make contacts 14–29–P3R–2, 14–10–TOHR–11 and the winding of the relay 14–CFR to the −48 volt D.C. source in FIG. 14. When relay 14–CFR is energized it will complete a circuit from ground in FIG. 17 through now closed break contacts 17–12–ITRB–9, now closed make contacts 17–12–CFR–12, now closed break contacts 17–UNMR–3, 17–32–ONX–11, 17–21–STC–11 and the winding of the upper notch magnet 17–UNM to −48 volt D.C. source in FIG. 17. The closure of the make contacts 17–14–CFR will also complete a circuit from ground in FIG. 17 through the now closed break contacts 17–12–ITRB, now closed make contact 17–14–CFR to the slow to operate upper notch magnet relay 17–UNMR and thence to the −48 volt D.C. source in FIG. 17. When the slow to operate magnet 17–UNMR is energized it will open its break contacts 33–17–UNMR–7 to release relays 33–P3X and 29–P3R. Both of these relays had been held up in the path from ground in FIG. 9 through closed break contact 9–26–RES–7, terminal TH–19 on FIGS. 9 and 33, closed break contact 33–17–UNMR–7, closed make contact 33–29–PBR–12, closed break contacts 33–EOX–9 and 33–36–NC–9 in a path which went directly to the relay 33–P3X and through terminal A–29 on FIGS. 23 and 29 through now closed make contact 29–10–ONHR–8 through the winding of the relay 29–P3R to −48 volt D.C. source in FIG. 29.

When relay 33–P3X is released it will open its contacts 31–33–P3X–2 to release the slow to release switch drive relay 31–SSD which had been held operated through the closed make contact 31–33–EO–7. When the switch drive relay 31–SSD is released it will complete a circuit path to operate relays 9–P67R and 33–EOX in a path from ground in FIG. 33 through the now closed contacts 33–31–DC–11 to the data set connect relay in the Number 1 secondary set, now closed make contacts 33–35–CFX–2, 33–32–OS–6, now closed break contacts 33–P3X–12, 33–32–ITR–5, 33–31–SSD–10 and now closed make contacts 33–32–ONX–1 and 5 through the winding of the relay 33–EOX to the −48 volt D.C. source in FIG. 33. A branch of the circuit just described is completed through contact 33–32–ONX–1 and terminal M–94 on FIGS. 33 and 9 through the winding of the relay 9–P67R to the −48 volt D.C. source in FIG. 9. When the end-of-address drive relay 33–EOX is thus energized it will complete a circuit from ground in FIG. 33 through its make contact 33–EOX–7 to energize the end-of-address relay 33–EOX, consequently with both relay 33–EOX and relay 33–EO operated, the holding path for relay 32–ONX will be broken at break contacts 32–33–EOX–12 and 32–33–EO–4 thereby to release the relay 32–ONX. With the release of relay 32–ONX the circuit to relay 33–EOX will be broken at now opened contacts 33–32–ONX–5.

The operation of the relay 9–P67R, as described in this section will initiate the pull-back operation and this will be followed by the advance of the tape to transmit the message in the manner described in Section 9.

24. *Confirmation not received* (*single entry*)

Under Section 23 the assumption was made that a confirmation signal was received within the eleven second interval and that this was indicated by the opening of the contacts 34–35–CFX–7 in the first of the secondary sets now connected for the single entry operation. In the event that all of the contacts 34–35–CFX–7 remain closed indicating that no confirmation of the transmitted mnemonics has been made, the timing of the time out circuit will start. Since the original state relay 32–OS is operated at this time, the timing of the wait for a confirmation signal, as described in this section, is controlled by the timer circuit in FIG 24.

At this time the originating station will wait up to eleven seconds for confirmation from the terminating station. When the originating station fails to receive a confirmation signal, the timer relay circuit's tube 24–T1 will fire and operate relay 24–TORA over a circuit from ground in FIG. 24 through tube 24–T1, now closed make contacts 24–10–TOHA–8, now closed break contacts 24–14–CFR–10 and the winding of relay 24–TORA to −120 volt D.C. (FIG. 24).

The operation of relay 32–OS will close its make contacts 36–32–OS–12 to disable the timer circuit for confirmation as shown in FIG. 36 and as described under the section on Answer-Back Not Received (Single Entry), that is, in Section 22. As described in connection with Answer Back Not Received, the operation of the time out relay A, 24–TORA will release the relay 10–TOHR which in turn will release relay 10–TOHA. However, since an answer-back has been received and the relay 14–ABR has been energized, the relay 14–ABR must be released and this is effected on the release of relay 10–TOHR which will open its make contacts 14–10–TOHR–3 to release the answer-back relay 14–ABR. When the relay 10–TOHR was released it released relay 10–ONHR by openings its contacts 10–TOHR–9, and relay 10–ONHR will in turn release relay 29–P3R by opening its contacts 29–10–ONHR–8. When relay 33–P3X is released, it will reestablish an operating path for the reader clutch magnet 3–RCM by closing its break contacts 31–33–P3X–3 to start the tape advancing through the reader. At this time the line and monitor circuits will be blinded due to the fact that the relay 14–ABR has been released and shorts out the reader selector magnet contacts in FIG. 23 and the fact that the relay 10–TOHR in being released opens the circuit to the off-hook relay 10–OH in the subscribers data set. The tape will thus be advanced to either sense a succeeding direct distance dialing number or will advance to the beginning of the end-of-address sequence whereupon the control holes at the sixth and seventh levels will be sensed to initiate a pull back operation as described under End-of-Address Pull Back in Section 18.

25. *Confirmation of pseudo mnemonic* (*single entry*)

The trasmission of the pseudo mnemonic to the connected terminating station for confirmation purposes is accomplished in exactly the same manner as was described in the section on Foreign Interconnect or Broadcast Messages with Call Directing Codes described in Section 17. If the connection to the addressed terminating station is confirmed the number six pierce will be made in the tape to indicate the achievement of this result and the call directing codes will be transmitted to the terminating station followed by the release of relay 9–P7R to initiate the stepping of the stepper switch 31–SS upon the release of the stepper switch drive relay 31–SSD whereby the message is sent to the line.

If the confirmation signal is not received within the eleven second interval as timed out by the timing circuit in FIG. 24, relay 24—TORA will be operated in the manner described hereinbefore and the transmitting apparatus will be returned to the on-hook condition as described in connection with the Confirmation of Regular Mnemonics (Single Entry) described in Section 23 and Confirmation Not Received (Single Entry) in Section 24.

26. *Answer-back not received* (*multi-entry*)

In Section 3 it was assumed that an answer-back signal was received upon the dialing of each of the direct distance dialing numbers, indicating that terminating stations equipped to receive a message over this system had been connected and had sent their answer-back signals back to the originating station. It will now be assumed that, for some reason, no answer-back signal is received for the first direct distance dialing number that was dialed and, consequently, upon release of the relay 31–DC associated with the first of the secondary circuits, the timer circuit in that secondary, as shown in FIG. 36, will start its timing cycle. This timing will be initiated upon the deenergization of data set connect relay 31—DC which will open its make contacts 36–31–DC–17 and since, at this time, relay 32–TOH is energized and has opened its contacts 36–32–TOH–7, the capacitors 36–C1 and 36–C2 will start to charge.

As pointed out hereinbefore, the charging time of these capacitors is approximately eleven seconds. However, the entire eleven seconds is not used in waiting for an answer-back signal but the timing of the operation is as follows:

If there are three access lines available, i.e., three data connect sets, and three or more addresses to which the message is to be sent the sequence of operation will be as follows:

After the dialing of the first number is completed, the transmitter distributor or reader will step through the first mnemonic and this will take approximately one second; (the mnemonic at this time will not be transmitted to the line or monitor as pointed out in the dialing operation described in Section 3. The establishing of connections to transmit the second direct distance dialing number will take approximately 1.5 seconds; the timing of the second direct distance dialing number will take one second; the stepping through the second mnemonic without transmitting it or recording it on the monitor will take approximately one second; the stepping up of connections for dialing of the third direct distance dialing number will take approximately 1.5 seconds; the dialing of the third direct distance dialing number will take approximately one second; and the pull back operation as described in Section 4 will take approximately 1.5 seconds. This will be followed by the stepping of the first direct distance dialing number through the reader on the confirmation pass which will take approximately .5 second. This will total approximately nine seconds and since the capacitors 36–C1 and 36–C2 are selected to have a value such that they will will be charged sufficiently to fire the tube 36—TA in eleven seconds, there will only be approximately two seconds actually utilized to wait for the answer-back signal.

If the answer-back signal is not received, the answer-back timer tube 36–TA will fire and will operate the no answer-back relay 36–NAB which will lock operated in a circuit from ground, FIG. 36, through make contacts 36–32–TOH–5 and its own locking contacts 36–NAB–4. When the no answer-back relay 26–NAB is operated it will release relay 30–0H by opening its break contacts 30–36–NAB–5. In addition the operation of the no answer-back relay 36–NAB will shunt the capacitors 36–C1 and 36–C2 by closing its contacts 36–NAB–3 to connect ground in FIG. 36 through the resistor to the +130 volt source in FIG. 36. This will cause the tube 36–TA to be returned to its normal condition.

The operation of the relay 36–NAB will complete a circuit from ground, FIG. 33, through now closed make contacts 33–E0–8, 33–36–NAB–1, 33–31–DC–1 and the winding of a second time relay 33–ST to −48 volt D.C. source in FIG. 33. Relay 33–EO will have been operated under control of the end-of-address drive relay 33–EOX which, after the dialing of the third direct distance dialing number will be energized in a circuit from ground, FIG. 33, through brushes 4 to 9 to ARC–2 of stepper switch 33–31–SS, thus to energize relay 33-EO in a path from ground, FIG. 33, through closed make contact 33–EOX–7. End-of-address relay 33–FO was locked up through its own contacts 33–E0–10 and closed make contacts 33–32–TOH–9.

The operation of the second time relay 33–ST will close an operating path to the reader clutch magnet 3–RCM in a path from ground in FIG. 31 through the now closed make contacts 31–33–ST–3, now closed break contacts 31–35–CFX–8, now closed make contacts 31–DC–9, now closed break contacts 31–33–P3X–3 and 31–36–NC–11, now closed make contacts 31–32–ONX–7, terminal A–27 on FIGS. 31 and 3 and the now closed chain of contacts 3–9–P07R1–8, 3–8–SRR–12, 3–13–LNSS–INT, 3–24–TOTR–9, 3–9–P06R–5, 3–9–P67R–5, 3–7–TCR–10, 3–9–P07R2–5, 3–4–R8B2, 3–12–IDSR–7, 3–12–ITRA–5, 3–14–CAR–4, 3–26–RES–6, 3–26–SALA–5, 3–18–PFR–4, 3–12–ITRA–4, 3–PSR–10 and the winding of the reader clutch magnet 3–RCM to −48 volt D.C. in FIG. 3.

27. *Answer-back not received in response to intercept number*

In Section 14 the dialing of the intercept direct distance dialing number was described and it was assumed that the intercept station had been properly connected to receive the message which could not be sent in the normal manner. In that operation as described under the dialing of the intercept number, the number was dialed and in being dialed the stepper switch for intercept 3–INSS arrived on contact 11 of its banks of arcs and the lower notch stepping switch 13–LNSS was on Position 1 and the reader clutch was released. As described hereinbefore the answer-back signal was received and consequently, the message was transmitted to the intercept terminating station. However, in the event that an answer-back is not received, the timing circuit will time out and tube 24–T1 will fire, as described previously, to operate relay 24–TORA. The firing of the tube 24–T1 and consequent operation of relay 24–TORA will effect approximately the same operation as was effected in connection with the Answer Back Not Received described in Section 22 hereinbefore. Relay 24–TORA in operating releases the slow to release relay 10–TOHR which in turn release relays 10–TOHA and 10–ONHR. In this case however, when relay 10–TOHR was released it closed an operate path to the intercept stepper switch magnet 3–INSS–MAG in a path from ground (FIG. 3) through make contact 3–INSS–ON–2, now closed make contact 3–24–TORA–4, now closed break contact 3–10–TOHR–6 and the intercept stepper switch interrupter contact 3–INSS–INT and the winding of the intercept stepper switch magnet 3–INSS to −48 volt D.C. source in FIG. 3. Since the intercept stepper switch off-normal contact 3–INSS–ON is closed whenever the stepper switch is out of its normal position this circuit will be maintained and repeatedly opened and closed by the interrupter contact 3–INSS–INT until the intercept stepper switch 3–INSS arrives at its home position.

As the brush for the intercept stepper switch 3–INSS in ARC–1 reaches Position 21 relay 24–TORA will be released due to the breaking of the circuit from ground (FIG. 3) through the 3–INSS–ARC–1 contacts 1 to 20 and terminal TN–23 on FIGS. 3 and 24, thus breaking the locking path to relay 24–TORA. Due to the fact that contacts 21 to 25 of 3–INSS–ARC–1 are connected in the circuit to the interrupter switch magnet 3–INSS–MAG through the contacts 3–INSS–INT, the intercept stepper switch will be stepped to its home or 26th position. In its home position the intercept stepper switch 3–INSS will close its break contact 3–INSS–ON–3 and since at this time relay 12–ITRC which is the intercept transfer relay 3, is energized and since the stepper switch 13–LNSS is in its No. 1 position where its off normal make contact is closed, a circuit will be completed from ground through the now closed break contacts 3–INSS–ON–3, now closed make contacts 3–12–ITRC–1 and 3–13–LNSS–ON–2, through the closed break contact 3–10–TOHR–6 and the intercept stepper switch interrupter contact 3–INSS–INT to the intercept stepper switch magnet 3–INSS–MAG to cause this switch to step to Position 1.

In the event that, on the first and on the five succeeding attempts, to reach the intercept terminating station, no circuit is completed through to this station, the cycle of operation just described will be repeated and the lower notch stepping switch 13–LNSS will be stepped through five positions. Each time an attempt is made to reach the intercept terminating station by dialing the direct distance dialing number of it, the operation as described under Dialing the Intercept DDD Number in Section 14 will be repeated and if the originating station fails to receive an answer-back after five attempts the action that follows is described hereinafter under Section 35, Intercept Not Reached Alarm.

28. *Confirmation not received in response to intercept mnemonic*

If it be assumed that, on the dialing of the intercept direct distance dialing number, a circuit was completed to a terminating station and an answer back signal has been received, then the answer-back relay 14–ABR will be operated as described in previous sections. After the receipt of the answer-back signal and the consequent operation of relay 14–ABR the intercept mnemonic code sequence wil be transmitted over the line and at the completion of the transmission of the intercept mnemonic the transmitting station will wait for a confirmation signal. At the completion of the transmission of the mnemonic code sequence, the intercept stepper switch 3–INSS will have been stepped to Position 20 to complete a circuit from ground in FIG. 9 through now closed break contact 9–26–RES–7 and the common brush of ARC–2 of the intercept stepper switch 9–3–INSS in Position 20 to the relay 12–IDSR and thence to the −48 volt D.C. source in FIG. 12 to operate the intercept distributor relay 12–IDSR. Since under the condition assumed at the present time, the transmitting station fails to receive a confirmation signal, the timer circuit shown on FIG. 24 will become effective to cause the firing of tube 24–T1 and the resultant operation of relay 24–TORA. The action that follows this will be the same as described in Section 27 under Answer-Back not Received in Response to Intercept Number except that the operation of relay 24–TORA will release relay 10–TOHR by opening break contacts 10–24–TORA–5 and relay 10–TOHR in turn will release relay 14–ABR by opening its contacts 14–24–TOHR–3. Under these circumstances the intercept stepper switch 3–INSS will step to its home position and in moving out of Position 25 will release relay 12–IDSR by opening the circuit to it.

29. *Transmission interrupted alarm*

If it be assumed that an attempt had been made successfully to establish a connection to a called terminating station from the originating station and that the confirmation of this connection has been received and as a result thereof the confirmation relay 14–CFR has operated and the reader clutch magnet 3–RCM has reoperated, then transmission is stopped for any reason, the operator should be notified of the break in this transmission. Relay 5–LFR, which is the line following relay, is released each time the sending line relay 11–SLR goes to spacing due to the opening of the contacts 15–11–SLR–4 of the sending line relay. Thus, if the sending line relay 11–SLR stops in a spacing condition, indicating the transmission has stopped, the relay 15–LFR will remain energized and will keep its contacts 24–15–LFR–5 open. This will permit the capacitor 24–C1 to charge and if this condition prevails for 45 seconds, tube 24–T1 will fire. The circuit for operating the Timer Relay to cause it to time out in 45 seconds, rather than in 15 seconds, is operative since confirmation has been received and relay 14–CFR is energized to open its break contacts 24–14–CFR–7 and to open its break contacts and close its make contacts 24–14–CFR–10. The opening of the contacts 24–14–CFR–7 removes the shunt from around the resistor 24–R3 to increase the timer interval necessary to fully charge the capacitor 24–C1 and the operation of the transfer contacts 24–14–CFR–10 will complete a circuit through the relay 24–TORB and will break the circuit to the relay 24–TORA. If the failure in transmission condition continues for 45 seconds, relay 24–TORB will be operated and will lock operated through its own contacts in a path from ground (FIG. 24) through the now closed break contacts 24–26–RES–11 now closed make contacts 24–TORB–4 and resistor 24–R6 and the winding of the relay 24–TORB to −120 volt D.C. source in FIG. 24.

When relay 24–TORB is energized, it will complete a circuit from ground in FIG. 26 through its contacts 26–24–TORB–12, break contact 26–reset key 5, break contact 26–RES–4 and the winding of the relay 26–SALA to the −48 volt D.C. source in FIG. 26. The operation of relay 24–TORB will also complete a circuit from ground in FIG. 25 through the now closed make contacts 25–24–TORB–2 and a message interrupted lamp to the −48 volt D.C. source in FIG. 25 to light the message interrupted lamp.

When relay 26–SALA is energized, it will open its break contact 3–26–SALA–7 to interrupt the circuit to the reader clutch magnet 3–RCM and stop the reader operation. The operation of relay 26–SALA will also open its contacts 10–26–SALA–5 to release the relay 10–TOHR and by opening its contacts 10–26–SALA–9 it will release the off-hook relay 10–OH in the subscriber's set. If at the time that the relay 26–SALA is operated, the stepper switch 13–LNSS is off of its normal or home position, the energization of the relay 26–SALA will return the stepper switch 13–LNSS to its home position in a circuit from ground in FIG. 13 through 1 to 10 of ARC–2 of 13–LNSS, closed make contacts 13–26–SALA–12, closed break contacts 13–9–P07R2–6, and the interrupter contacts 13–LNSS–INT and the winding of the magnet 13–LNSS to −48 volt D.C. source in FIG. 13. When the relay 26–SALA is operated, it will also close its make contacts to complete a circuit from ground in FIG. 25 through the break contact 25–26–RES–5, and closed make contact 25–26–SALA–10 and closed break contact 25–26–SALB–7 and the alarm cut-off key 25–ACO through the contact and armature of the 7F buzzer in FIG. 25 and thence to the −48 volt D.C. source in FIG. 25. This will cause the message interrupt lamp to light and the buzzer to sound, calling the attention of the operator to the failure of the circuitry to continue a proper transmission of the message.

When relay 10–TOHR is released, it will release relays 18–PBRB, 10–TOHA, 14–ABR, 10–ONHR, and 14–CFR. The circuit to relay 18–PBRB will be broken by the opening of the make contact of transfer set of contacts 18–10–TOHR–10, the release of relay 10–TOHA will be effected by re-opening the make contacts 10–TOHR–7, the release of relay 14–ABR will be effected by the re-opening of the contacts 14–10–TOHR–3, the release of relay 10–ONHR will be effected by the re-opening of the make contact 10–TOHR–9 and the release of relay 14–CFR will be effected by the re-opening of the contact 14–10–TOHR–11. When relay 10–ONHR is released, it will in turn release relay 29–P3R by opening its contacts 29–10–ONHR–8. When relay 14–CFR is released, it will release the upper notch magnet relay 17–UNMR by re-opening its make contacts 17–14–CFR–12.

30. *Dialing failure alarm*

If at any time during the dialing operation, when the subscriber's set is transmitting a direct distance dialing number to the telephone line, the dialing operation stops and the reader clutch magnet 3–RCM is not pulsed; the reader contacts 13–AUX–A will fail to close and operate the relay 13–TRR within the 15 seconds that it takes the capacitor 24–C1 to become charged to the point where it will fire the tube 24–T1, the tube 24–T1 will be fired as described hereinbefore to operate the relay 24–TORA. When relay 24–TORA operates, it will complete a circuit from ground in FIG. 26 through its now closed contacts 26–24–TORA–6, now closed break contacts 26–14–ABR–4, now closed make contacts 26–9–P07R1–11 and the now closed break contact 26–reset key 5, now closed break contact 26–RES–4 through the winding of the relay 26–SALA to −48 volt D.C. in FIG. 26. Relay 24–TORA will also effect the release of relay 10–TOHR by opening its break contacts 10–24–TORA–5 and the relay 24–TORA in operating will lock operated through its own contacts 24–TORA–2 and the now closed make contacts 24–26–SALA–8, break contacts 24–TORB–4, and the break contacts 24–26–RES–11 to ground in FIG. 24.

As described in the previous sections, the operation of the relay 26–SALA will home the lower notch stepper switch 13–LNSS if it is not in the home position, will operate the buzzer shown in FIG. 25, will release the off-hook relay 10–OH in the subscriber set, break the operating path to the reader clutch magnet 3–RCM and in addition will operate the dialing failure lamp shown in FIG. 25 by completing a circuit from ground in FIG. 25 through the now closed break contact 25–26–RES–5, the now closed make contact 25–26–SALA–10 and the now closed make contact 25–24–TORA–10 through the dialing failure lamp to —48 volt D.C. source in FIG. 25. In connection with this operation the release of the relay 10–TOHR will open the circuit to the relays 10–TOHA, 33–TOH and 10–ONHR as described in the previous sections.

31. *Mnemonic transmission failure before confirmation*

If it be assumed that the apparatus has been operated to establish a connection from the originating station to a terminating station on the system, as indicated by the receipt of an answer-back signal at the originating station and the consequent operation of the relay 14–ABR, and the reader clutch magnet 3–RCM has been re-operated to present the mnemonic code to the line, and for some reason the transmission is stopped by the release of the reader clutch magnet 3–RCM, the line following relay 15–LFR will open its contacts 24–15–LFR–5 to initiate a timing cycle in the timer relay circuit. When this happens, the operation will be the same as that described under Dialing Failure Alarm in Section 30.

32. *Tape check alarm*

The failure to prepare the tape properly for use in the apparatus will be called to the operator's attention as soon as the reader senses a code which is not in the proper sequence. For example, if a tape is being transmitted and has gone through the cycle to the point where the end-of-address code sequence should be perforated in the tape, but a code sequence other than the end-of-address has been perforated in the tape, an alarm will be given. At that point in the operation when the end-of-address code sequence should appear in the tape the connection would have been established through to the called terminating station and an answer-back signal would have been received at the originating station as evidenced by the operation of the answer-back relay 14–ABR. In addition, since the called terminating station has been connected in the circuit, the confirmation signal would have been received at the originating station as evidenced by the operation of the confirmation relay 14–CFR and the tape would have been pulled back and the text of the message transmitted over the line. At that stage in the operation the permutation 0, 7 relay No. 4, 22–P07R4 would have been operated and locked operated. At that point in the operation the relay 22–P67R2 should have been operated, but since the tape format does not contain the end-of-address code sequence, the relay 22–P67R2 would be released. The tape, upon the occurence of such an event, would be advanced by the reader clutch magnet 3–RCM to the end-of-message code sequence whereupon the reader contacts as shown on FIG. 11, upon sensing the 0 and 6 control holes in the tape, will cause the relay 22–P06R2 to be operated the next time the contacts in the reader, 9–AUX–B, are closed as described in connection with the previous operation of the relay 22–P06R2. As soon as relay 22–P06R2 is operated, it will lock operated over its own contacts in a circuit from ground in FIG. 22 through the now closed make contacts 22–10–TOHA–2 and the now closed break contacts of the tight-tape relay 22–16–TTR–4, the now closed make contacts 22–P06R2–2 and the winding of the relay 22–P06R2 to —48 volt D.C. source in FIG. 22. The energization of relay 22–P06R2 will close its make contacts 22–P06R2–12 to complete a circuit from ground in FIG. 22 through the now closed make contact 22–P07R4–4, now closed break contacts 22–P67R2–5, and make contacts 22–P06R–12 and break contacts 22–26–RES–3 through the winding of the relay 22–TCFR to —48 volt D.C. source in FIG. 22. This relay will then lock up over its own contacts 22–TCFR–2. In operating the relay 22–TCFR it will close its make contacts 25–22–TCFR–12 to complete a circuit from ground in FIG. 25 through the tape check lamp in FIG. 25 to the —48 volt D.C. source, lighting this lamp. The energization of relay 22–TCFR will also cause the operation of the relay 26–SALA by closing its contacts 26–22–TCFR–4 to complete a circuit from ground through these contacts, through the reset key contacts 26–Reset Key–5 and relay 26–RES–4 through the winding of the relay 26–SALA to —48 volt D.C. source in FIG. 26. This operation of the relay 26–SALA will release the reader clutch, release the relay 10–TOHR, release the off-hook relay 10–OH in the subscriber's set, home the lower notch stepper switch 13–LNSS and operate the 7F buzzer in FIG. 25 in the same manner as was described in connection with failure of the transmission during the confirmation, as described in Section 31.

33. *Connection lost alarm (multi-entry)*

If it is assumed that a connection has been established and a message is being transmitted from the originating station to the terminating stations and the line connection is broken for any reason, the answer-back relay 30–ABX will be released and will cause relay 14–CAX to operate. If the circuit assurance signal being returned from the terminating station ceases for a predetermined length of time, approximately 500 milliseconds, relay 14–CAX will be operated. The circuit for operating the relay 14–CAX upon the failure of circuit assurance signals from the terminating station, will cause contacts 14–K32 in the secondary circuit associated with the line which has lost its connection, to be closed to complete a circuit from ground in FIG. 14 through these now closed contacts and the winding of the relay 14–CAX to the —48 volt D.C. source in FIG. 14. The universal contacts in the receiving printer at the terminating station, such as the break contacts 27–UNIV, upon remaining closed for 500 milliseconds will cause contacts 14–K32 to close. The circuit for energizing the relay 14–CAX, in the event that the relay 30–ABX is released, will be completed from ground in FIG. 14 through the now closed confirmation relay's make contacts 14–35–CFX–4, the now closed make contacts of the transmitter off-hook relay 14–32–TOH–2 and the now closed break contacts 14–30–ABX–10 through the winding of the relay 14–CAX to the —48 volt D.C. source. When the relay 14–CAX is energized, it will lock operated through its own make contacts 14–CAX–3 and the contacts of the reset relay 14–26–RES–8 to ground.

In operating the relay 14–CAX, in the secondary circuit on line 1, 2 or 3 which has lost its connection, relay 14–CAX will close its contacts 25–14–CAX–2 to close a circuit from ground in FIG. 25 through the white connection lost lamp in FIG. 25 associated with that line to —48 volt D.C. source. When relay 14–CAX, in the secondary circuit associated with the particular line which has lost its connection, is energized it will release the confirmation relay 35–CFX by opening its contact 35–14–CAX–4. When relay 36–CFX is released it will in turn release the telephone off-hook relay 32–TOH by opening its contacts 32–35–CFX–1 which in turn will release the relay 30–OH due to the opening of the contacts 30–32–TOH–1 in the secondary of the subscribers data set. Since the message is to be transmitted to a plurality of terminating stations at one time, the progress of the transmission to those stations which are still properly connected will continue. However, when the message has been transmitted to those stations having proper connections to them and the end-of-address relay 33–E0 releases after the completion of the transmission it will close its contact 34–33–E0–11 to complete a circuit from ground in FIG. 34 through the now closed make contact 34–14–CAX–1, now closed break contacts 34–33–E0–11, terminal A–35 on FIGS. 34 and 14 and the winding of the relay 14–CAR to —48 volt source in FIG. 14 to energize relay 14–CAR.

When relay 14–CAR is operated it will complete a circuit to energize the relay 26–SALA by closing its contacts 26–14–CAR–8 over a circuit similar to that described in connection with the tape check alarm circuit described in Section 32 and the operation of the relay 26–SALA will open its contacts 10–26–SALA–5 and 10–26–SALA–9 to release relays 10–TOHR and 10–OH as well as closing its contacts 25–26–SALA–10 to operate the buzzer in FIG. 25. The action of this circuit will be exactly the same as that described under the tape check alary in Section 32 when relay 10–TOHR was released.

34. *Connection lost (single entry)*

When the apparatus is operating on a single entry basis, original state relay 32–0S is energized and as a consequence of this there is no need to wait for the de-energization of relay 33–E0 in order to light the red connection lost lamp. This is due to the fact that only one station is receiving the message and the alarm should be sounded as soon as the connection is lost rather than waiting for the end of the transmission of the message. The energization of relay 32–0S will close its contacts 34–32–0S–9 so that when relay 14–CAX is operated and closes its contacts 34–14–CAX–1, a circuit will be completed from ground through those contacts, now closed make contacts 34–32–0S–9, terminal A–35 on FIGS. 34 and 14 through the winding of 14–CAR to −48 volt D.C. source in FIG. 14 to immediately actuate the alarm circuit. When relay 14–CAR is energized it will close its contacts 25–14–CAR–6 to light the red connection lost lamp in FIG. 25 and will energize relay 26–SALA by closing its contacts 26–14–CAR–8 as described in connection with the multi-entry lost connection operation to actuate the 7F buzzer in FIG. 25.

35. *Intercept not reached alarm*

In the event that, for some reason, the originating or transmitting station has made three attempts to complete a connection through to an addressed terminating station and these attempts have failed and further that after five dialing attempts have been made to reach the intercept terminating station, no connection has been completed, as described under dialing of the intercept number and answer-back not received in response to the intercept number in Sections 14 and 24, an alarm will be given. With the apparatus in the condition it would be in after five unsuccessful attempts have been made to reach the intercept terminating station, the intercept stepping switch 3–INSS would have stepped to Position 6 of its various ARCs and it will also have stepped the lower notch stepping switch 13–LNSS to Position 6 on its respective ARCs to record the sixth attempt to reach the direct distance dialing number of the intercept terminating station. Under these conditions the brush or wiper of ARC–4 of 13–LNSS as shown in FIG. 12 will partially close an operating path for relay 12–IALR which is the intercept alarm relay. Since under these conditions the answer-back was not received, relay 24–T0RA will be operated as described in Section 22 under the answer-back not received and in being so operated, relay 24–T0RA will release relay 10–TOHR, by opening its break contacts 10–24–T0RA–5 and will lock operated as described in connection with the failure to receive an answer-back signal in Section 22. In this case the release of relay 10–T0HR will close its break contact 12–10–TOHR–4 to complete a circuit from ground in FIG. 12 through the now closed break contact 12–26–SALA–11 through the common brush of 12–13–LNSS–ARC–4 and contact 6 of ARC–4 of 12–13–LNSS and the now closed make contact 12–ITRB–10 and the now closed break contact 12–10–TOHR–4 through the winding of the relay 12–IALR to −48 volt D.C. soure in FIG. 12. When relay 10–TOHR is released it will release relays 10–T0HA, 10–0H and 10–0NHR as described in connection with previous operations of the relay 10–TOHR. The intercept stepper switch 3–INSS will now be stepped to its home position in a circuit from ground (FIG. 3) through the off-normal interrupter switch 3–INSS–0N, now closed make contact 3–24–T0RA–4, now closed break contact 3–10–TOHR–6, and the intercept interrupter switch 3–INSS–INT through the winding of the magnet 3–INSS–MAG to the −48 volt D.C. source. When 3–INSS reaches its home position its off normal contacts 3–INSS–0N will open.

When relay 12–IALR was energized, it locked operated to ground in FIG. 12 through the now closed break contact 12–26–RES–1 and its own make contact 12–IALR–4. The operation of relay 12–IALR will complete a circuit from ground in FIG. 25 through its now closed make contact 25–12–IALR–12 and through the intercept not reached lamp to the −48 volt D.C. source in FIG. 25 to light the intercept not reached lamp. The operation of relay 12–IALR will also operate relay 26–SALA by closing its contacts 26–12–IALR–2 in a manner similar to that described hereinbefore in connection with the operation of the relay 26–SALA. In this case the operation of the relay 26–SALA will complete a circuit from ground associated with the common brush of 13–LNSS–ARC–2 and through contacts 1–10 on that ARC and through the now closed make contacts 13–26–SALA–12, now closed break contacts 13–9–P07R2–6 and the interrupter switch 13–LNSS–INT through the winding of the relay 13–LNSS to −48 volt D.C. source in FIG. 13 to cause this stepper switch to step to its home position. Relay 26–SALA in operating will also open the ground path to ARC–4 of 12–13–LNSS, by opening its break contacts 12–26–SALA–11, and will also, by closing its contacts 24–26–SALA–8, lock relay 24–TORA operated in a path from ground in FIG. 24 through the now closed break contacts 24–26–RES–11 and 24–TORB–4, now closed make contact 24–26–SALA–8 and 24–TORA–2 through the resistor 24–R5 and the winding of relay 24–TORA to the −120 volt D.C. source in FIG. 24.

When intercept stepper switch 3–INSS arrives at its home position, it will not be stepped into its No. 1 position, as described under Answer-Back Not Received in Response to Intercept Number in Section 27 in view of the fact that the lower notch stepping switch 13–LNSS has been stepped to its home position and therefore when the intercept stepper switch 3–INSS arrives at its home position, it will close its break contacts 3–INSS–ON–3 and open its corresponding make contacts. However, the path to the intercept stepper switch 3–INSS will be broken due to the fact that the stepper switch 13–LNSS has reached its home position and has opened its contacts 3–13–LNSS–ON–2. The operation of the 7F buzzer in FIG. 25 due to the operation if relay 26–SALA will notify the operator that a faulty condition exists and the operator will be appraised of the faulty condition by the alarm lamp which is lighted.

In order to restore the apparatus to an operative condition after the sounding of an alarm for any of the reasons discussed hereinbefore, the operator may operate the alarm silence key 26–AC0–2 to supply a ground connection through any one of the contacts which were closed as a result of an alarm condition to operate relay 26–SALB. For example, the circuit may extend from ground in FIG. 26 through the tape check format relay contacts 26–22–TCFR–4 and through the reset key 26–Reset Key–5 and now closed break contacts 26–RES–4 through now closed contacts 26–AC0–2 and the now closed break contacts of the stepper key 26–Step Key–2 and the now closed break contacts 26–RES–10 through the winding of the relay 26–SALB to the −48 volt D.C. source in FIG. 26. When relay 26–SALB is energized, it will open its break contact 25–26–SALB–7 to break the circuit to the 7F buzzer in FIG. 25 and also it will lock through its own contacts 26–SALB–12 and thence through the path of the relay contacts which had originally energized it, such for example, as the contacts 26–22–TCFR–4. The operation of the relay 26–SALB will also open the operating path to the reader clutch magnet 3–RCM by opening its contacts 3–26–SALB–5.

In order to determine the cause of the failure, the operator will next open the stop-run switch 8–SRTTS to deenergize the stop-run relay 8–SRR. This will open the make contact 3–8–SRR–12. When the operator has ascertained the reason for the alarm, the reset key may be operated to open the break contacts 26–Reset Key–5 and close the make contact 26–Reset Key–1. The opening of the break contacts 26–Reset Key–5 will release the relay 26–SALA and 26–SALB and the closing of contacts 26–Reset Key–1 will operate the reset relay 26–RES. The circuit for operating relay 26–RES will extend from ground in FIG. 26 through the now closed break contacts 26–Reset Key–1, the diode 26–D42, the now closed break contacts 26–24–TOTR–7, 26–8–SRR–9, 26–SALB–4 and 26–SALA–3 through the winding of the relay 26–RES to the —48 volt D.C. source in FIG. 26. When relay 26–RES is operated, it will open its break contacts 3–26–RES–6 to break the circuit to the reader clutch magnet 3–RCM, it will close its make contact 3–26–RES–2 to home the intercept stepper switch 3–INSS by forming a shunt path around the contacts 3–24–TORA–4, it will open its contacts 9–26–RES–7 to break the circuit to all the relays which might possibly have been held operated under control of ground in FIG. 9 through this particular contact, it will open its break contacts 12–26–RES–9 and 12–26–RES–1 to release any relays which might have been held up over these circuit paths, it will transfer its contacts 14–26–RES–8 to release relay 14–CAR, it will open its break contacts 22–26–RES–3, to break the circuit path to relay 22–TCFR, it will open its break contacts 24–26–RES–11 and it will open its break contact 26–RES–4 and close its make contact 26–RES–12. Relay 26–RES in operating will complete a circuit from ground in FIG. 3 through its now closed make contacts 3–26–RES–6 to operate the reader clutch magnet to clear out any control hole level that might be stored in the contacts of the reader as shown on FIG. 11. If this condition is maintained, that is, the reset push button is still held down and consequently the reset relay 26–RES is held operated, at the time in the cycle of operation in clearing out the reader, that the auxiliary contacts 13–AUX–A close, a path would be established from ground through the closed contacts 13–AUX–A, diode 13–D43, terminal TE–9 on FIGS. 13 and 26 to re-energize the relay 26–SALB. However, relay 26–SALB will be released as soon as the reset push button is released and the relay 26–RES is de-energized. This will put the apparatus in condition for initiation of a new cycle of operation.

36. *End-of-message pull back* (*single entry*)

In those cases where the same message is to be transmitted to a plurality of terminating stations and only the first subscribers set is connected, the tape will have perforated in it more than one address, in the form of DDD numbers and mnemonic codes for the terminating stations to whom the message is to be transmitted. When a connection is made to the terminating station, the first address is read from the tape, the operation will be as described hereinbefore. When the end-of-message code sequence is read, the tape will be pulled back and the tape will be advanced again and the first direct distance dialing number sensed by the reader to which the message has not been transmitted will not have perforations in the sixth and eighth levels of the tape and consequently the relay 9–P068R will not be operated. Therefore, when the 0 and seventh control holes are sensed in the tape together with the first digit of the unsent direct distance dialing number, relay 9–P07R1 will be operated in the same manner as described hereinbefore upon reading the first digit of a direct distance dialing number. The operation of relay 9–P07R1 will close its contacts 20–9–P07R1–1 to complete a circuit from ground in FIG. 20 through the now closed break contact 20–21–STC–1, now closed break contact 20–9–P068R–7 and the now closed make contact 20–9–P07R1–1 through the winding of the relay 20–UDR to the —48 volt D.C. source in FIG.20. The tape will continue to be advanced to read the direct distance dialing number and transmit the message to the terminating station whose address has just been read from the tape. When the reader contacts sense the zero and six control holes in line with the third "N" code combination of the end-of-message code combination sequence, it will effect the operation of the relay 9–P06R in the same manner as described hereinbefore in connection with the operation of this relay. When the reader contacts sense the next character which is the fourth "N" in the end-of-message code sequence and find no control holes, the permutation none relay 9–PNR will be operated and locked operated under control of all of the released permutation control hole relays which are released, in the manner described previously in connection with the operation of the relay 9–PNR. The energization of the relay 9–PNR will also open the operating path to the reader clutch magnet 3–RCM by opening its contacts 3–9–PNR–10 due to the fact that relay 9–P06R is still locked operated and consequently is holding its contacts 3–9–P06R–5 open. The operation of relay 9–PNR will complete a circuit from ground in FIG. 18 through the now closed make contact 18–9–PNR–2 and 18–9–P06R–2, the diode 18–D44, now closed make contacts 18–20–UDR–4 and now closed break contacts 18–PBRB–5 through the winding of the relay 19–PBRA to —48 volt D.C. source in FIG. 18. During this cycle of operation of the apparatus, the opening of the distributor contacts 3–AUX–D will cause relay 10–TOHR to be released by opening the path through terminal TN38 on FIGS. 3 and 10 and it in turn will release relay 10–ONHR, 10–TOHA, and 10–OH in the subcriber's set. Energization of the relay 18–PBRA will close a circuit from ground in FIG. 19 through the now closed break contacts 19–9–P06R–10 and the now closed make contacts 19–18–PBRA–2 through the winding of the pull-back magnet 19–PBM to —48 volt D.C. source in FIG. 19. As a consequence of this action the tape will be pulled back through the reader until the tape becomes taut between the sensing pins and the pull-forward feed wheel to operate the tight-tape switch 16–TTS thereby to energize the tight-tape relay 16–TTR. At this point the tape will be in its original starting position and the circuit action that will follow is as described under the dialing operation in Section 3 and the blinding of the called direct distance dialing number after pull back in Section 5.

37. *Monitor blinding of multi-address messages* (*single entry*)

When a message has been transmitted to one addressee and the pull back initiated, as described under End-of-Message Pull Back in Section 36, the release of the relay 10–TOHA will complete a circuit from ground in FIG. 23 through the now closed make contacts 23–4–TCR–4 and 23–9–P06R–6, now closed break contact 23–9–P7R and 23–10–TOHA-10 through the winding of the relay 23–MER to —48 volt D.C. source in FIG. 23, thereby to pull up the relay 23–MER which will lock through its own contacts 23–MER–2 and closed make contacts 23–4–TCR–4. Under these conditions, when the tape starts to advance after the pull back, the called direct distance dialing number will be blinded as described under Blinding Called DDD Number After Pull Back in Section 11 and the second direct distance dialing number will be transmitted as described under the Dialing Operation in Section 3. When, as a result of dialing of the second direct distance dialing number, a confirmation is received, relay 14–CFR will be energized and will lock operated as described hereinbefore in connection with the operation of this relay.

After receipt of the confirmation and the consequent operation of relays 14–CFR, the pull-back operation will be accomplished as described under Confirmation Received in Section 8. The operation of the reader will also be initiated and as the tape starts to advance and reads the "CARRIAGE RETURN" and "LINE FEED" code combinations in succession, at the start-of-message code sequence, contacts 27–CR–LF in the "stunt box" of the monitor printer will be closed. FIG. 27 also shows the various code combinations which will close contacts in the "stunt box" for utilization in the operation of the printer in this system. When the "CARRIAGE RETURN" and "LINE FEED" signals are thus received by the monitoring printer and as a consequence contacts 27–CR–LF are closed, contacts 23–CR–LF will also be closed to complete a circuit from ground in FIG. 23 through the break contacts 23–PSR–9, make contacts 23–CR–LF and the now closed make contacts 23–18–PBRB–12 through the winding of the relay 23–MBR to the —48 volt D.C. source in FIG. 23. Energization of relay 23–MBR will complete the shunt path for contacts 23–11–MLR–3 over the contacts of operated relays 23–MBR, 23–MER and 14–CFR, shown in FIG. 23 as contacts 23–MBR–12, 23–MER–12 and 23–14–CFR–9 and the unoperated break contact 23–21–STC–7. This will blind the monitor printer although the signals are being transmitted to the line. The monitor blinding circuit will be removed when relay 10–TOHR releases due to the consequent deenergization of relay 23–MBR, but will be applied again in the same manner if the tape contains another uncalled DDD number. The release of the relay 10–TOHR will release the monitor blinding relay 23–MBR by opening its contacts 23–10–TOHR–5.

Although a particular embodiment of the invention is shown in the drawnigs and described in the foregoing specification, it will be understood that the invention is not limited to that specific embodiment but is capable of modification, and rearrangement and substitution of parts and elements without departing from the scope of the invention. For example, the contacts designated CALL-TELCO-KEY in FIG. 21 may be closed to energize the service test center relay 21–STC when it is desired to initiate a test of the apparatus. Furthermore, the stop-run switch may be operated to close its contacts 8–SRTTS to energize the stop-run relay 8–SRR and transmitter switch in FIG. 7 may be operated to its various positions to effect such operations as stopping the apparatus after completion of the transmission of a message which is in progress so that a priority message may be sent under control of the operator. These features are inherent in the apparatus and comprise variations in the mode of operation of apparatus, but are still within the concept of the invention.

What is claimed is:

1. In a printing telegraph line switching message transmission system operable under control of a code storage medium containing stored data representative of the addresses of stations on the system to which a message is to be sent and also containing stored data representative of the message to be transmitted to said stations, (a) a plurality of subscribers sets each having a single line access to a line switching network, (b) means for rendering said sets operative in a predetermined sequence, (c) means controlled by said storage medium for attempting to complete connections in said sequence through said sets to separate stations the addresses of which are stored in said medium, and (d) means for simultaneously transmitting the message stored in said medium to those stations to which connections have been completed.

2. The system according to claim 1 wherein there is provided means for detecting the failure of an attempt to complete a connection and for initiating another attempt to complete such connection.

3. The system according to claim 1 wherein there are provided means for detecting the presence in the medium of data representing addresses of stations to which connections have not been completed and for initiating attempts to complete connections to such addresses.

4. The system according to claim 3 wherein means are provided for automatically causing the storage mechanism to be read repeatedly for causing the transmission of a message to a number of stations in excess of the number of subscribers sets.

5. The system according to claim 3 wherein there is provided means controlled by said storage medium upon the failure of a predetermined number of attempts to complete a connection to a station the address of which is stored on said medium for halting transmission to other stations and automatically attempting to complete a connection to a station other than a station having its address stored on the storage medium.

6. In a printing telegraph line switching message transmission system, (a) a plurality of subscribers sets each having a single line access to a switching network which has access to a plurality of subscribers stations, (b) means under control of a tape for establishing a connection to one of said subscriber sets and for attempting to complete a connection through said one subscribers set to a station the address of which is perforated in permutation code in the tape, (c) switching means for switching said connection from said one of said subscribers sets to another subscribers set for attempting to complete a connection to another station the address of which is also perforated in permutation code in the tape, and (d) means under control of the tape for transmitting a message text simultaneously to the stations, whose addresses are perforated in the tape, through the subscribers sets which have individually completed connections to said stations.

7. In a printing telegraph line switching message transmission system, (a) means operable under control of a tape for attempting to complete connections to a plurality of stations the addresses of which are perforated in permutation code in the tape, (b) means for detecting the success or failure of such attempts, (c) means rendered effective by the detection of the success of such attempts for simultaneously transmitting a message text under control of the tape to the plurality of stations the addresses of which are in the tape and to which connections have been completed, and (d) means operable under control of the detecting means upon the failure of any one of such attempts to initiate at least one more attempt to complete the connection to a station to which no connection has been made on the one attempt.

8. A system according to claim 7 wherein the means for attempting to complete connections to the stations the addresses of which are perforated in the tape is operable to make attempts to reach a succeeding station while the detecting means is detecting the success of attempts to complete connections to preceding stations.

9. In a printing telegraph line switching message transmission system operable under control of a code storage medium having stored in it data representative of the digital addresses of a plurality of stations, the mnemonic code for such stations, and a message text to be transmitted to said stations, (a) a transmitting station having in it a predetermined number of subscribers sets each having single line access to a switching network which in turn has access to a plurality of subscribers stations, (b) means under control of said storage medium for rendering said sets operative sequentially, (c) means under control of said storage medium for sending a digital address through each set to the switching network to attempt to complete a connection through each set to a station, (d) means for detecting the completion of a connection, (e) means for thereafter transmitting the mnemonic code corresponding to the digital address of each station to which a connection should have been made through the subscriber sets, (f) means for detecting the successful completion of connections through the subscribers sets to the proper stations as designated by said mnemonic codes, and (g) means for simultaneously transmitting the message text to the properly connected stations.

10. The system according to claim 9 wherein the means for detecting the completion of a connection includes a timer for each subscribers set, the operation of which is initiated upon the completion of the sending of the digital address and which is disabled upon the completion of a connection.

11. The system according to claim 10 wherein the timer for preceding subscribers sets time out during the handling of the digital addresses by succeeding subscribers sets.

12. In a printing telegraph line switching message transmission system operable under control of a code storage medium having stored in it data representative of the digital addresses of a plurality of stations, the mnemonic code for such station, and a message text to be transmitted to said stations, (a) a transmitting station having in it a predetermined number of subscribers sets each having single line access to a switching network which in turn has access to a plurality of subscribers stations.

(b) means under control of said storage medium for rendering said sets operative sequentially, (c) means under control of said storage medium for sending a digital address through each set to attempt to complete a connection through each set to a station, (d) means for detecting the completion of a connection, (e) means for thereafter transmitting the mnemonic code corresponding to the digital address of each station to which a connection should have been made through the subscriber sets, (f) means for detecting the successful completion of connections through the subscribers sets to the proper stations as designated by said mnemonic codes, (g) said means for detecting completion of the connections to proper stations including timing circuits individual to each subscribers set which are started through a timing cycle upon the transmission of the mnemonic and disabled upon an acknowledgment that the proper station is connected, and (h) means for simultaneously transmitting the message text to the properly connected stations.

13. In a printing telegraph line switching message transmission system operable under control of a storage medium having stored in its data representative of the digital addresses of a plurality of stations, the mnemonic codes for such stations and a message text to be transmitted to said stations (a) a transmitting station having in it a predetermined number of subscriber sets each having single line access to a switching network which in turn has access to a plurality of subscriber stations, (b) means at said transmitting station for reading data from said storage medium, (c) means for feeding said storage medium back and forth through said reading means, (d) means operable under control of the reading means on a first passage of said medium through said reading means for reading a plurality of digital addresses to attempt to complete connections through the subscribers sets to stations, the addresses of which are represented in the storage medium, (e) means operable on said first passage for blinding the system to the mnemonic codes of such addresses, (f) means for detecting the completion of connections through said subscribers sets to one or more of said stations, the addresses of which are in the storage medium, (g) means operable upon a later passage of the medium through the reader for reading the mnemonic code representation and transmitting them through the subscribers sets that have completed connections to remote stations for transmitting these mnemonic code representations to the respective stations, (h) means also operable on said later passage of the medium through the reader for blinding the transmission of the digital address representation, (i) means for detecting the successful completion of connections through the subscribers sets to the proper stations as designated by said mnemonic code representations, and (j) means for simultaneously transmitting the message text to the properly connected stations.

14. A system according to claim 13 wherein there is provided means for indicating, on the storage medium, the failure to complete a connection to an address station and circuit means to re-read the record medium to search for and attempt to complete connections to addresses not properly connected on the first passage of the medium through the reading means.

15. A system according to claim 13 wherein the means operable under control of the reading means and operating on the first passage of the record medium through the reading means reads only a predetermined plurality of digital addresses that is the same in number as the predetermined number of subscriber sets.

16. In a printing telegraph line switching message transmission system having stored data representative of a message to be transmitted to selected stations on the system, (a) code storage means containing stored data representative of the addresses of the stations to which a message is to be sent for controlling the operation of the transmission system, (b) a plurality of subscribers sets each having a single line access to a line switching network, (c) means for rendering said sets operative in a predetermined sequence, (d) means controlled by said storage means for attempting to complete connections in said sequence through said sets to separate stations the addresses of which are stored in said storage means, and (e) means for simultaneously transmitting the message to those stations to which connections have been completed.

17. In a printing telegraph line switching message transmission system having stored data representative of a message to be transmitted to selected stations on the system and operable under control of a code storage medium containing stored data representative of the addresses of the stations to which the message is to be sent, (a) a plurality of subscribers sets each having a single line access to a line switching network, (b) means for rendering said sets operative in a predetermined sequence, (c) means controlled by said storage medium for attempting to complete connections in said sequence through said sets to separate stations the addresses of which are stored in said medium, and (d) means for simultaneously transmitting the message to those stations to which connections have been completed.

No references cited.

NEIL C. READ, *Primary Examiner.*

T. A. ROBINSON, *Assistant Examiner.*